United States Patent
Yang et al.

(10) Patent No.: US 9,692,629 B2
(45) Date of Patent: Jun. 27, 2017

(54) RESOURCE BLOCK BASED MULTICARRIER MODULATIONS FOR AGILE SPECTRUM

(71) Applicant: IDAC HOLDINGS, INC., Wilmington, DE (US)

(72) Inventors: Rui Yang, Greenlawn, NY (US); Leonid L. Kazakevich, Plainview, NY (US); Jialing Li, San Diego, CA (US); Erdem Bala, East Meadow, NY (US); Kenneth Kearney, Smithtown, NY (US); I-Tai Lu, Dix Hills, NY (US); Juan Fang, Brooklyn, NY (US); Zihao You, Brooklyn, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 14/648,160

(22) PCT Filed: Nov. 27, 2013

(86) PCT No.: PCT/US2013/072410
§ 371 (c)(1),
(2) Date: May 28, 2015

(87) PCT Pub. No.: WO2014/085710
PCT Pub. Date: Jun. 5, 2014

(65) Prior Publication Data
US 2015/0304146 A1 Oct. 22, 2015

Related U.S. Application Data

(60) Provisional application No. 61/731,356, filed on Nov. 29, 2012, provisional application No. 61/767,556, filed on Feb. 21, 2013, provisional application No. 61/774,452, filed on Mar. 7, 2013.

(51) Int. Cl.
*H04L 27/26* (2006.01)
*H04L 5/00* (2006.01)
(Continued)

(52) U.S. Cl.
CPC ........ *H04L 27/2627* (2013.01); *H04L 5/0066* (2013.01); *H04L 27/0008* (2013.01);
(Continued)

(58) Field of Classification Search
CPC ............... H04L 27/2627; H04L 5/0066; H04L 27/0008; H04L 27/2631; H04L 27/264; H04W 72/04
See application file for complete search history.

(56) References Cited

U.S. PATENT DOCUMENTS 7,206,350 B2 * 4/2007 Korobkov ............. H04L 5/0037
370/208
7,376,074 B2 5/2008 Jung et al.
(Continued)

FOREIGN PATENT DOCUMENTS

CN 101043495 A 9/2007
CN 101374125 A 2/2009
(Continued)

OTHER PUBLICATIONS

Bauml et al., "Reducing the peak to average power ratio of multicarrier modulation by selected mapping", Electronics Letters, vol. 32, No. 22, (1996).
(Continued)

*Primary Examiner* — Ian N Moore
*Assistant Examiner* — Latresa McCallum
(74) *Attorney, Agent, or Firm* — Volpe and Koenig, P.C.

(57) ABSTRACT

A resource block (RB)-based multicarrier modulation (MCM) transmitter and receiver structure for spectral agile systems are disclosed. The transmitter and the receiver are
(Continued)

capable of sharing opportunistically available and non-contiguous channels with other users. The RB-MCM partitions the available spectrum, contiguous or non-contiguous, into multiple RBs (same or different sizes), applies a baseband MCM or single carrier modulation, or coded single carrier or multicarrier schemes in each RB with a type of spectral leakage reduction technique, and applies RB modulation for each RB to modulate the signal from baseband to the frequency band of that RB. At the receiver, the received signal may be filtered and RB demodulation may be applied to put each RB signal in baseband and a baseband multicarrier or single carrier or coded single carrier or coded multicarrier demodulation may be applied to each RB signal. Different RBs may use different modulation schemes.

2 Claims, 39 Drawing Sheets

(51) Int. Cl.
  *H04L 27/00* (2006.01)
  *H04W 72/04* (2009.01)
(52) U.S. Cl.
  CPC ........ *H04L 27/264* (2013.01); *H04L 27/2631* (2013.01); *H04W 72/04* (2013.01)

(56) References Cited

U.S. PATENT DOCUMENTS

| | | | |
|---|---|---|---|
| 8,085,862 B2 | 12/2011 | Wang | |
| 8,396,165 B2* | 3/2013 | Imamura | H04L 25/0204 370/210 |
| 8,630,359 B2 | 1/2014 | Jitsukawa et al. | |
| 9,065,612 B2 | 6/2015 | Yamashita et al. | |
| 9,288,020 B2 | 3/2016 | Papasakellariou et al. | |
| 9,497,735 B2 | 11/2016 | Seyama et al. | |
| 2008/0316950 A1* | 12/2008 | Damnjanovic | H04W 52/146 370/311 |
| 2009/0109999 A1* | 4/2009 | Kuri | H04L 1/0003 370/465 |
| 2010/0103920 A1* | 4/2010 | Damnjanovic | H04L 1/0026 370/344 |
| 2010/0189132 A1* | 7/2010 | Fettweis | H04L 5/003 370/480 |
| 2010/0238877 A1 | 9/2010 | Nam et al. | |
| 2010/0239031 A1 | 9/2010 | Wallen | |
| 2011/0090972 A1* | 4/2011 | Jong-Seon | H04L 27/2621 375/260 |
| 2012/0045014 A1* | 2/2012 | Damnjanovic | H04L 5/001 375/295 |
| 2012/0113831 A1* | 5/2012 | Pelletier | H04L 5/0058 370/252 |
| 2012/0163509 A1* | 6/2012 | Nemeth | H04L 27/2082 375/340 |
| 2013/0058432 A1* | 3/2013 | Futatsugi | H04J 11/0036 375/296 |
| 2013/0281148 A1 | 10/2013 | Seyama | |

FOREIGN PATENT DOCUMENTS

| | | |
|---|---|---|
| CN | 101399800 A | 4/2009 |
| EP | 2045942 | 4/2009 |
| EP | 2515599 | 10/2012 |
| JP | 2005229469 | 8/2005 |
| JP | 2009055395 | 3/2009 |
| JP | 2010011179 | 1/2010 |
| JP | 2010252392 | 11/2010 |
| JP | 2011176679 | 9/2011 |
| JP | 2011205628 | 10/2011 |
| WO | 2008/089176 | 7/2008 |

OTHER PUBLICATIONS

Bogucka et al., "Spectrally Agile Multicarrier Waveforms for Opportunistic Wireless Access," IEEE Communications Magazine, (Jun. 2011).

Cherubini et al., "Filtered Multitone Modulation for Very High-Speed Digital Subscriber Lines," IEEE Journal on Selected Areas in Communications, vol. 20, No. 5, (Jun. 2002).

Chung, "Spectrally Precoded OFDM with Cyclic Prefix," IEEE International Conference on Communications, (2007).

Datta et al., "Generalized Frequency Division Multiplexing in Cognitive Radio," Signal Processing Conference (EUSIPCO), 2012 Proceedings of the 20th European, (2012).

Falconer et al., "Frequency Domain Equalization for Single-Carrier Broadband Wireless Systems," IEEE Communications Magazine, (2002).

Farhang-Boroujeny et al., "Cosine Modulated and Offset QAM Filter Bank Multicarrier Techniques: A Continuous-Time Prospect," EURASIP Journal on Advances in Signal Processing, vol. 2010, Article ID 165654, 16 pages, (2010).

Farhang-Boroujeny, "Signal Processing Techniques for Software Radios," 2nd Edition, Lulu publishing house, (2010).

Jiang et al., "Exponential Companding Technique for PAPR Reduction in OFDM Systems," IEEE Transactions on Broadcasting, vol. 51, No. 2, (2005).

Jiang et al., "Low-Complexity Spectral Precoding for Rectangularly Pulsed OFDM," Vehicular Technology Conference (VTC Fall), 2012 IEEE, (2012).

Kryszkiewicz et al., "Protection of Primary Users in Dynamically Varying Radio Environment: Practical Solutions and Challenges," EURASIP Journal on Wireless Communications and Networking, (2012).

Louveaux et al., "Equalization and Demodulation in the Receiver (Single Antenna)," Physical Layer for Dynamic Access and Cognitive Radio (PHYDYAS) Report, (Jul. 2008).

Ma et al., "Optimal Orthogonal Precoding for Power Leakage Suppression in DFT-Based Systems," IEEE Transactions Communications, vol. 59, No. 3, (2011).

Michailow et al., "Bit Error Rate Performance of Generalized Frequency Division Multiplexing," Vehicular Technology Conference (VTC Fall), 2012 IEEE, (2012).

Michailow et al., "Generalized Frequency Division Multiplexing: A Flexible Multi-Carrier Modulation Scheme for 5th Generation Cellular Networks," Proceedings of the German Microwave Conference (GeMiC), (2012).

Michailow et al., "Generalized Frequency Division Multiplexing: Analysis of an Alternative Multi-Carrier Technique for Next Generation Cellular Systems," Proceedings of the 9th International Symposium on Wireless Communication Systems (ISWCS) (2012).

Muller et al., "OFDM with reduced peak-to-average power ratio by optimum combination of partial transmit sequences," Electronics Letters, vol. 33, No. 5, (1997).

Noguet et al., "Advances in Opportunistic Radio Technologies for TVWS," EURASIP Journal on Wireless Communications and Networking, (2011).

NTT Docomo et al., "Discussion on the Application of MPR for 35.521-1 Tx Test Cases," 3GPP TSG RAN WG5 #41, R5-085706, Prague, Czech Republic, (2008).

Pagadarai et al., "Non-contiguous multicarrier waveforms in practical opportunistic wireless systems," IET Radar, Sonar and Navigation, vol. 5, Issue 6, (2011).

Pancaldi et al., "Single-Carrier Frequency Domain Equalization", IEEE Signal Processing Magazine, (2008).

Rajbanshi et al., "An Efficient Implementation of NC-OFDM Transceivers for Cognitive Radios," First International Conference on Cognitive Radio Oriented Wireless Networks and Communications (CROWNCOM), Mykonos Island, Greece, (Jun. 2006).

Van De Beek, "Orthogonal Multiplexing in a Subspace of Frequency Well-Localized Signals," IEEE Communications Letters, vol. 14, No. 10, (2010).

(56) References Cited

OTHER PUBLICATIONS

Van De Beek, "Sculpting the Multicarrier Spectrum: A Novel Projection Precoder," IEEE Communications Letters, vol. 13, No. 12, (2009).
Viholainen et al., "Prototype Filter and Structure Optimization," Physical Layer for Dynamic Access and Cognitive Radio (PHYDYAS) Report, (Jan. 2009).
Viholainen et al., "Prototype Filter Design for Filter Bank Based Multicarrier Transmission," Signal Processing Conference, 2009 17th European, Glasgow, (Aug. 2009).
Wang et al., "Reduction of Peak-to-Average Power Ratio of OFDM System Using a Companding Technique," IEEE Transactions on Broadcasting., vol. 45, No. 3, (1999).
Weiss et al., "Mutual Interference in OFDM-based Spectrum Pooling Systems," Vehicular Technology Conference, 2004. VTC 2004-Spring. 2004 IEEE 59th, (2004).
Wyglinski, "Effects of Bit Allocation on Non-contiguous Multicarrier-based Cognitive Radio Transceivers," IEEE Vehicular Technology Conference, (2006).
Xu et al., "A Precoding Scheme for DFT-based OFDM to Suppress Sidelobes," IEEE Communications Letters, vol. 13, No. 10, (Oct. 2009).
Zhang et al., "OFDM Peak Power Reduction by Sub-Block-Coding and Its Extended Versions," Vehicular Technology Conference, 1999 IEEE 49th, (1999).
Zhang et al., "Sidelobe Suppression with Orthogonal Projection for Multicarrier Systems," IEEE Transactions on Communications, vol. 60, No. 2, (2012).
Zhou et al., "Multiuser Spectral Precoding for OFDM-based Cognitive Radios," Global Telecommunications Conference (GLOBECOM 2011), 2011 IEEE, (2011).

* cited by examiner

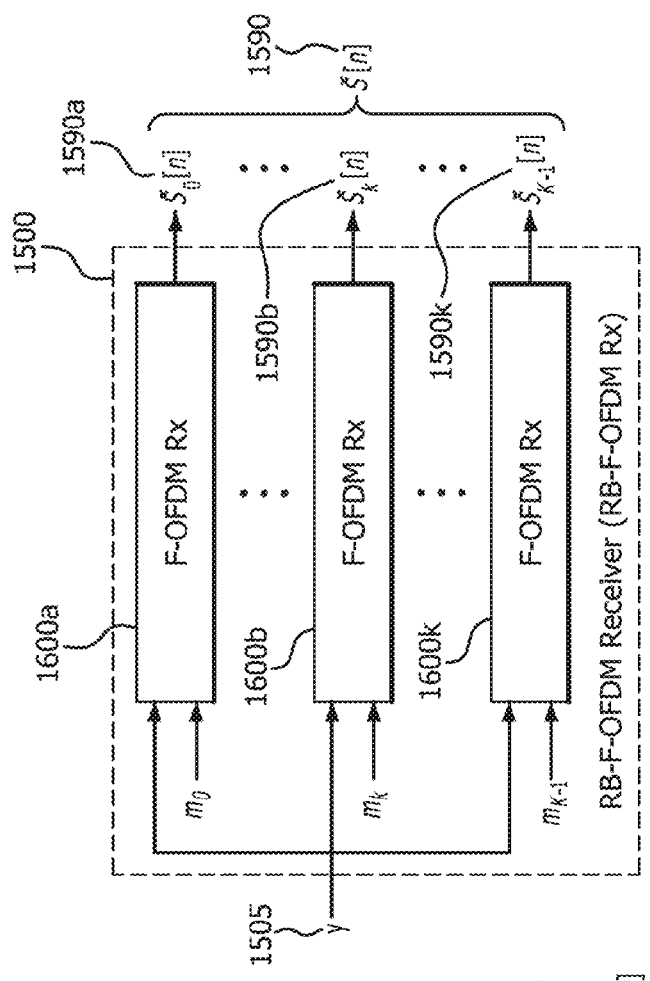
FIG. 17
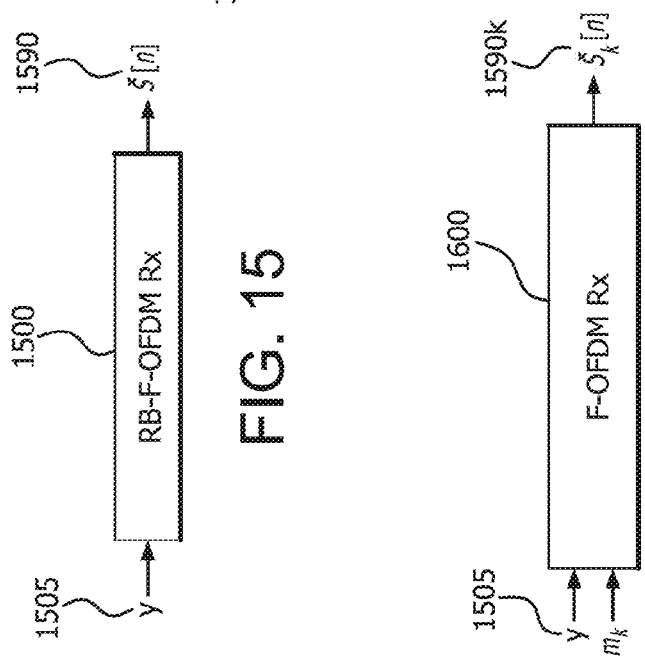
FIG. 15
FIG. 16

US 9,692,629 B2

RESOURCE BLOCK BASED MULTICARRIER MODULATIONS FOR AGILE SPECTRUM

CROSS REFERENCE TO RELATED APPLICATIONS

This application claims the benefit of PCT Application No.: PCT/US2013/072410, filed Nov. 27, 2013, and U.S. Provisional Application No. 61/731,356, filed on Nov. 29, 2012, U.S. Provisional Application No. 61/767,556, filed on Feb. 21, 2013, and U.S. Provisional Application No. 61/774,452, filed on Mar. 7, 2013, the contents of which are incorporated herein by reference in their entirety.

BACKGROUND

Multi-carrier modulation (MCM) techniques enable transmissions of a set of data over multiple narrow band subcarriers. With an advanced wideband modulation and coding scheme, an MCM system may achieve higher spectral efficiency in frequency selective channels compared to systems using single carrier modulation techniques.

Orthogonal frequency division multiplexing (OFDM) is an example of a MCM technique used in a wireless communication system. OFDM divides the total bandwidth into several orthogonal sub-bands overlapping in frequency and may be efficiently implemented by fast Fourier transform (FFT). In practical wireless communication systems, cyclic prefix orthogonal frequency division multiplexing (CP-OFDM), (i.e., OFDM with CP), is used to combat multipath channel. With a long enough cyclic prefix (CP), a simple one-tap frequency domain equalizer (FDE) is sufficient to mitigate the multipath channel impairment. However, large sidelobes of the rectangular pulse in OFDM create challenging issues in practice, including large inter-carrier interference when the system is not perfectly synchronized and excessive out-of-band emission (OOBE) exists, which limits the effectiveness of OFDM in networks with dynamic channel access capabilities.

SUMMARY

A resource block based multicarrier modulation (RB-MCM) transmitter and receiver structure for spectral agile systems are disclosed. The transmitter and the receiver are capable of sharing opportunistically available and non-contiguous channels with other users. The RB-MCM partitions the available spectrum, contiguous or non-contiguous, into multiple resource blocks (RBs) (same or different sizes), applies a baseband MCM or single carrier modulation, or coded single carrier or multicarrier schemes in each RB with a type of spectral leakage reduction technique, and then applies frequency shift (RB modulation) for each RB to modulate the signal from baseband to the frequency band of that RB. At the receiver, the received signal may be filtered and a frequency shift (RB demodulation) may be applied to put each RB signal in baseband and a baseband multicarrier or single carrier or coded single carrier or coded multicarrier demodulation may be applied to each RB signal. Different RBs may use different modulation schemes.

RB-based filtered-OFDM (RB-F-OFDM), RB-based single carrier modulation (SCM), and, RB-based precoded OFDM (RB-P-OFDM) are examples under the RB-MCM transmitter and receiver structure.

The RB-MCM may provide criteria such as low out-of-band emission (OOBE), low in-band distortion, low complexity, low latency, low peak-to-average power ratio (PAPR), robustness to frequency and timing asynchronous, and robustness to PA nonlinearity.

BRIEF DESCRIPTION OF THE DRAWINGS

A more detailed understanding may be had from the following description, given by way of example in conjunction with the accompanying drawings wherein:

FIG. 15 is a representation of an example RB-F-OFDM receiver;

FIG. 16 is a representation of an example F-OFDM receive module;

FIG. 17 is a block diagram of an example RB-F-OFDM receiver;

DETAILED DESCRIPTION

Figure 1A:
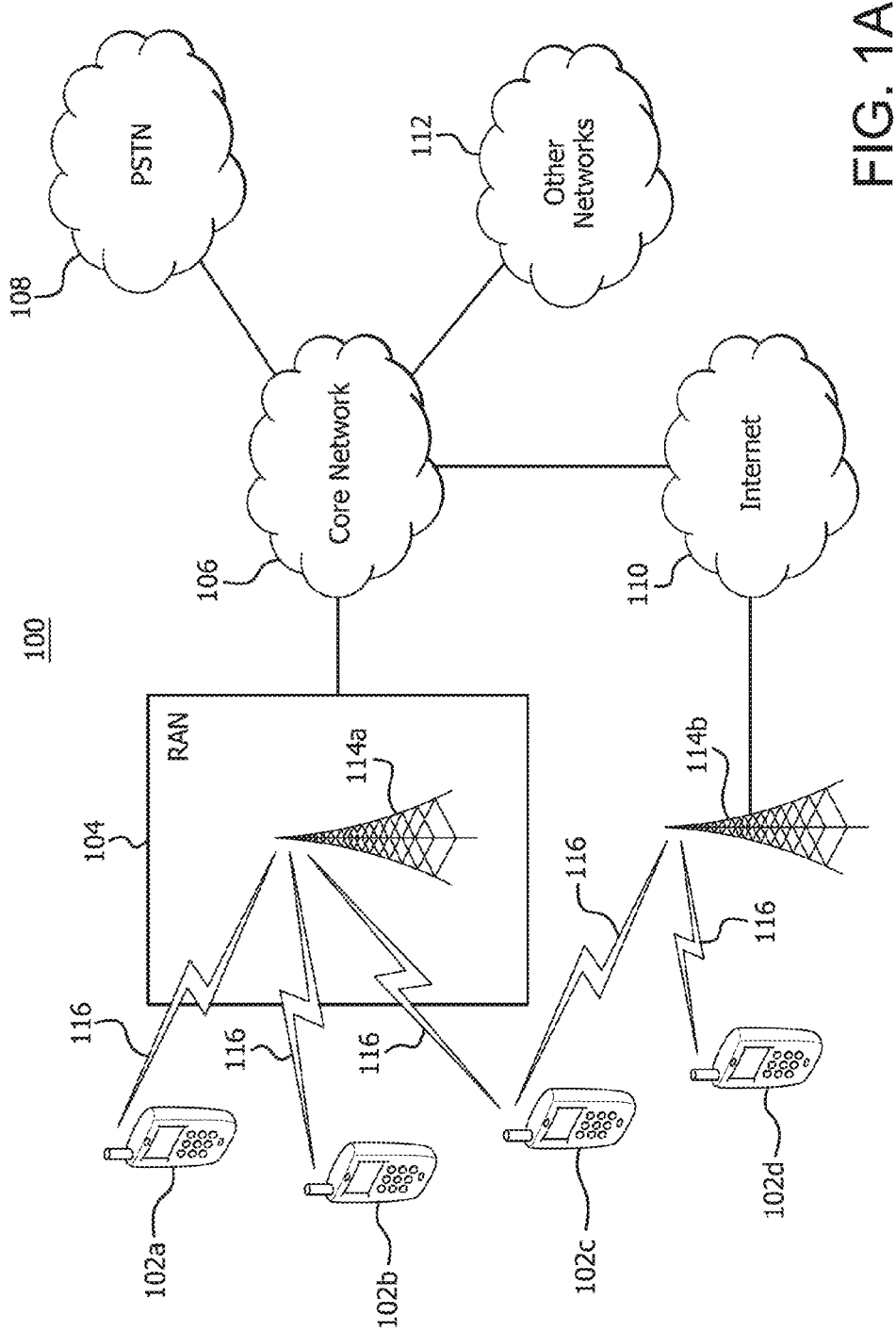
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
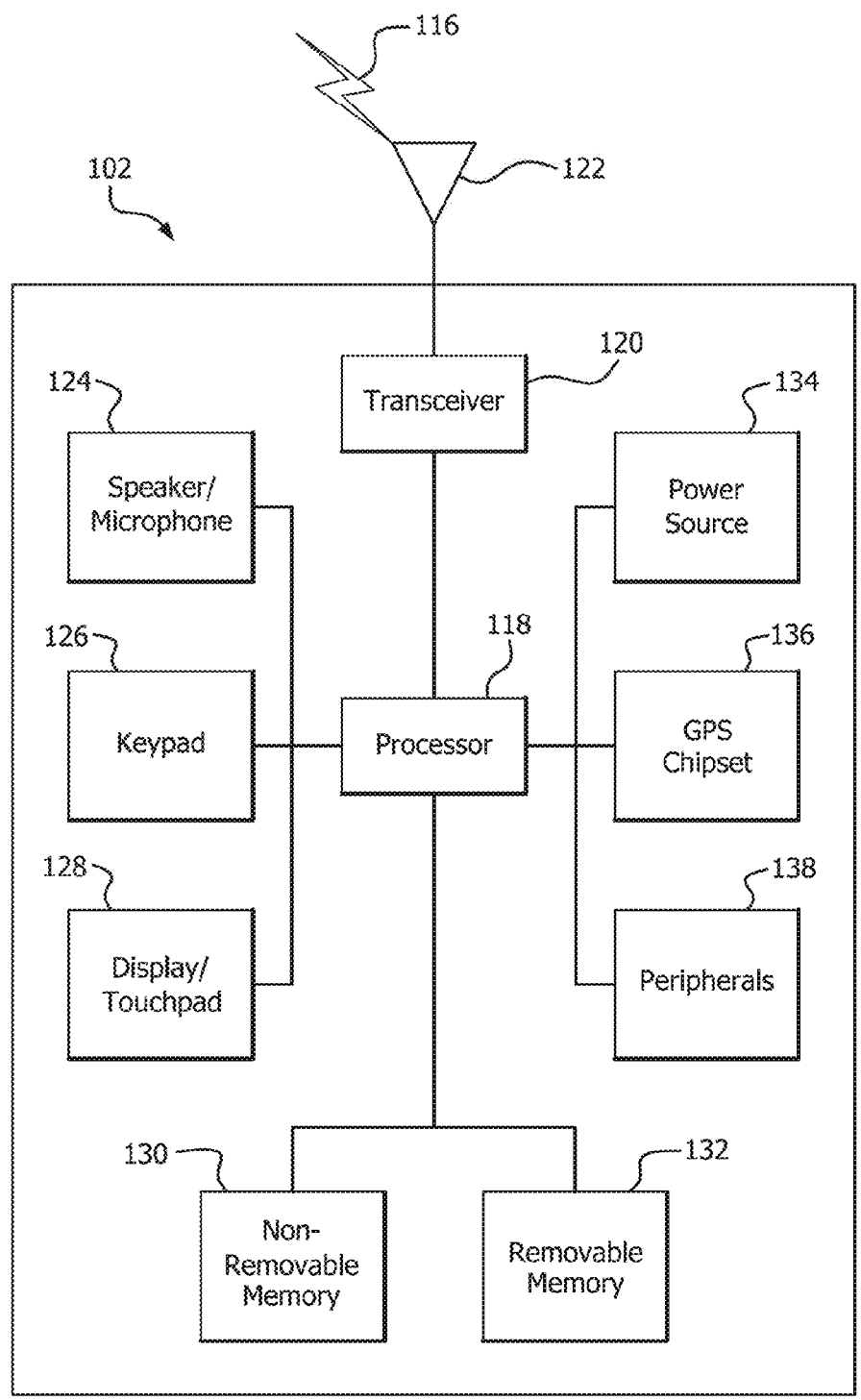
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
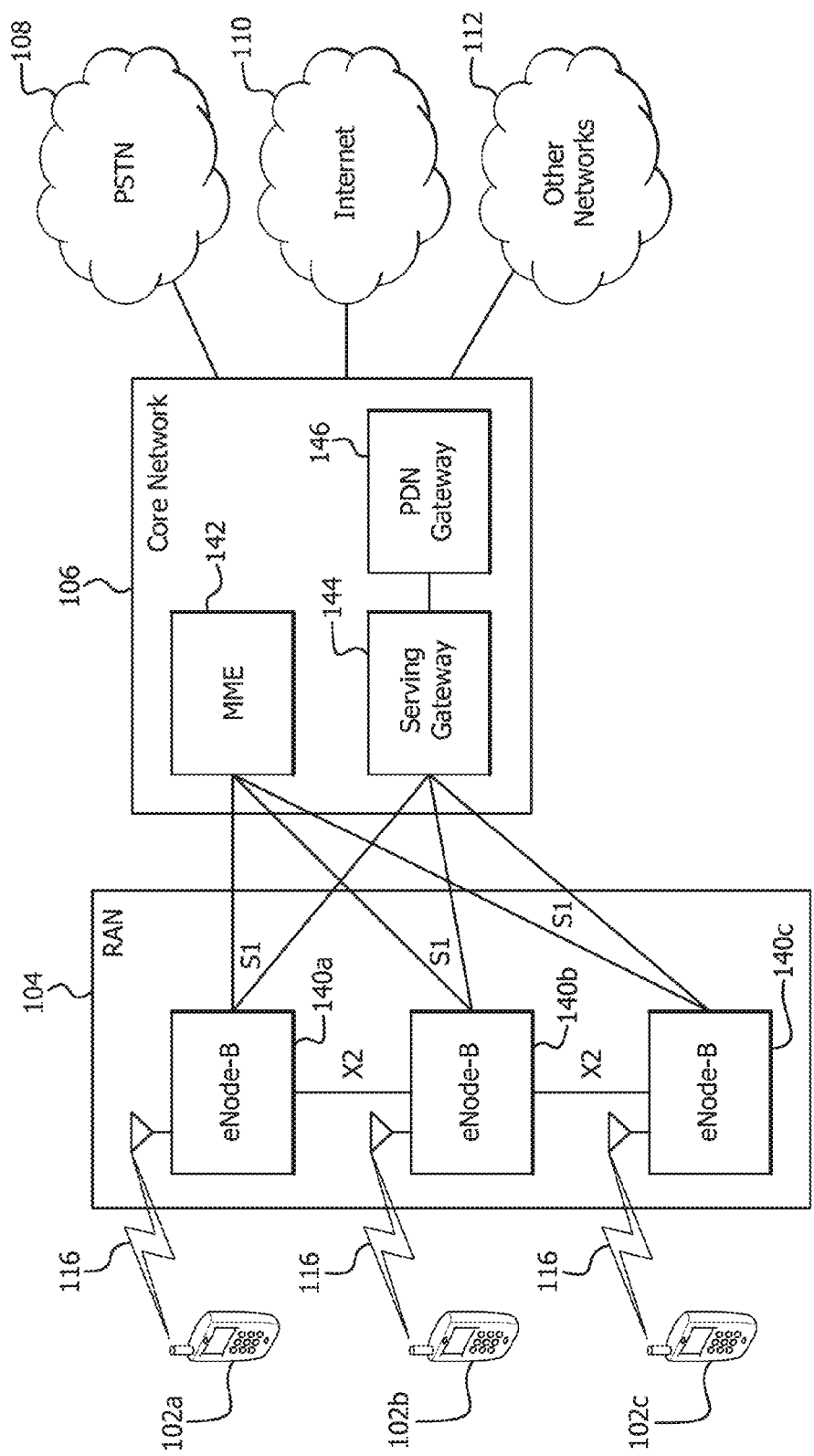
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Filtered-OFDM, (F-OFDM) is the use of a digital baseband filter after the OFDM modulator to combat the OOBE of a CP-OFDM based system. A matched filter may be added at the receiver side. In general, F-OFDM may reduce the OOBE of an OFDM signal for wireless communication systems having fixed spectrum bandwidth. It may be used for such systems, regardless of the fact that the sample rate transmit filtering incurs an increase in computational complexity. However, when it comes to opportunistically available and non-contiguous channels in a band which is shared by multiple users in both frequency domains and time domains, a typical situation for cognitive radio (CR) systems, filtered-OFDM may not be an effective solution. In such systems, a pre-defined transmit filter may not adequately reduce the energy leakage of certain unavailable frequencies (spectrum "holes"), when such frequencies are in the transmit filter's passband. Therefore, F-OFDM may not be suitable for wireless communication systems with agile spectrum, (i.e., when the transmit spectrum is non-contiguous with possible dynamically changed frequency bands of various sizes).

In addition to F-OFDM, several other sidelobe suppression techniques for non-contiguous OFDM (NC-OFDM) (i.e., OFDM with non-contiguous active subcarrier allocations, aiming for spectral agile systems) may be used. These sidelobe suppression techniques include guard subcarriers (GS), windowing, adaptive symbol transition (AST), constellation expansion (CE), cancellation carriers (CC), subcarriers weighting (SW), multiple-choice sequences (MCS), polynomial cancellation coding (PCC), spectral precoding (SP), extended active interference cancellation (EAIC), partial response signaling (PRS), N-continuous OFDM (NC), and power allocation schemes. These techniques may reduce OOBE for spectral agile systems. However, these techniques may have deficiencies, such as increased peak-to-average power ratio (PAPR), high computational complexity, decrease of throughput due to in-band distortion, etc. Furthermore, these techniques may not be suitable for high order modulations.

Filter bank multicarrier (FBMC) modulation techniques may be used to overcome the drawback of large OOBE in both contiguous and non-contiguous spectrum. Filter bank multicarrier is a family of MCM techniques in which a prototype filter, applying to each subcarrier (or tone), is designed to achieve a certain goal, such as minimizing inter-symbol interference OD, inter-carrier interference (ICI) and/or stop-band energy. OFDM may be considered a type of FBMC whose time domain prototype filter is a simple rectangular pulse. Other FBMC modulation techniques use transmit and receive prototype filters whose time duration is, in general, greater than the symbol duration. Therefore, in FBMC, the successive data symbols overlap in the time domain. By choosing a prototype filter other than the rectangular pulse used in OFDM, the peak of the sidelobes may be reduced. As a result, FBMC may provide better spectral shaping of the sub-bands. In FBMCs, orthogonality in time and frequency is maintained. One of the FBMCs that have been considered is filtered multi-tone modulation (FMT). FMT uses a guard band to maintain orthogonality between subcarriers. Therefore, FMT reduces OOBE at the cost of spectral efficiency loss.

Another FBMC that has been considered is OFDM-offset quadrature amplitude modulation (OFDM-OQAM). In OFDM-OQAM, subcarriers of the signal overlap each other to achieve a high spectral efficiency. Unlike OFDM, the real and imaginary parts of the quadrature amplitude modulation (QAM) symbols are processed separately with 2× symbol rate. A simple one-tap FDE may be sufficient for OFDM-OQAM when the multipath channel has short delay spread, but OFDM-OQAM incurs large throughput degradation when the channel has long delay spread. A more sophisticated multi-tap equalizer may be needed for channels with long delay spread, resulting in a large increase in complexity. Despite this, OFDM-OQAM may be used for cognitive radio and spectral agile systems for channels with relatively short delay spread, such as in an indoor environment. However, OFDM-OQAM has a much higher latency than other OFDM-based MCMs, which restricts its usage in some practical systems, such as WiFi.

Orthogonality in time and frequency may lower the design freedom of the waveform. Non-orthogonal MCMs have been considered. Examples of the non-orthogonal MCMs are the non-orthogonal frequency division multiplexing (NOFDM), and non-contiguous NOFDM (NC-NOFDM), its version for spectral agile systems. In NOFDM, overlapping of signal in time and frequency makes the time-frequency grid denser. By properly designing the transmitter-receiver pulse pairs, low OOBE may be achieved in NOFDM. Moreover, due to overlapping of signal in frequency domain, spectrum may be utilized more efficiently. However, the pulse shaping in NOFDM significantly increases the PAPR. Additionally, the filtering and ISI/ICI cancellation in NOFDM results in a high complexity increase when compared to OFDM.

Another example of a non-orthogonal MCM is generalized frequency division multiplexing (GFDM). GFDM is parallel single-carrier CP systems that are realized in digital domain. CP is used to enable one-tap FDE. Each subcarrier has a pair of transmit and receive filters. Between subcarriers, there is ICI. The ICI cancellation results in high complexity. Therefore, GFDM may experience in-band performance loss due to loss of orthogonality between subcarriers.

The aforementioned MCMs and sidelobe suppression techniques for better spectral containment share a common drawback of OFDM, low energy efficiency. These MCMs' large PAPR of the transmitted signals requires power amplifiers (PA) to have a large linear range. Otherwise, the nonlinearity may lead to signal distortion, which may cause larger out-of-band radiation and larger bit error rate (BER).

Several PAPR reduction methods have been considered in order to solve this problem. These PAPR reduction methods may be generally categorized into two groups, signal scrambling techniques and signal distortion techniques. Signal scrambling techniques include all variations of techniques for performing scrambling to decrease the PAPR. These signal scrambling techniques may include coding, interleaving, selective level mapping (SLM), partial transmit sequences (PTS), tone reservation, tone injection, etc. Side information may be needed for signal scrambling techniques, by which redundancy is introduced and the effective throughput is reduced. Signal distortion techniques may reduce high peaks by directly distorting the signal. These signal distortion techniques include clipping and filtering, companding, etc. However, OOBE may increase due to signal distortion, if the MCM signal is sensitive to PA nonlinearity.

There is a need for an advanced waveform for spectral agile systems that is capable of sharing opportunistically available and non-contiguous spectrum resources with the other users. The characteristics of such a waveform should include low OOBE, low in-band distortion, low complexity, low latency, low PAPR, robustness to frequency and timing asynchronous, robustness to PA nonlinearity, etc. For different practical systems, such as LTE and WiFi (802.11x), the advanced waveform may be tuned (by changing design parameters) to make different tradeoffs between the aforementioned criteria to satisfy the system requirements.

Embodiments disclosed herein are applicable to multicarrier modulation based systems, such as LTE, WiMAX, 802.11x, 802.15x, etc. and cognitive radio systems.

Figure 2A:
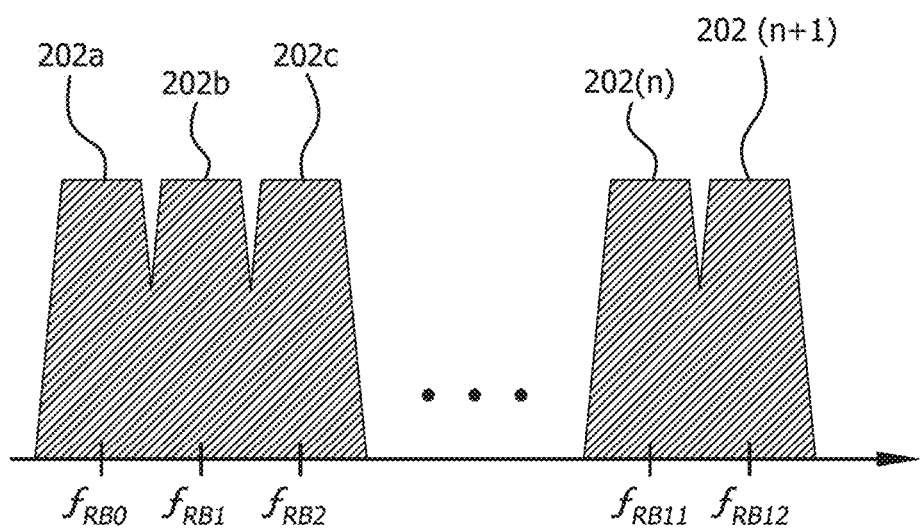
FIG. 2A shows an example of a non-contiguous spectrum divided into resource blocks of same size.
Figure 2B:
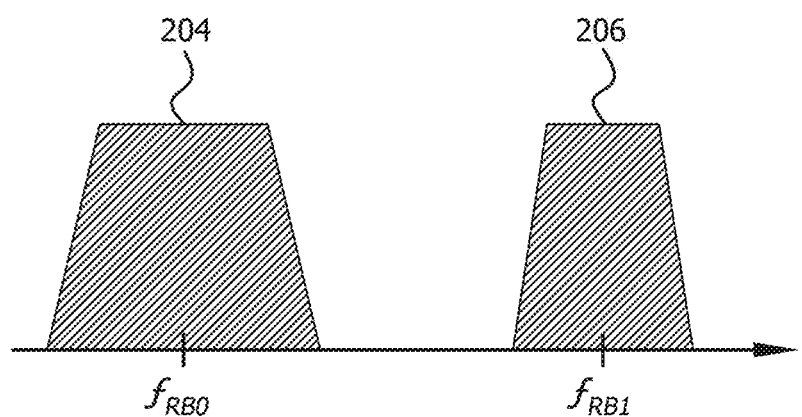
FIG. 2B shows an example of a non-contiguous spectrum divided into resource blocks of different sizes.

In filtered bank multicarrier (FBMC) modulation, the out-of-subcarrier emission is reduced by filtering at a per-subcarrier basis. In a multiple access system based on a multicarrier modulation schemes, each frequency resource may be partitioned into several groups, or resource blocks (RB), of several subcarriers (e.g., 12 subcarriers as one resource block in LTE). The amount of resources allocated to the users is based on the number of those RBs. The smallest granularity of the resource is a group of subcarriers, rather than a single subcarrier. The concept of RBs may be generalized as a group of subcarriers, where the RB size (i.e., the number of subcarriers) may vary for different RBs. As shown in FIG. 2A, a non-contiguous spectrum may be divided into RBs 202a, 202b, 202c, . . . , 202n, 202n+1, of the same size. Alternatively, as shown in FIG. 2B, a non-contiguous spectrum may be divided into RBs 204, 206 of different sizes. It is noted that one skilled in the art would understand that any number of RBs may be used, and that the RBs depicted in FIGS. 2A and 2B are for the reader's convenience. In other words, fewer or more RBs than depicted in FIGS. 2A and 2B may be used. Because the frequency resource is being partitioned into multiple RBs in a multiple access system based on a multicarrier modulation schemes, a waveform may be designed to reduce the out-of-RB emission so as to minimize the OOBE.

Figure 3:
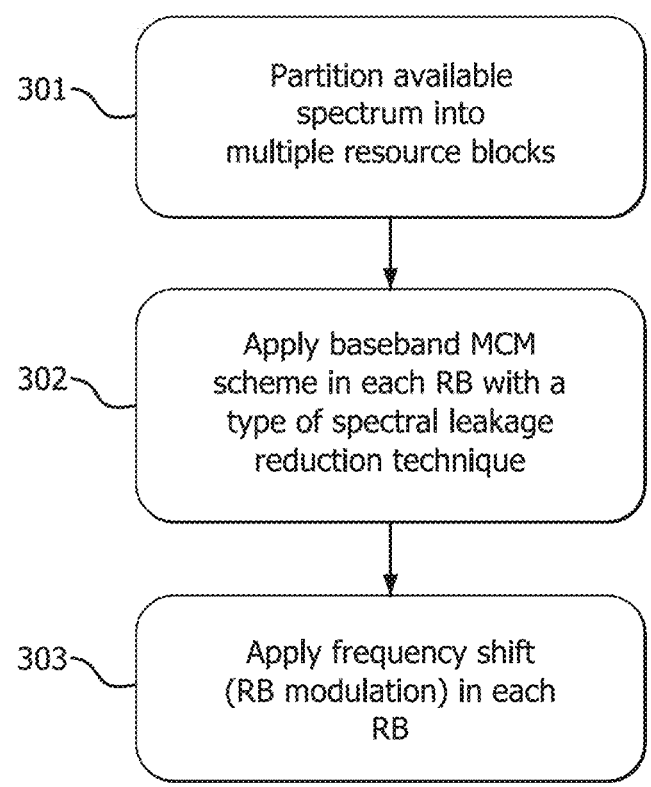
FIG. 3 is a flowchart diagram illustrating procedures for one embodiment of a RB-based waveform.

In one embodiment of such a RB-based waveform, as represented by the flowchart diagram in FIG. 3, the available spectrum (contiguous or non-contiguous) is partitioned into multiple RBs (block 301), a baseband MCM scheme is applied in each RB with a type of spectral leakage reduction technique (block 302), and frequency shift (RB modulation) is applied for each RB to modulate the signal from baseband to the frequency band of that RB (block 303). The signal power for each RB may be different to combat the fading of the channel or to control the interference to the adjacent channel.

Figure 4:
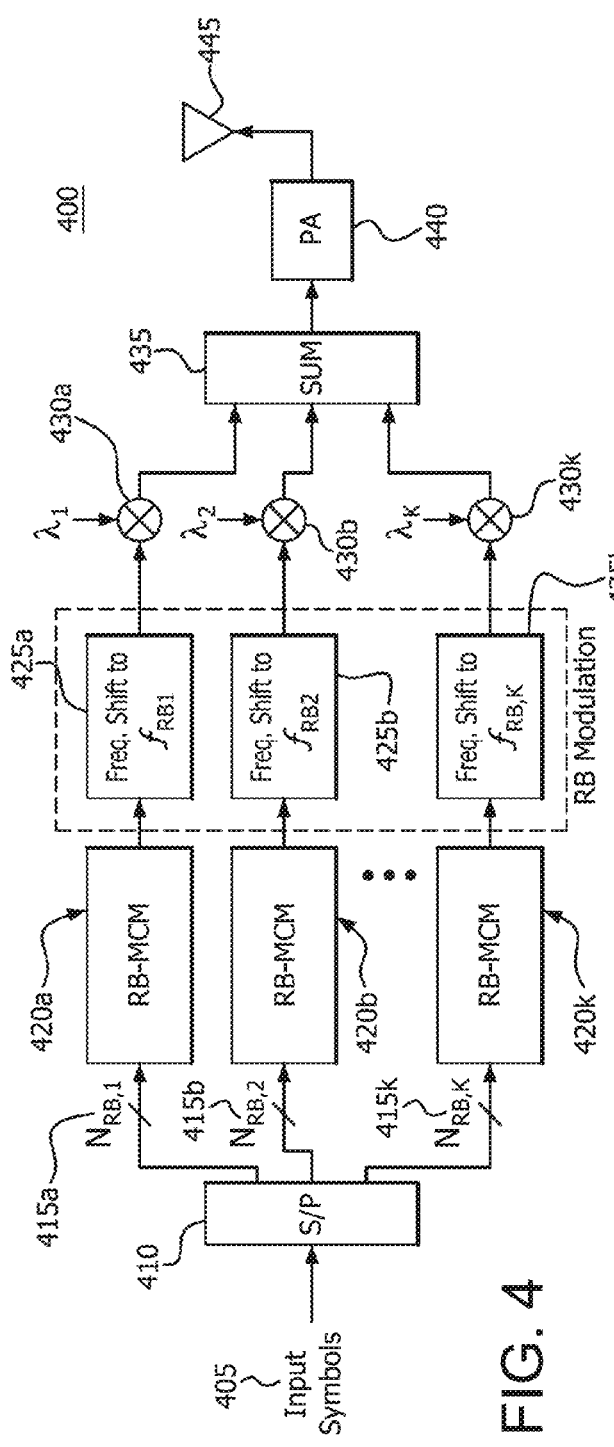
FIG. 4 is a block diagram of an example RB-based MCM transmitter.

FIG. 4 is a block diagram of an example RB-based MCM transmitter 400 arrangement in accordance with one embodiment. Referring to FIG. 4, input symbols 405 are partitioned at a serial-to-parallel (S/P) converter 410 into N resource blocks 415a, 415b, . . . , 415k. The input symbols 405 may be QAM modulated. A baseband multicarrier modulation (MCM) scheme is applied to each resource block 415a, 415b, . . . , 415k with a type of spectral leakage reduction technique at a RB-MCM unit 420a, 420b, . . . , 420k creating per-RB signals. Frequency shift (RB modulation) is then applied for each per-RB signal at an RB modulation unit 425a, 425b, . . . , 425k to modulate the per-RB signals from baseband to the frequency band of each respective RB, outputting per-RB modulated signals. The signal power for each RB may be different to combat the fading of the channel or to control the interference to the adjacent channel. As a result, the signal power of each RB may be multiplied by a power factor $\lambda_k$ at mixers 430a, 430b, . . . , 430k to scale the power of each per-RB signal. $f_{RB,k}$ represents the center frequency of $k^{th}$ RB, and $\lambda_k$ is the square root of the power for $k^{th}$ RB. Note that the multiplication by a power factor $\lambda_k$ at mixers 430a, 430b, . . . , 430k may take place prior to the application of the baseband multicarrier modulation scheme at RB-MCM units 420a, 420b, . . . , 420k; may take place after the application of the baseband multicarrier modulation scheme at RB-MCM units 420a, 420b, . . . , 420k, but before RB modulation at the RB modulation units 425a, 425b, . . . , 425k; or may take place after the RB modulation at the RB modulation unit 425a, 425b, . . . , 425k as shown in FIG. 4. The per-RB modulated signals may then be summed at a summing unit 435 to form a transmit signal which may be amplified at power amplifier (PA) 440 for transmission, via antenna 445.

Figure 5:
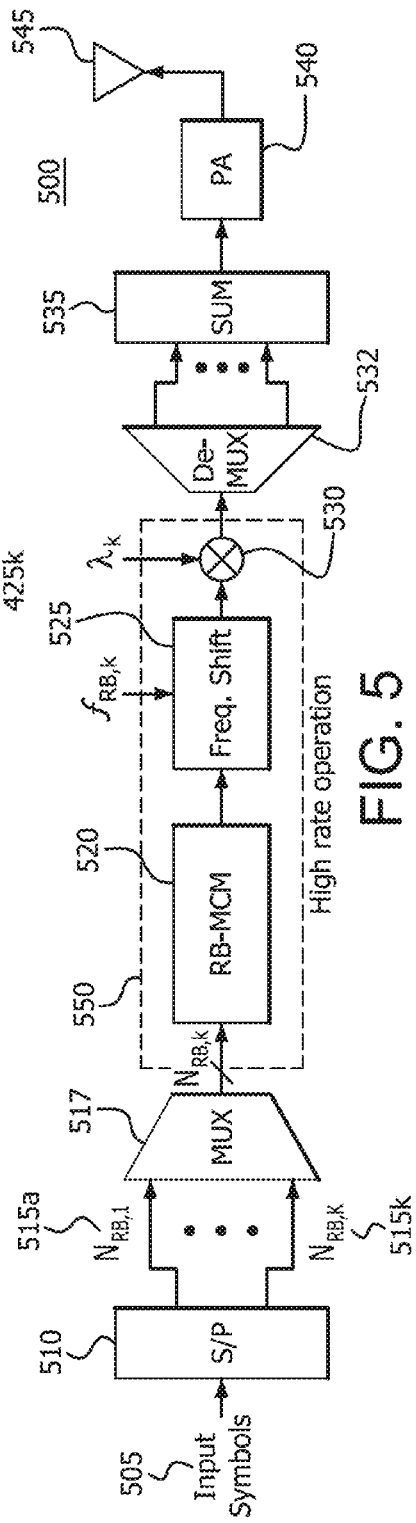
FIG. 5 is a block diagram of an example RB-based MCM transmitter that reuses one RB-MCM module.

In a practical implementation of the RB-based MCM transmitter of FIG. 4, a single RB-MCM module 550 may be used to generate per-RB modulated signals for all RBs at a high rate. FIG. 5 is a block diagram of a RB-based MCM transmitter 500 that reuses a single RB-MCM module 550. The RB-MCM module 550 performs the MCM and RB modulation operations to generate per-RB modulated signals for all RBs at a high rate. Referring to FIG. 5, input symbols 505, which may be QAM modulated, are partitioned into N RBs 515a . . . , 515k at a serial-to-parallel (S/P) converter 510 and are selected by a multiplexer (MUX) 517 for input into the RB-MCM module 550. The RB-MCM module comprises a RB-MCM unit 520, that applies a baseband MCM scheme to each selected resource block 515a, . . . , 515k with a type of spectral leakage reduction technique; a RB modulation unit 525 that modulates the per-RB signal from baseband to the frequency band of each respective RB; and a mixer 530 that multiplies the signal power of each RB by a power factor $\lambda_k$ to scale the power of each per-RB signal. $f_{RB,k}$ represents the center frequency of $k^{th}$ RB, and $\lambda_k$ is the square root of the power for $k^{th}$ RB. The multiplication by a power factor $\lambda_k$ at mixer 530 may take place prior to the application of the baseband multicarrier modulation scheme at RB-MCM unit 520; may take place after the application of the baseband multicarrier modulation scheme at RB-MCM unit 520, but before RB modulation at the RB modulation unit 525; or may take place after the RB modulation at the RB modulation unit 525, as shown in FIG. 5. A demultiplexer (DMUX) 532 outputs each per-RB modulated signal. The process is repeated for each of the N RBs 515a, . . . , 515k. Each per-RB modulated signal output by the DMUX 532 is then summed together at a summing unit 535 to form a transmit signal which may be amplified at PA 540 for transmission, via antenna 545.

Figure 6:
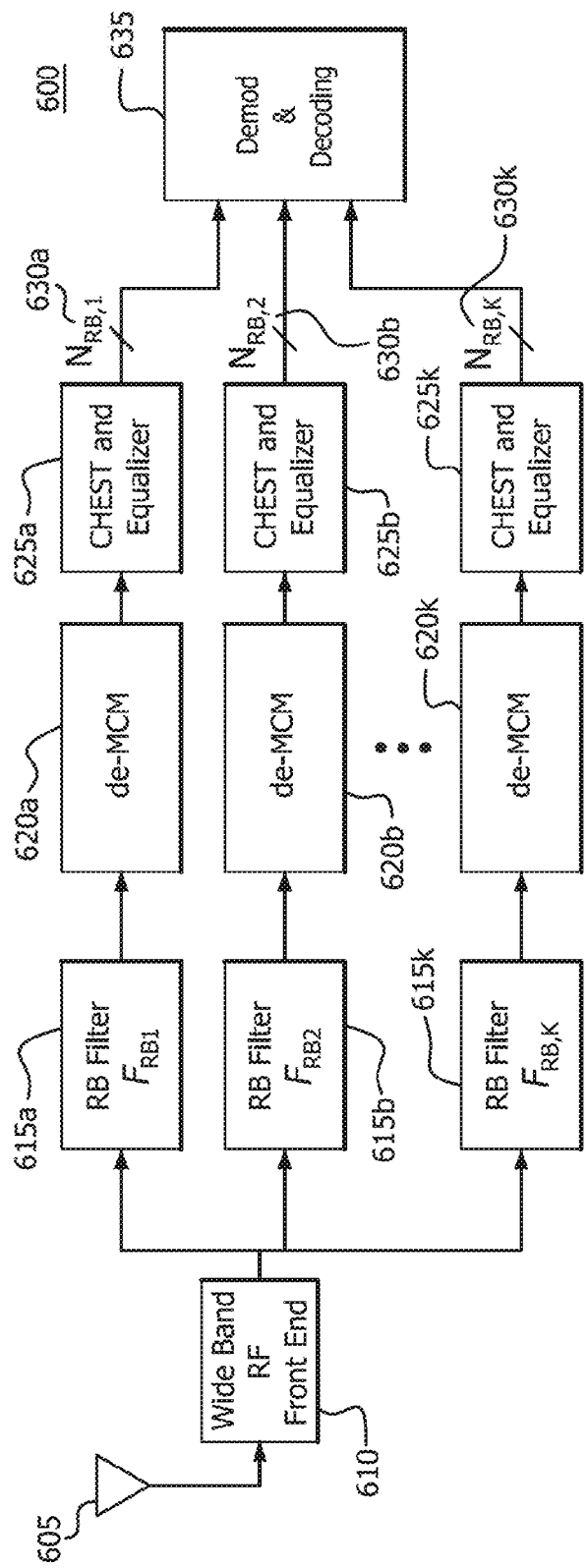
FIG. 6 is a block diagram of an example RB-based MCM receiver in accordance with one embodiment.

FIG. 6 is a block diagram of an example RB-based MCM receiver 600 corresponding to the RB-based MCM transmitter 400 depicted in FIG. 4. Referring to FIG. 6, a signal is received by an antenna 605 connected to a wide-band radio-frequency (RF) front-end unit 610, which outputs total received baseband signals to RB filters 615a, 615b, . . . , 615k which demodulate each respective RB from the frequency band of that RB to a baseband frequency. The RB filter $F_{RB,k}$, is centered at $f_{RB,k}$ and has the bandwidth equal to $N_{RB,k}$ subcarriers for k=1, . . . , K. A multicarrier demodulation process may be applied to the filtered per-RB signals at de-MCM units 620a, 620b, . . . , 620k. The channels that all RBs go through are then estimated using the demodulated per-RB signals and equalized at a channel estimation (CHEST) and equalizer unit 625a, 625b, . . . , 625k, which outputs the estimated symbols for all K RBs 630a, 630b, . . . , 630k. Those estimated symbols are then demodulated and decoded at a demodulating and decoding unit 635 outputting demodulated symbols. The demodulating unit may be a QAM demodulating unit if the signal was modulated using QAM at the transmitter side. It should be appreciated that a high rate operation receiver arrangement may also be used. In such a high rate receiver, a single module may contain a single RB filter, a single de-MCM unit, and a single CHEST and equalizer unit. A demultiplexer (DMUX) may be added to output per-RB estimated symbols.

Low in-band distortion, low out-of-RB spectral leakage, low latency, and low complexity are some of the design goals for the RB-MCM units 420a, 420b, . . . , 420k, 520, 720a, 720b, . . . , 720k. To achieve low in-band distortion, the ISI due to multipath fading may be mitigated by using CP or symbol extension. The ICI for subcarriers within one RB may be minimized by frequency domain modulation (e.g., OFDM or other MCMs that have orthogonality between subcarriers) and advanced equalization techniques. If non-orthogonal MCM is used for each RB, the ICI for subcarriers within one RB may also be minimized by de-correlation or ICI cancellation, as in NOFDM and GFDM. To achieve low out-of-RB spectral leakage, a spectral leakage reduction technique may be applied to the per-RB signal, such that the ICI for subcarriers in different RBs is minimized, and that the OOBE for the entire transmit signal is minimized. For example, such spectral leakage reduction techniques may include: time domain filtering (which is similar to Filtered-OFDM), time domain windowing, spectral precoding, or specific pulse shaping for OFDM.

To achieve low latency and complexity, the transmit signal provided by the spectral leakage reduction technique may be localized in both time and frequency. For example, if time domain filtering is used, the filter may be short compared to the symbol duration. Moreover, overall complexity may be further minimized by generating a low rate per-RB signal and then up-converting it to high rate, since the bandwidth of each RB is smaller compared to the occupied bandwidth of the transmit signal.

For the RB-MCM with spectral leakage reduction, time domain filtering may be used. Per-RB complex data streams may go through an inverse fast Fourier transform (IFFT) operation, followed by CP insertion and time domain filtering to generate the per-RB signal.

Alternatively, time domain windowing may be used. Per-RB complex data streams may go through an IFFT operation, followed by time domain windowing and CP insertion to generate the per-RB signal. Even though windowing is a time domain operation that does not depend on a RB based structure, the RB based structure allows some design flexibility to achieve lower PAPR.

Alternatively, spectral precoding may be used. Per-RB complex data streams may go through spectral precoding before an IFFT operation and CP insertion to generate the per-RB signal.

Alternatively, pulse shaping may be used. Symbol extension may be applied to per-RB complex data streams before a specific pulse shaping, followed by subcarrier modulation. Even though the pulse shaping technique is applied on a per-subcarrier basis and does not depend on a RB based structure, the RB based structure allows some design flexibility to achieve lower PAPR.

Furthermore, since the transmit signal is the sum of the per-RB signals, the RB based structure provides additional degrees of freedom to reduce PAPR. Due to relatively smaller RB size, coding techniques may be used for PAPR reduction without signal distortion. Coding has been shown to be an effective way to achieve PAPR reduction, but the coding design is generally subject to high complexity issues due to the large number of subcarriers. Some PAPR reduction techniques, such as SLM and PTS, may be combined with the RB based structure without incurring large additional complexity because the number of per-RB signals is far less than the number of subcarriers in the system.

Figure 7:
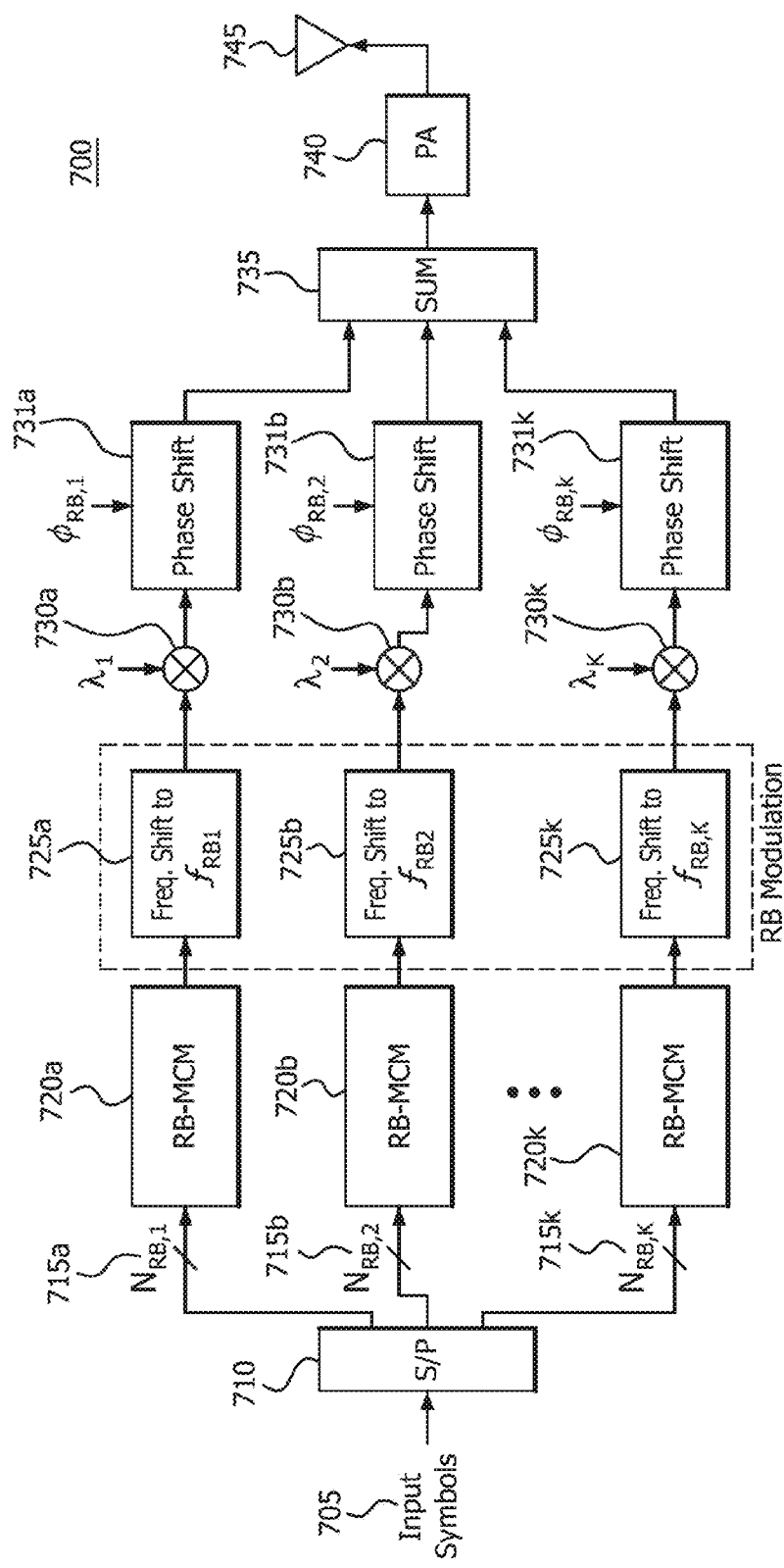
FIG. 7 is a block diagram of an example RB-based MCM transmitter using selective level mapping (SLM) or partial transmit sequence (PTS)

FIG. 7 is a block diagram of one example of the RB-based MCM transmitter using SLM or PTS 700. Referring to FIG. 7, the RB-based MCM transmitter 400 arrangement of FIG. 4 is slightly altered to comprise phase shift units 731a, 731b, . . . , 731k. Similar to the RB-based MCM transmitter 400 arrangement of FIG. 4, the RB-based MCM transmitter using SLM or PTS may comprise a serial-to-parallel (S/P) converter 710, RB-MCM units 720a, 720b, . . . , 720k, RB modulation units 725a, 725b, . . . , 725k, and mixers 730a, 730b, . . . , 730k. SLM or PTS may be employed at the phase shift units 731a, 731b, . . . , 731k. Referring to FIG. 7, input symbols 705, which may be QAM modulated, are partitioned into N RBs 715a, 715b, . . . , 715k at a serial-to-parallel (S/P) converter 710 and are input into the respective RB-MCM units 720a, 720b, . . . , 720k. A baseband MCM scheme is applied to each resource block 715a, 715b, . . . , 715k with a type of spectral leakage reduction technique creating per-RB signals. Frequency shift (RB modulation) is then applied for each per-RB signal at an RB modulation unit 725a, 725b, . . . , 725k to modulate the per-RB signal from baseband to the frequency band of each respective RB, outputting per-RB modulated signals. The signal power for each RB may be different to combat the fading of the channel or to control the interference to the adjacent channel. As a result, the signal power of each RB may be may be multiplied by a power factor $\lambda_k$ at mixers 730a, 730b, . . . , 730k to scale the power of each per-RB modulated signal. PAPR reduction techniques SLM or PTS may then be applied at phase shift units 731a, 731b, . . . , 731k. $f_{RB,k}$ represents the center frequency of $k^{th}$ RB, and $\lambda_k$ is the square root of the power for $k^{th}$ RB. Note that the multiplication by a power factor $\lambda_k$ at mixers 730a, 730b, . . . , 730k may take place prior to the application of the baseband multicarrier modulation scheme at RB-MCM units 720a, 720b, . . . , 720k; may take place after the application of the baseband multicarrier modulation scheme at RB-MCM units 720a, 720b, . . . , 720k, but before RB modulation at the RB modulation units 725a, 725b, . . . , 725k; or may take place after the RB modulation at the RB modulation units 725a, 725b, . . . , 725k as shown in FIG. 7. Each per-RB modulated signal is output by each respective phase shift unit 731a, 731b, . . . , 731k. Each per-RB modulated signal is then summed together at a summing unit 735 to form a transmit signal which may be amplified at PA 740 for transmission, via antenna 745. Besides the signal distortion-less PAPR reduction techniques, certain signal distorted PAPR reduction techniques, such as clipping and filtering, and companding may be used as well.

It should be appreciated that a high rate operation transmitter arrangement using SLM or PTS may also be used. In such a transmitter, the RB-MCM module 550 of FIG. 5 that performs the MCM and RB modulation operations to generate per-RB modulated signals for all RBs at a high rate may be slightly modified to include a single phase shift unit with operations as described above.

Figure 40:
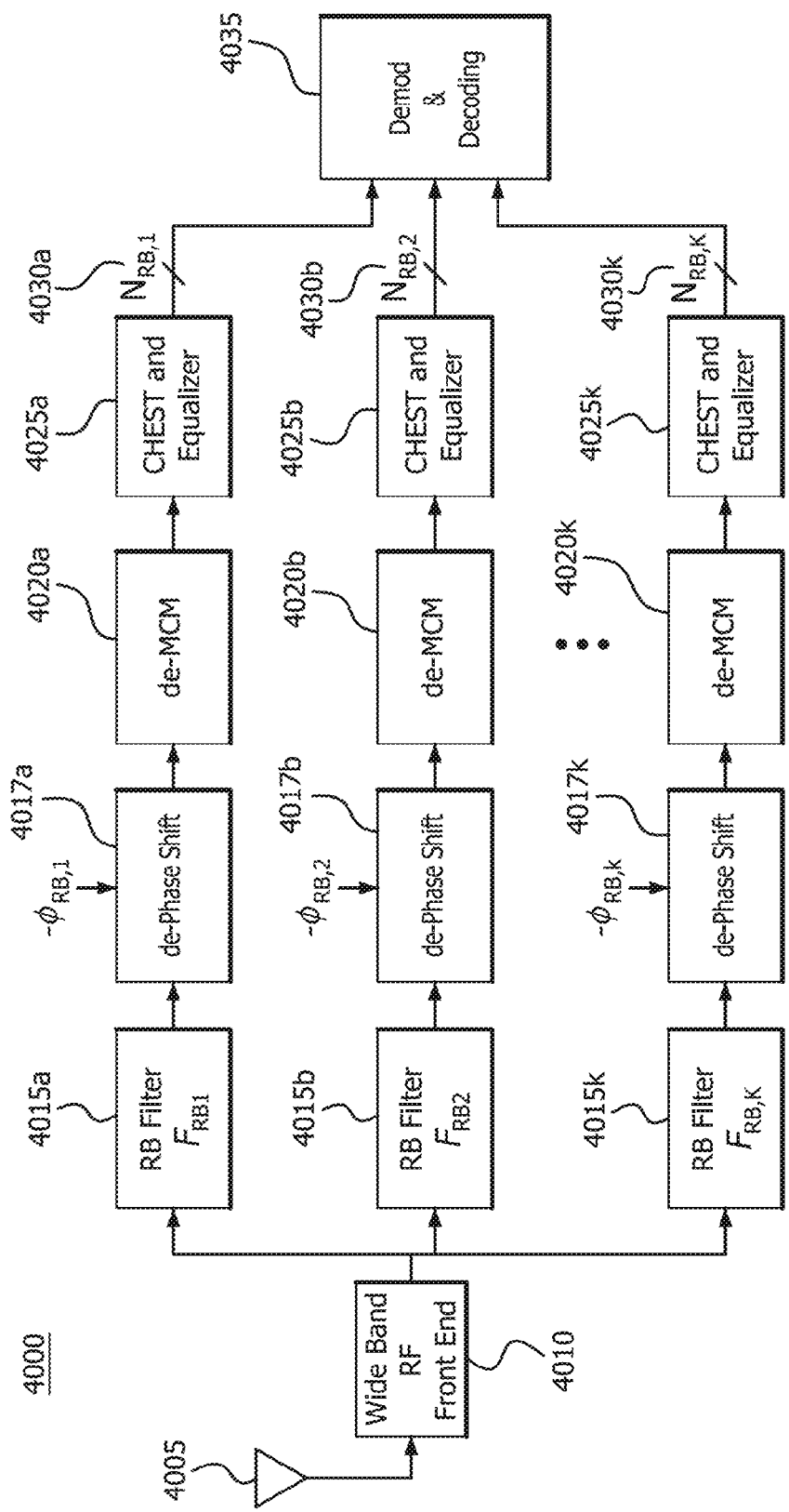
FIG. 40 is a block diagram of an example RB-based MCM receiver using selective level mapping (SLM) or partial transmit sequence (PTS) corresponding to the transmitter of FIG. 7.

Referring ahead to FIG. 40, FIG. 40 is a block diagram of an example RB-based MCM receiver using selective level mapping (SLM) or partial transmit sequence (PTS) 4000 corresponding to the RB-based MCM transmitter 700 depicted in FIG. 7. Referring to FIG. 40, a signal is received by an antenna 4005 connected to a wide-band radio-frequency (RF) front-end unit 4010, which outputs total received baseband signals to RB filters 4015a, 4015b, . . . , 4015k which demodulate each respective RB from the frequency band of that RB to a baseband frequency. The RB filter $F_{RB,k}$ is centered at $f_{RB,k}$ and has the bandwidth equal to $N_{RB,k}$ subcarriers for k=1, . . . , K. The de-phase shift process is applied at de-phase shift units 4017a, 4017b, . . . , 4017k. A multicarrier demodulation process may be applied to the filtered per-RB signals at de-MCM units 4020a, 4020b, . . . , 4020k. The effective channels that each RB goes through are then estimated using the demodulated per-RB signals and equalized at a channel estimation (CHEST) and equalizer unit 4025a, 4025b, . . . , 4025k, which outputs the estimated symbols for all K RBs 4030a,

4030b, ..., 4030k. Those estimated symbols are then demodulated and decoded at a demodulating and decoding unit 4035 outputting demodulated symbols. The demodulating unit may be a QAM demodulating unit if the signal was modulated using QAM at the transmitter side. It should be appreciated that a high rate operation receiver arrangement may also be used. In such a high rate receiver, a single module may contain a single RB filter, a single de-phase shift unit, a single de-MCM unit, and a single CHEST and equalizer unit. A demultiplexer (DMUX) may be added to output per-RB estimated symbols.

Figure 8B:
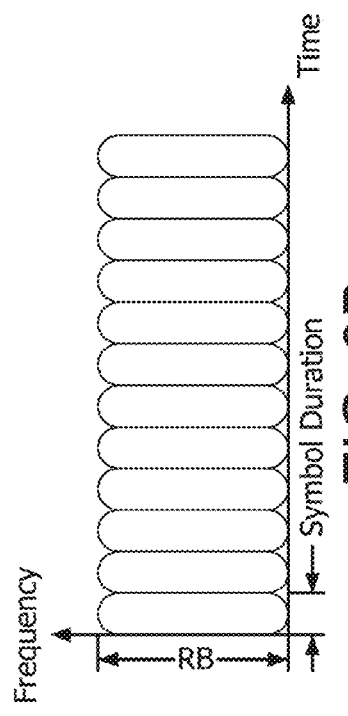
FIG. 8B shows an example of single carrier modulation within each RB.
Figure 8D:
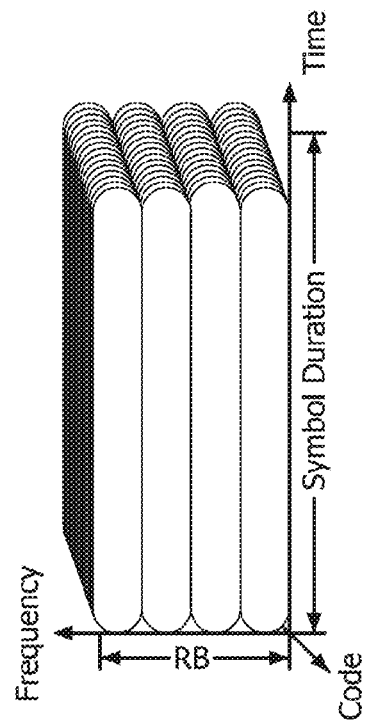
FIG. 8D shows an example of coded multicarrier modulation within each RB.
Figure 8A:
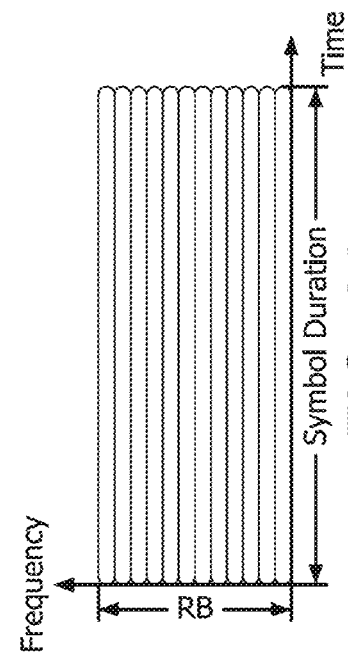
FIG. 8A shows an example of multicarrier modulation (MCM) within each RB.
Figure 8C:
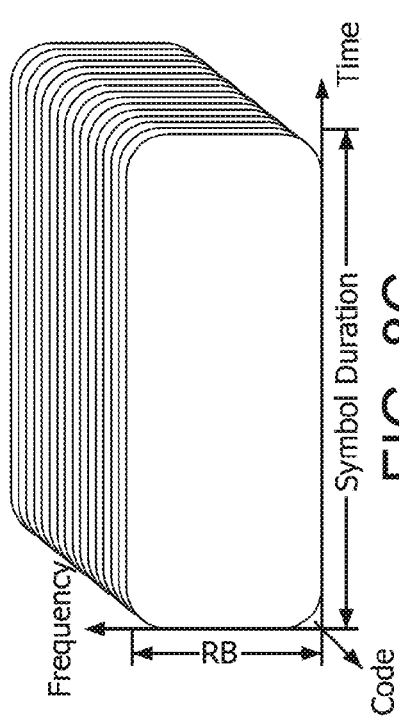
FIG. 8C shows an example of single carrier modulation with CDMA within each RB.

Using MCM for each RB may be extended to single carrier modulation, or coded single or multicarrier modulation and their combination. Referring back to FIGS. 8A-8D, FIGS. 8A-8D show example modulation schemes within each RB. It should be appreciated that different RBs may use different modulation schemes. In FIGS. 8A-8D, QAM symbols are represented by each rounded rectangle. FIG. 8A shows an example of multicarrier modulation (MCM) within each RB. FIG. 8B shows an example of single carrier modulation within each RB. FIG. 8C shows an example of single carrier modulation with CDMA within each RB. FIG. 8D shows an example of coded multicarrier modulation within each RB.

Examples of RB-based MCM waveforms including the RB-based filtered-OFDM (RB-F-OFDM), the RB-based single carrier modulation (RC-SCM), and the RB based precoded OFDM (RB-P-OFDM) are disclosed herein.

In one example of the RB-based filtered-OFDM (RB-F-OFDM) waveform, the filtered-OFDM (F-OFDM) signal of each RB may be generated independently, each with good spectral containment and low latency.

In RB-F-OFDM, the signal of each RB is modulated and filtered individually and then summed together to form a transmit signal. It is assumed that each RB consists of $M_1$ subcarriers. The RBs are labeled 0, 1st, 2nd, ..., kth, ..., (K−1)th RBs, where K is the maximum number of available RBs. The maximum number of subcarriers $M=KM_1$. The normalized center frequency of the kth RB is $$f_k = \frac{m_k}{L},\qquad \text{Equation (1)}$$

where $m_k$ is the center subcarrier of the kth RB and is not necessarily an integer; and L is the number of samples per symbol duration. The nth data symbol vector (an M×1 vector) is defined as:

$$S[n]=[S_0[n]S_1[n]\ldots S_{K-1}[n]]^T, \qquad \text{Equation (2)}$$

where the nth data symbol vector for the kth RB is an $M_1 \times 1$ vector defined as:

$$S_k[n]=[S_{k0}[n]S_{k1}[n]\ldots S_{k,M_1-1}[n]]^T. \qquad \text{Equation(3)}$$

When the kth RB is available for transmission and has data loaded, $S_k[n]\neq 0$. When the kth RB is not available for transmission, $S_k[n]=0$.

Figure 9:
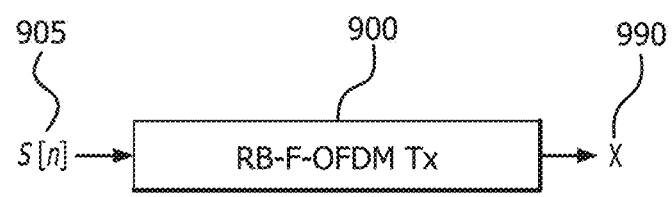
FIG. 9 is a representation of an RB based filtered-OFDM transmitter (RB-F-OFDM Tx)

FIG. 9 is a representation of an RB based filtered-OFDM transmitter (RB-F-OFDM Tx) 900. Referring to FIG. 9, the RB-F-OFDM Tx 900 modulates each symbol vector S[n] 905 RB by RB, independently, to form transmit signal x 990 which is the transmit signal of sampling duration $$T_s = \frac{T}{L},$$

where T is the symbol duration and L is a power of 2.

Figure 10:
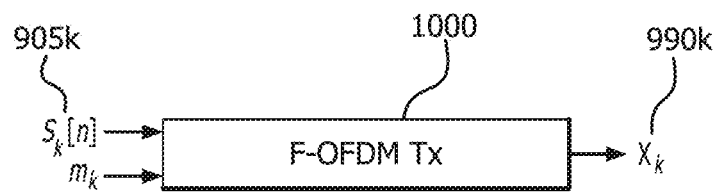
FIG. 10 is a representation of an F-OFDM transmit module (F-OFDM Tx) being used for each RB.

FIG. 10 is a representation of a filtered-OFDM transmit module (F-OFDM Tx) 1000 to be applied to each RB. Multiple per-RB filtered-OFDM transmit modules may be comprised within the RB-F-OFDM Tx 900, as described below and in FIG. 12. The F-OFDM Tx 1000 performs the MCM and RB modulation operations for each respective RB. Thus, in the example RB-F-OFDM transmitter 900, each respective symbol vector 905k represented as $S_k[n]$, k=0, 1, ..., K−1, is modulated and filtered by per-RB filtered-OFDM transmit modules 1000 to form per-RB filtered modulated signals $x_k$ 990k, that when summed together form transmit signal x 990. Thus, the transmit signal x 990 is given as $$x=\Sigma_{k=0}^{K-1}x_k. \qquad \text{Equation (4)}$$

Figure 11:
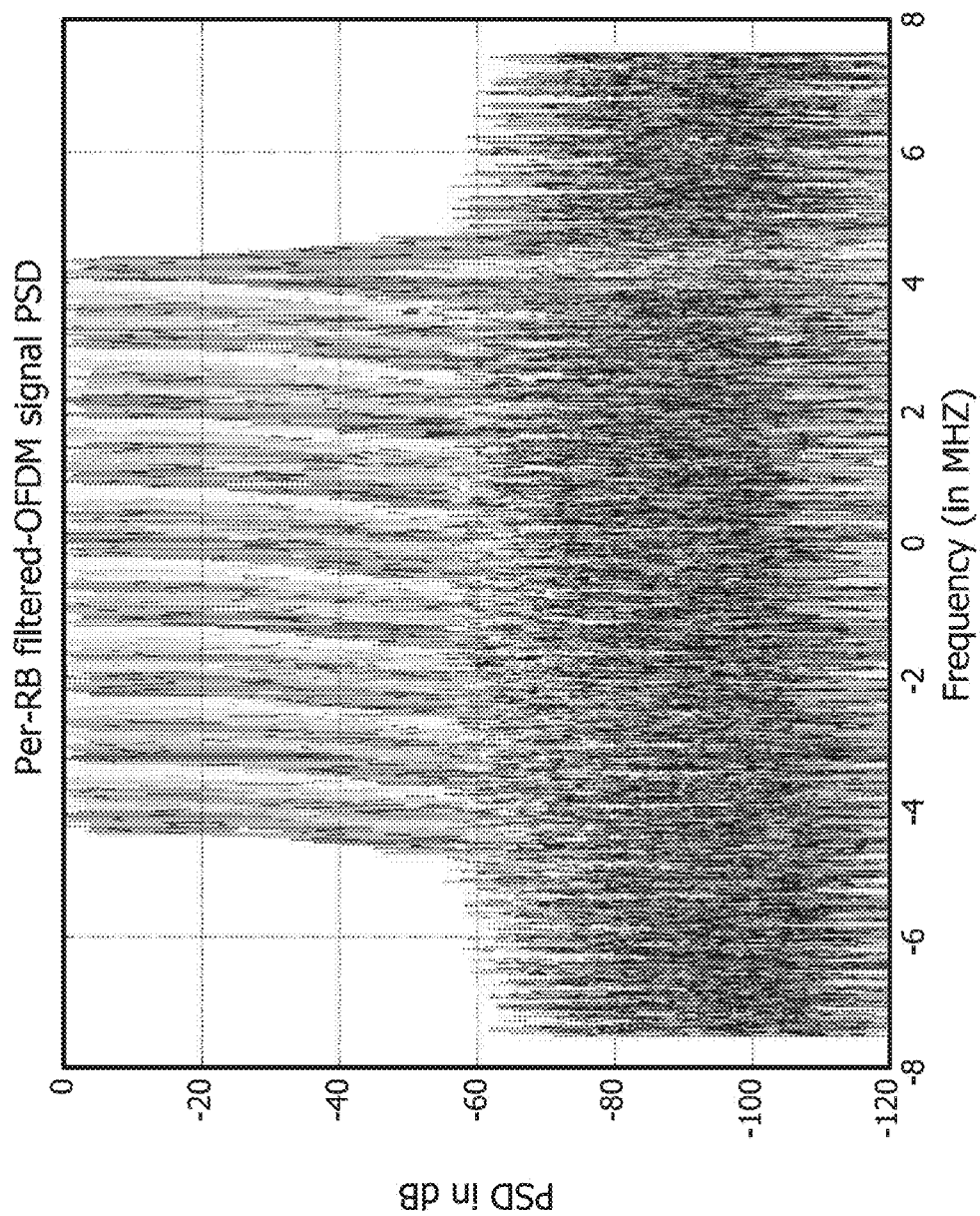
FIG. 11 shows the PSD of per-RB filtered modulated signals forming an RB-F-OFDM transmit signal.

FIG. 11. illustrates the PSD of per-RB filtered modulated signals forming the RB-F-OFDM transmit signal from values −120 dB to 0 dB over a frequency range of −8 MHz to 8 MHz.

Figure 12:
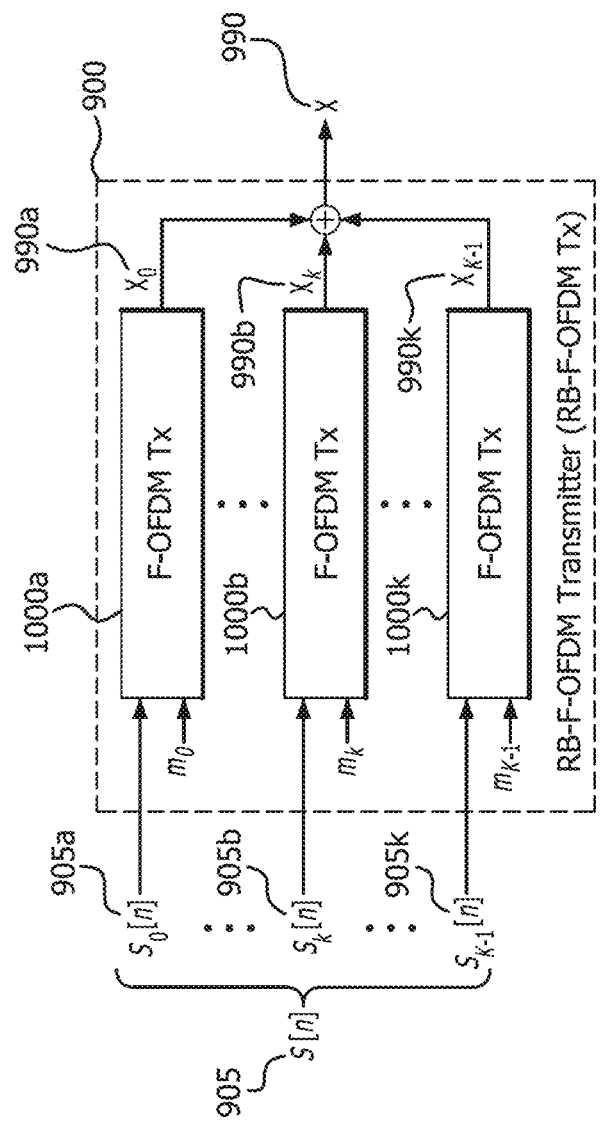
FIG. 12 is an example structure of an RB-F-OFDM transmitter with the per-RB filtered-OFDM transmit module (F-OFDM Tx)

FIG. 12 is a block diagram of an example structure of an RB-F-OFDM Tx 900. Referring to FIG. 12, the RB-F-OFDM Tx 900 comprises multiple filtered-OFDM transmit modules (F-OFDM Tx) 1000a, 1000b, ..., 1000k, one for each RB, which output per-RB multicarrier modulated signals $X_k$ 990a, 990b, ..., 990k for each RB from the respective symbol vectors 905a, 905b, ..., 905k of each RB. The per-RB multicarrier modulated signals 990a, 990b, ..., 990k form transmit signal x 990 by summing them together. The RB-F-OFDM Tx 900 is different than the CP-OFDM or filtered-OFDM transmitter, in that the per-RB filtered-OFDM transmit modules 1000a, 1000b, ..., 1000k, comprised in the RB-F-OFDM transmitter 900, each only modulate the subcarriers in one RB and therefore, the low-rate OFDM signal may be generated and then up-converted to high rate, which will be explained in detail below.

Figure 13:
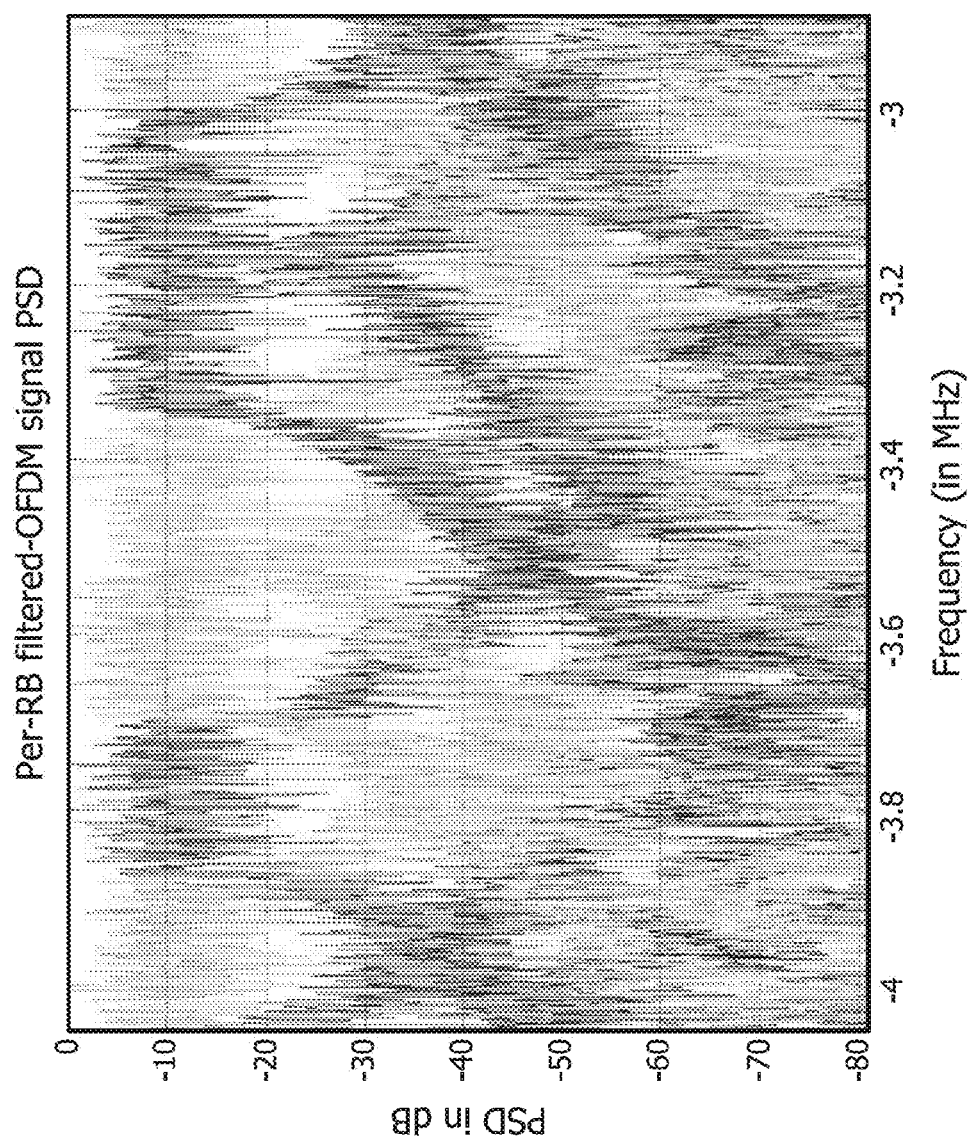
FIG. 13 shows power spectrum density (PSD) of per-RB filtered-OFDM signal components.

Each per-RB multicarrier modulated signal $x_k$ 990a, 990b, ..., 990k only has a signal overlapping its adjacent RBs but not the RBs beyond its adjacent RBs, (i.e., $x_k$ overlaps $x_{k-1}$ and $x_{k+1}$). It is assumed that a per-RB transmit filter brings the signal leakage of a per-RB multicarrier modulated signal to its non-adjacent RBs to be negligible. The signal overlap between adjacent RBs may not create inter-subcarrier interference due to orthogonality between subcarriers in different RBs. This is shown in FIG. 13. More specifically, FIG. 13 shows power spectrum density (PSD) of per-RB filtered-OFDM signal components from values −80 dB to 0 dB over a frequency range of −4 MHz to −3 MHz.

Figure 14:
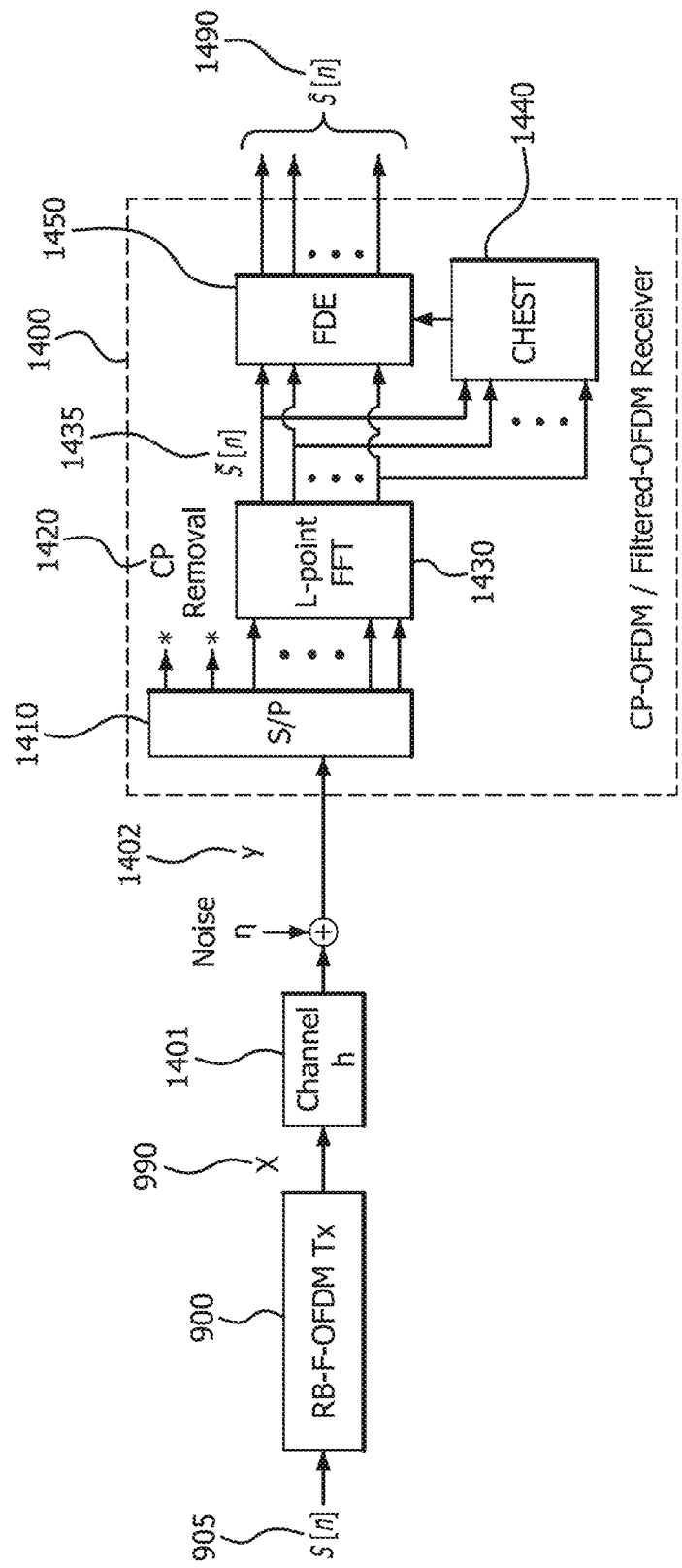
FIG. 14 is an example RB-F-OFDM system with a cyclic prefix (CP)-OFDM/filtered-OFDM receiver.

FIG. 14 is a block diagram of an example RB-F-OFDM system with a CP-OFDM/Filtered-OFDM receiver. Referring to FIG. 14, the RB-F-OFDM transmitter 900, despite the filtering, modulates each symbol vector 905 to the same subcarrier as it is modulated in CP-OFDM using an L-point IFFT. Therefore, the CP-OFDM/Filtered-OFDM receiver 1400 may be used to demodulate the transmit signal 990. The transmit signal x 990 is sent over channel h 1401. Noise from the environment may be added to the signal. The CP-OFDM/Filtered-OFDM receiver 1400 receives the signal y 1402. As shown in FIG. 14, the CP-OFDM/Filtered-OFDM receiver 1400 may comprise a serial-to-parallel (S/P) converter 1410, a CP removal unit 1420, a L-point FFT unit 1430 that outputs demodulated symbol vectors 1435, a simple channel estimation (CHEST) unit 1440 as in CP-OFDM/filtered-OFDM to estimate the equivalent channel of the demodulated symbols including the RB-based transmit filter and over-the-air-multipath channel, and a FDE unit 1450 as in CP-OFDM/Filtered-OFDM to equalize the equivalent channel and yield estimates of the original symbols Ŝ[n] 1490. The FDE unit 1450 may be a one-tap FDE unit. Thus, the CP-OFDM/filtered-OFDM receiver outputs estimates of the original symbols Ŝ[n] 1490.

Alternatively, a RB-F-OFDM specific receiver based on per-RB matched filtering may be used to improve SINR. FIG. 15 is a representation of a RB based filtered-OFDM receiver (RB-F-OFDM Rx) 1500 based on per-RB matched filtering. The RB-F-OFDM Rx 1500 demodulates the received multicarrier modulated signal y 1505 into demodulated per-RB symbol vectors 1590.

FIG. 16 is a representation of a per-RB filtered-OFDM receive module (F-OFDM Rx) 1600. Multiple per-RB F-OFDM receive modules may be comprised within the RB-F-OFDM Rx 1500, as described below and as shown in FIG. 17. The F-OFDM Rx 1600 performs the deMCM and RB filtering operations for each received multicarrier modulated signal y 1505 to generate per-RB demodulated symbol vectors 1590k.

FIG. 17 is a block diagram of an example RB-F-OFDM receiver (RB-F-OFDM Rx) 1500. Referring to FIG. 17, the RB-F-OFDM receiver 1500 comprises per-RB F-OFDM receive modules 1600a, 1600b, . . . , 1600k which output per-RB demodulated symbol vectors 1590a, 1590b, . . . , 1590k for each RB from the received multicarrier modulated signal y 1505. The RB-F-OFDM receiver 1500, based on per-RB matched filtering, is different than the CP-OFDM/Filtered-OFDM receiver 1400, because the per-RB F-OFDM receive modules 1600a, 1600b, . . . , 1600k, comprised in the RB-F-OFDM receiver 1500, each only demodulate the subcarriers in one RB and therefore, the signal may be down-converted to low rate and then demodulated, which will be explained in more detail below.

Figure 18:
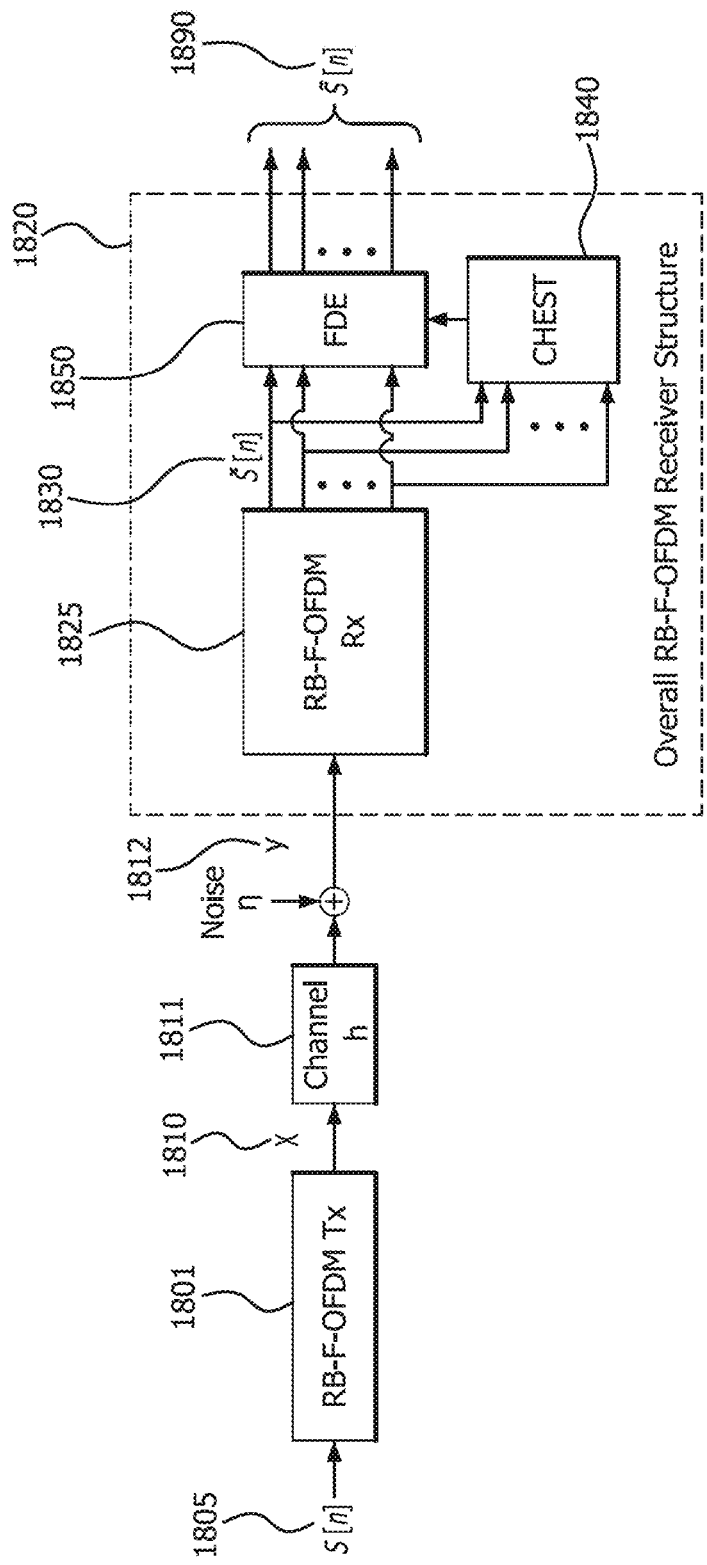
FIG. 18 is a block diagram of an example RB-F-OFDM system that uses a RB-F-OFDM transmitter and a RB-F-OFDM receiver.
Figure 19:
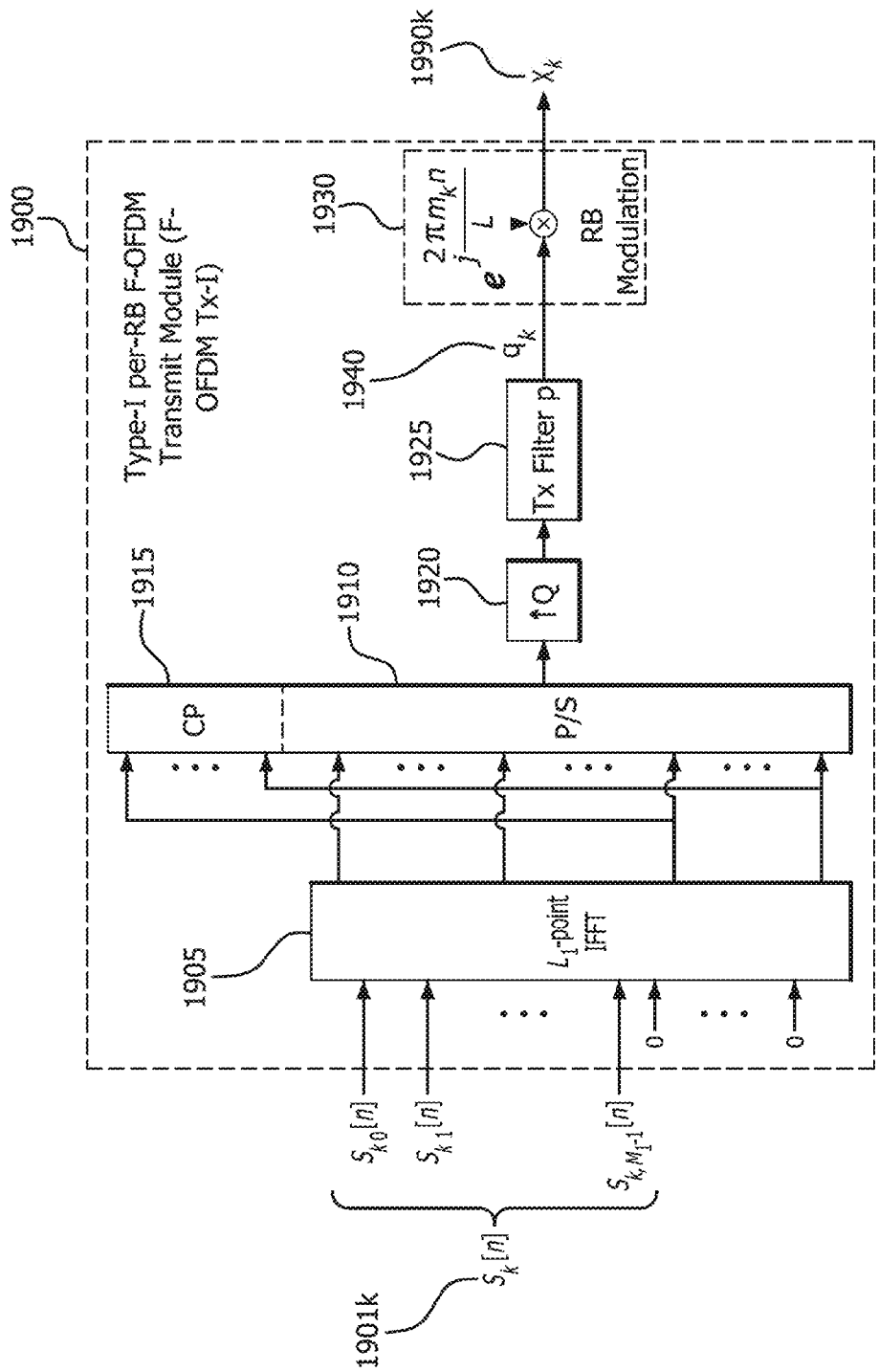
FIG. 19 is a block diagram of an example type-I per-RB F-OFDM transmit module.
Figure 22:
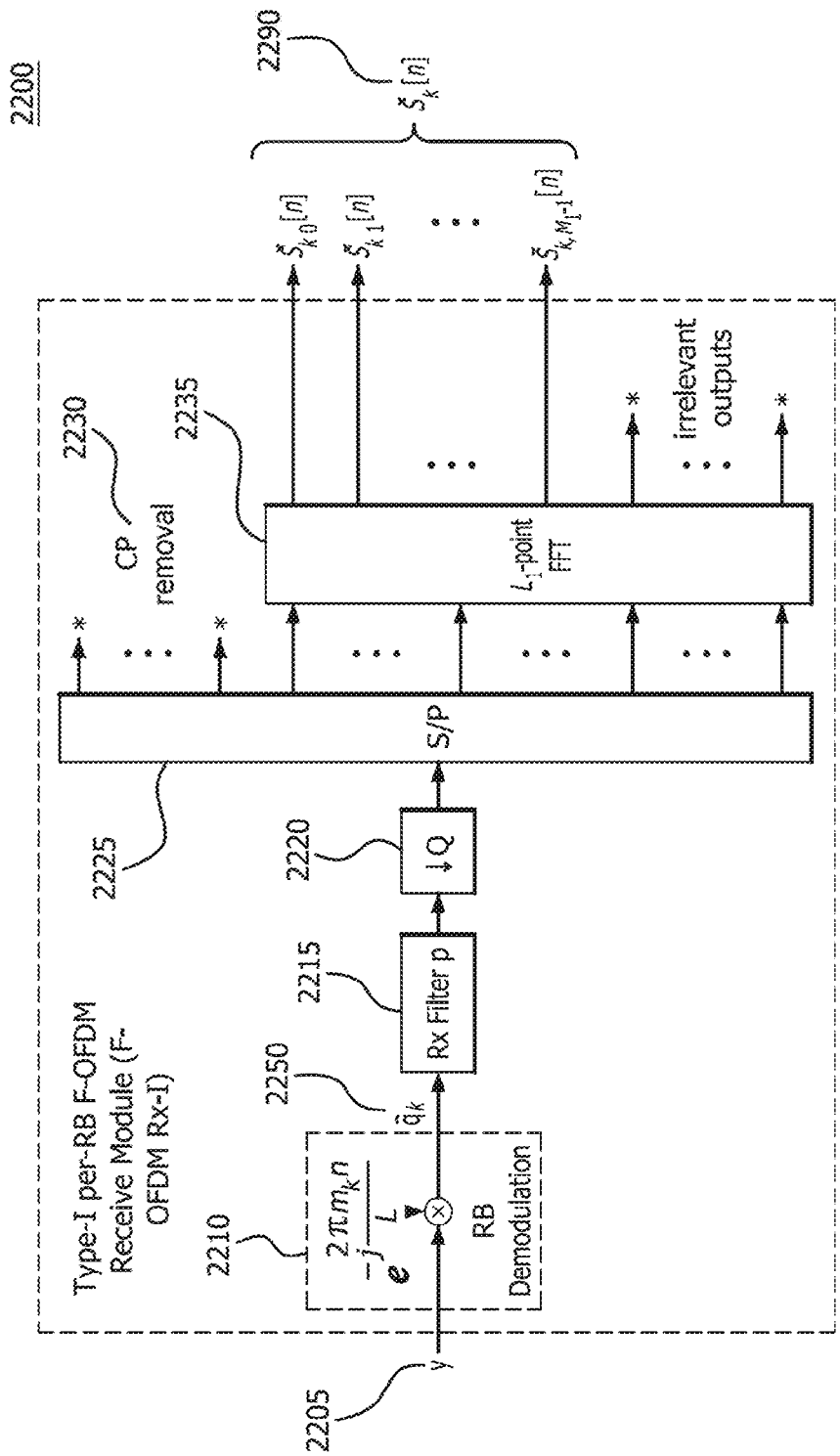
FIG. 22 is a block diagram of an example type-I per-RB-F-OFDM receive module.

FIG. 18 is a block diagram of an example RB-F-OFDM system that uses a RB-F-OFDM transmitter 1801 and a RB-F-OFDM receiver 1825. The RB-F-OFDM Tx 1801 may be the RB-F-OFDM 900 shown in FIG. 9. The RB-F-OFDM receiver 1825 may be the RB-F-OFDM receiver 1500 shown in FIG. 15. As shown in FIG. 18, the overall RB-F-OFDM receiver structure 1820 comprises the RB-F-OFDM receiver 1825, a FDE unit 1850, and a CHEST unit 1840. The FDE unit 1850 may be a one-tap FDE unit. The RB-F-OFDM transmitter 1801 modulates each data symbol vector 1805 RB by RB outputting a transmit signal x 1810. The transmit signal x 1810 is sent over channel h 1811. Noise from the environment may be added to the signal. The RB-F-OFDM receiver 1825 receives signal y 1812. The RB-F-OFDM receiver 1825 outputs demodulated symbol vectors Ŝ[n] 1830. The CHEST unit 1840 estimates the equivalent channel. The equivalent channel may include Tx and Rx filters, for example the Tx filter 1925 as shown in FIG. 19 and Rx filter 2215 as shown in FIG. 22 and propagation channel h from the demodulated symbols Ŝ[n] 1830, and a FDE unit 1850 equalizes the equivalent channel to yield estimates of the original symbol vectors 1890. The FDE unit 1850 may be derived accordingly using zero-forcing (ZF) or minimum mean square error (MMSE) criterion. The overall RB-F-OFDM receiver structure 1820 outputs estimates of the original symbol vectors Ŝ[n] 1890.

Embodiments for three types of RB-F-OFDM transmit and receive modules, (Type-I, Type-II, and Type-III), are disclosed hereafter.

FIG. 19 is a block diagram of an example Type-I per-RB F-OFDM transmit module (F-OFDM Tx-I) 1900. The F-OFDM Tx-I 1900 may be used as the per-RB filtered-OFDM transmit module 1000 in the RB-F-OFDM transmitter 900 as shown in FIG. 12. Referring to FIG. 19, the symbol vectors of the kth RB 1901k are input into the F-OFDM Tx-I 1900. The F-OFDM Tx-I 1900 comprises a $L_1$-point IFFT unit 1905, a parallel-to-serial converter (P/S) 1910, a CP adder unit 1915, an upsampling unit 1920, a baseband transmit filter p[n] 1925, and a RB modulation unit 1930.

The symbol vectors of the kth RB, $S_k[n]$ 1901k, are first modulated and filtered to form a baseband filtered signal $q_k$ 1940. Referring to FIG. 19, the nth data symbol vectors for the kth RB $S_k[n]$ 1901k with zero-padding, first goes through the $L_1$-point IFFT unit 1905, where $L_1$ is a power of 2 and $L_1 \leq L$, to form the $L_1 \times 1$ vector as follows:

$$s_k[n] = [\, s_{k0}[n] \quad s_{k1}[n] \quad \ldots \quad s_{k,L_1-1}[n]\,]^T = \qquad \text{Equation (5)}$$
$$\frac{1}{L_1} F_{L_1}^H \begin{bmatrix} I_{M_1} \\ 0_{(L_1-M_1)\times M_1} \end{bmatrix} S_k[n],$$

where an L-point discrete Fourier transform (DFT) matrix for a general L is given as:

$$F_L = \begin{bmatrix} 1 & 1 & \ldots & 1 \\ 1 & W_L & \ldots & W_L^{L-1} \\ \vdots & \vdots & \ddots & \vdots \\ 1 & W_L^{L-1} & \ldots & W_L^{(L-1)(L-1)} \end{bmatrix}, \qquad \text{Equation (6)}$$

and an L-point inverse DFT (IDFT) matrix for a general L is given as:

$$F_L^H = \begin{bmatrix} 1 & 1 & \ldots & 1 \\ 1 & W_L^{-1} & \ldots & W_L^{-(L-1)} \\ \vdots & \vdots & \ddots & \vdots \\ 1 & W_L^{-(L-1)} & \ldots & W_L^{-(L-1)(L-1)} \end{bmatrix}, \qquad \text{Equation (7)}$$

where $$W_L = e^{-j\frac{2\pi}{L}}. \qquad \text{Equation (8)}$$

This vector $S_k[n]$ 1901k has sampling duration $$T_{s1} = \frac{T}{L_1}.$$

The elements, after parallel-to-serial (P/S) conversion at the parallel-to-serial converter 1910, have the time indices $nL_1$, $nL_1+1$, . . . , $(n+1)L_1-1$. The transmit signal may have sampling duration $$T_s = \frac{T}{L}.$$

Figure 20:
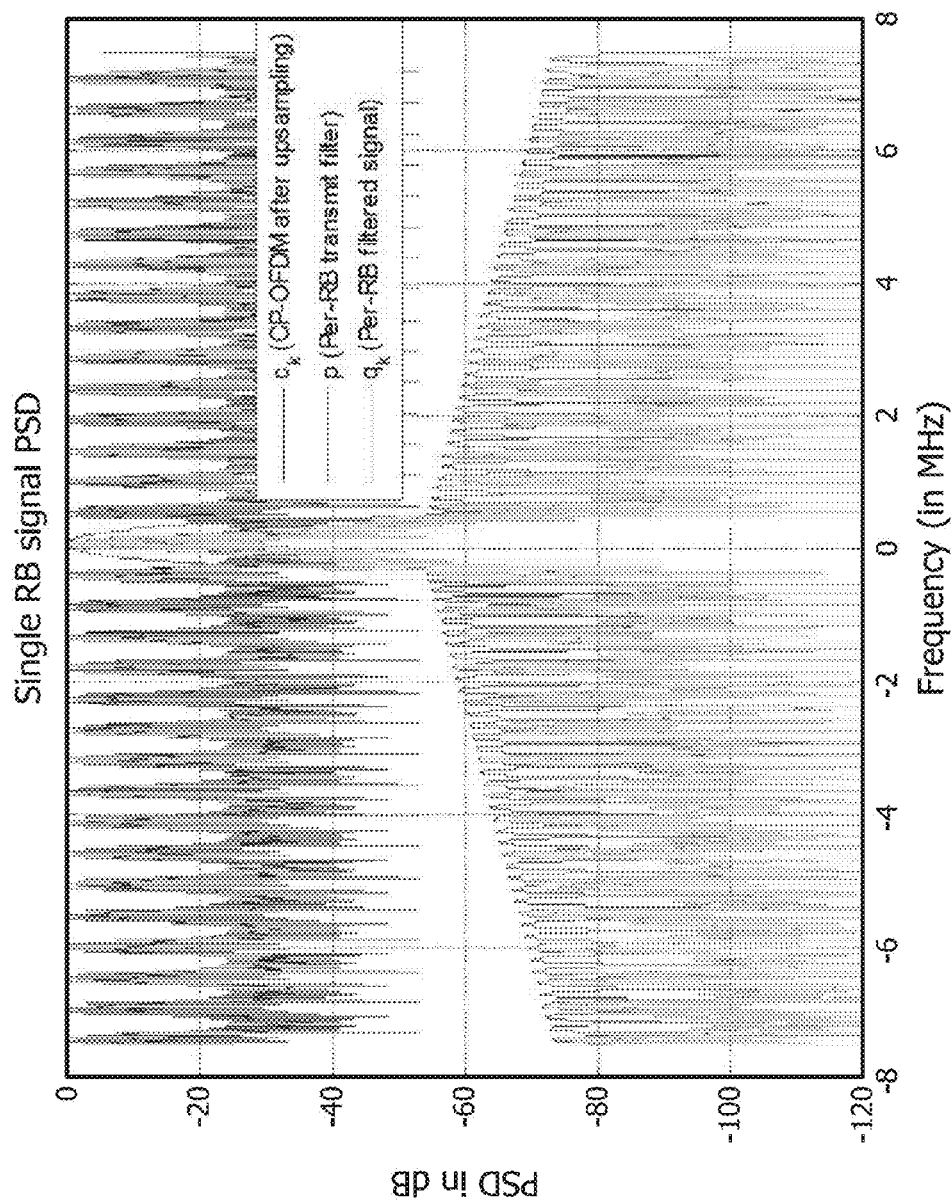
FIG. 20 is an illustration of the PSD of the upsampled signal, the per-RB transmit filter, and the per-RB filtered signal in type-I per-RB F-OFDM Transmitter.
Figure 21:
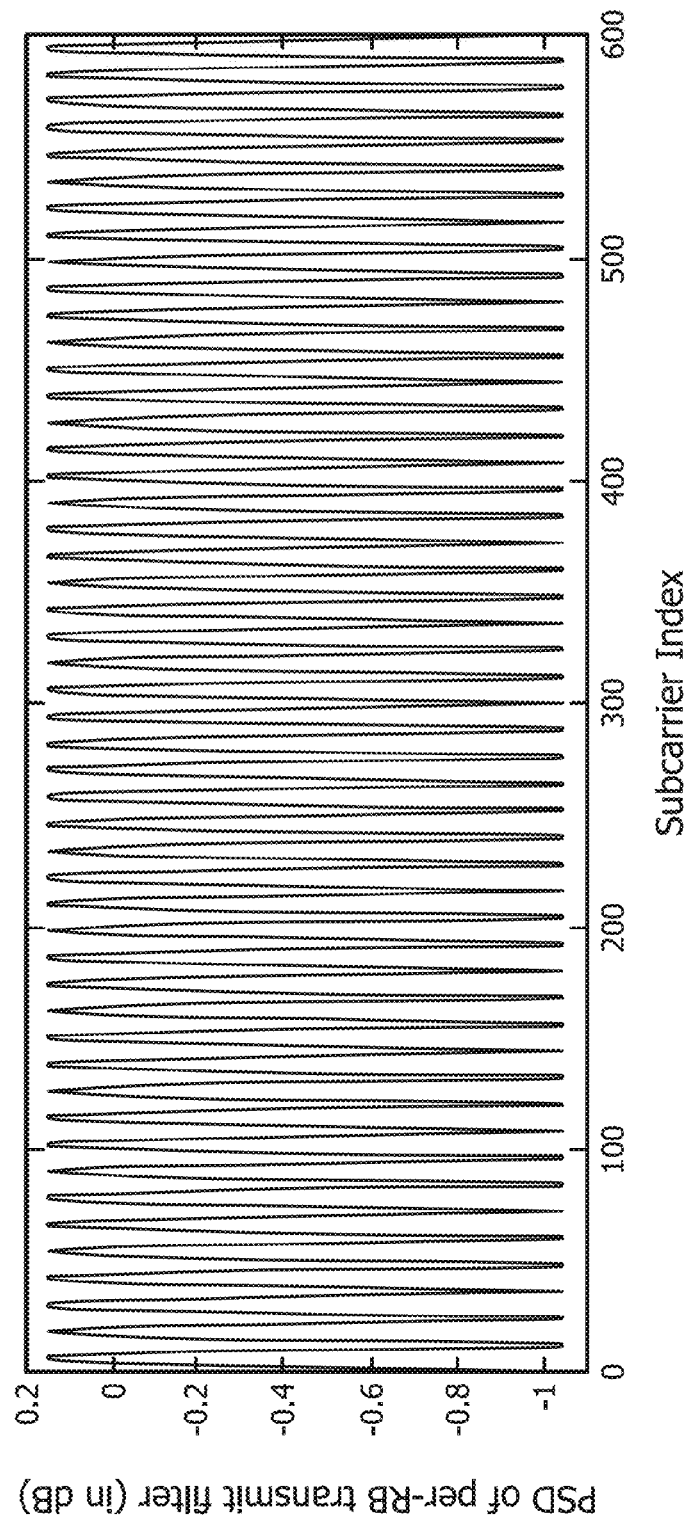
FIG. 21 is an illustration of the PSD of the passband of the transmit filter in RB-F-OFDM.

Therefore, the signal of sampling duration $$T_{s1} = \frac{T}{L_1}$$

needs to be upsampled, at the upsampling unit 1920, by an integer $$Q = \frac{L}{L_1}, \quad \text{Equation (9)}$$

which may be a power of 2. However, before the upsampling, CP is added at the CP adder unit 1915 and P/S conversion is performed at the P/S converter 1910. After upsampling, the signal goes through the baseband transmit filter p[n] 1925 which outputs the baseband filtered signal $q_k$ 1940. The baseband filtered signal $q_k$ 1940 is modulated into the frequency band of the kth RB at the RB modulation unit 1930 to form per-RB multicarrier modulated signal $x_k$ 1990k for the respective RB. The sum of these signals form the multicarrier modulated transmit signal x as shown in FIGS. 10 and 12. The baseband transmit filter p[n] 1925 may be chosen to be a lowpass filter, wherein the passband is the bandwidth of $M_1$ subcarriers in a single RB, $$\left(\text{i.e., } BW_{pass} = \frac{M_1}{T}\right),$$

the transition band of each side has a bandwidth less than the bandwidth of $L_1-M_1$ subcarriers, $$\left(\text{i.e., } BW_{trans} \le \frac{L_1 - M_1}{T}\right),$$

and the stopband may have attenuation of at least 55 dBm. FIG. 20 illustrates the PSD of the upsampled signal, the per-RB transmit filter, and the per-RB filtered signal in Type-I per-RB F-OFDM Tx from values −120 dB to 0 dB over a frequency range of −8 MHz to 8 MHz. The upsampling operation to the CP-OFDM signal may create spectral images of the CP-OFDM signal as shown in FIG. 20. The baseband transmit filter p[n] 1925 suppresses all created images in its stopband, so that the inter-RB interference is negligible. The passband of the whole RB-F-OFDM signal may go through the per-RB transmit baseband filter 1925 that has the frequency response as in FIG. 21. FIG. 21 is an illustration of the PSD of the passband of the transmit filter in RB-F-OFDM. This filtering may be equalized at the receiver.

FIG. 22 is a block diagram of an example Type-I per-RB F-OFDM receive module (F-OFDM Rx-I) 2200. The F-OFDM Rx-I 2200 may be used as the per-RB filtered-OFDM receive module 1600 in the RB-F-OFDM receiver 1500 as shown in FIG. 17. The F-OFDM Rx-I 2200 shown in FIG. 22 has reverse operations of the F-OFDM Tx-I 1900 shown in FIG. 19. The F-OFDM Rx-I 2200 comprises a RB demodulation unit 2210, a baseband receive filter p[n] 2215, a downsampling unit 2220, a serial-to-parallel converter (S/P) 2225, a CP removal unit 2230, and a $L_1$-point FFT unit 2235. Referring to FIG. 22, for the kth RB, the received signal y 2205 is demodulated from the frequency band of the kth RB to baseband at the RB demodulation unit 2210 to form a RB demodulated signal $\hat{q}_k$ 2250. The RB demodulated signal $\hat{q}_k$ 2250 is then filtered at the baseband receive filter p[n] 2215, which could be, but not necessary to, identical to the baseband transmit filter p[n] 1925. The filtered signal goes through the downsampling unit 2220 with a downsampling factor Q, the S/P converter 2225, the CP removal unit 2230, and the $L_1$-point IFFT unit 2235. The first $M_1$ outputs from the $L_1$-point FFT unit 2235 form the demodulated symbol vectors $\hat{S}_k[n]$ 2290. The demodulated symbol vectors are obtained RB by RB in this way, similar to FIG. 17. Similar to FIG. 18, CHEST may be obtained from the demodulated symbol vectors at a CHEST unit and the demodulated symbol vectors may go through a FDE unit, such as a one-tap FDE unit, to obtain the estimate of the demodulated symbol vectors $\check{S}_k[n]$ 2290.

Figure 23:
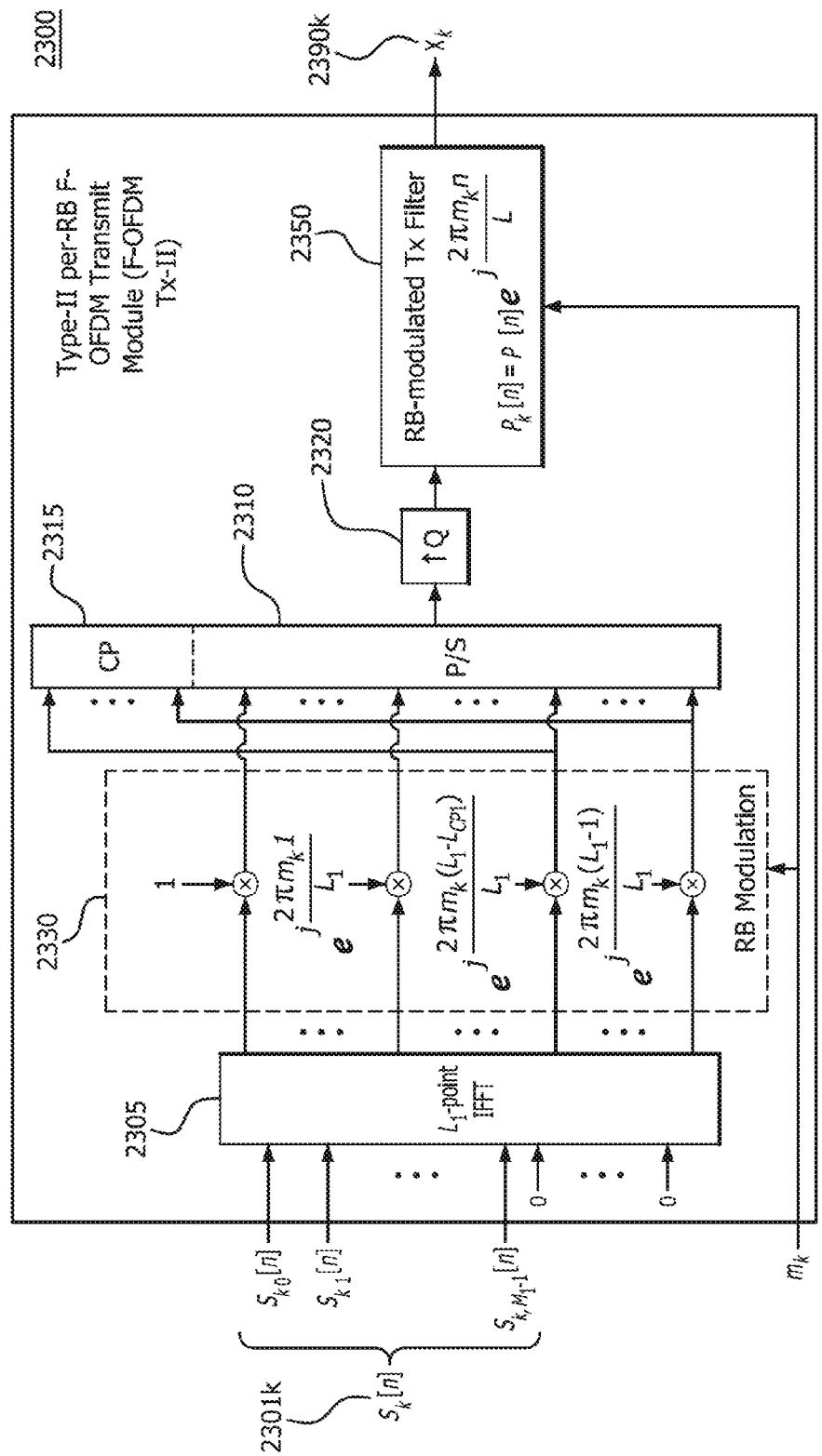
FIG. 23 is a block diagram of an example type-II per-RB F-OFDM transmit module.

FIG. 23 is a block diagram of an example type-II per-RB F-OFDM transmit module (F-OFDM Tx-II) 2300. The F-OFDM Tx-II 2300 may be used as the per-RB filtered-OFDM transmit module 1000 in the RB-F-OFDM transmitter 900 as shown in FIG. 12. The F-OFDM Tx-II 2300 comprises a $L_1$-point IFFT unit 2305, a RB modulation unit 2330, a parallel-to-serial converter (P/S) 2310, a CP adder unit 2315, an upsampling unit 2320, and a RB modulated transmit filter 2350.

In the F-OFDM Tx-II 2300, the symbol vectors of the kth RB, $S_k[n]$ 2301k, may be modulated to the subcarriers' frequencies and then filtered to form the per-RB multicarrier modulated signal $x_k$ 2390k. The nth data symbol vector for the kth RB, $S_k[n]$ 2301k with zero-padding, first goes through the $L_1$-point IFFT unit 2305, where $L_1$ is a power of 2 and $L_1 \le L$, to form the $L_1 \times 1$ vector as follows:

$$s_k[n] = [s_{k0}[n] \ s_{k1}[n] \ \ldots \ s_{k,L_1-1}[n]]^T = \quad \text{Equation (10)}$$

$$\frac{1}{L_1} F_{L_1}^H \begin{bmatrix} I_{M_1} \\ 0_{(L_1-M_1) \times M_1} \end{bmatrix} S_k[n],$$

where an L-point discrete Fourier transform (DFT) matrix for a general L is given as:

$$F_L = \begin{bmatrix} 1 & 1 & \ldots & 1 \\ 1 & W_L & \ldots & W_L^{L-1} \\ \vdots & \vdots & \ddots & \vdots \\ 1 & W_L^{(L-1)} & \ldots & W_L^{(L-1)(L-1)} \end{bmatrix}, \quad \text{Equation (11)}$$

and an L-point inverse DFT (IDFT) matrix for a general L is given as:

$$F_L^H = \begin{bmatrix} 1 & 1 & \ldots & 1 \\ 1 & W_L^{-1} & \ldots & W_L^{-(L-1)} \\ \vdots & \vdots & \ddots & \vdots \\ 1 & W_L^{-(L-1)} & \ldots & W_L^{-(L-1)(L-1)} \end{bmatrix}, \quad \text{Equation (12)}$$

where $$W_L = e^{-j\frac{2\pi}{L}}. \quad \text{Equation (13)}$$

This vector $S_k[n]$ has sampling duration $$T_{s1} = \frac{T}{L_1}.$$

The elements after P/S conversion have the time indices $nL_1$, $nL_1+1, \ldots, (n+1)L_1-1$. The transmit signal may have the sampling duration $$T_s = \frac{T}{L}.$$

Therefore, the signal of sampling duration $T_{s1}=T/L_1$ may be upsampled by an integer:

$$Q = \frac{L}{L_1}, \quad \text{Equation (14)}$$

which may be a power of 2, before the upsampling, RB modulation, adding CP, and P/S conversion are performed. The $L_1 \times 1$ vector $S_k[n]$ may go through the RB modulation unit 2330, to form a RB modulated signal vector as follows:

$$a_k[n] = [a_{k0}[n] a_{k1}[n] \ldots a_{k,L_1-1}[n]]^T = J_k[n] s_k[n], \quad \text{Equation (15)}$$

where the RB modulation diagonal matrix for the nth symbol is:

Equation (16)

$$J_k[n] = \begin{bmatrix} W_L^{-m_k nL_1 Q} & & & \\ & \ddots & & \\ & & W_L^{-m_k(nL_1+l)Q} & \\ & & & \ddots \\ & & & & W_L^{-m_k((n+1)L_1-1)Q} \end{bmatrix} =$$

$$\begin{bmatrix} e^{j\frac{2\pi m_k nL_1 Q}{L}} & & & \\ & \ddots & & \\ & & e^{j\frac{2\pi m_k(nL_1+l)Q}{L}} & \\ & & & \ddots \\ & & & & e^{j\frac{2\pi m_k((n+1)L-1)Q}{L}} \end{bmatrix}$$

And the integer Q is due to upsampling. Substituting equation (14) into equation (16), after math manipulation, the RB modulation diagonal matrix becomes a constant matrix for the kth RB as follows:

Equation (17)

$$J_k[n] = \begin{bmatrix} e^{j\frac{2\pi m_k nL_1}{L_1}} & & & \\ & \ddots & & \\ & & e^{j\frac{2\pi m_k(nL_1+l)}{L_1}} & \\ & & & \ddots \\ & & & & e^{j\frac{2\pi m_k((n+1)L-1)}{L_1}} \end{bmatrix} =$$

$$\begin{bmatrix} 1 & & & \\ & \ddots & & \\ & & e^{j\frac{2\pi m_k l}{L_1}} & \\ & & & \ddots \\ & & & & e^{j\frac{2\pi m_k(L_1-1)}{L_1}} \end{bmatrix} =$$

$$\begin{bmatrix} 1 & & & \\ & \ddots & & \\ & & W_{L_1}^{-m_k l} & \\ & & & \ddots \\ & & & & W_{L_1}^{-m_k(L_1-1)} \end{bmatrix} =$$

$$\begin{bmatrix} 1 & & & \\ & \ddots & & \\ & & W_{L_1}^{-d_k l} & \\ & & & \ddots \\ & & & & W_{L_1}^{-d_k(L_1-1)} \end{bmatrix} = J_k$$

where $$d_k = m_k \bmod L_1. \quad \text{Equation (18)}$$

Then, equation (13) becomes $$a_k[n] = J_k s_k[n]. \quad \text{Equation (19)}$$

Therefore, the RB modulation matrix $J_k$ performs, on $S_k[n]$, a subcarrier shift of $d_k$ subcarriers. Substituting equation (10) into equation (19), the following is obtained:

$$a_k[n] = \quad \text{Equation (20)}$$

$$\frac{1}{L_1} J_k F_{L_1}^H \begin{bmatrix} I_{M_1} \\ 0_{(L_1-M_1) \times M_1} \end{bmatrix} S_k[n] = L_k \begin{bmatrix} I_{M_1} \\ 0_{(L_1-M_1) \times M_1} \end{bmatrix} S_k[n],$$

where $$L_k = \frac{1}{L_1} J_k F_{L_1}^H = \frac{1}{L_1} \begin{bmatrix} 1 & & & \\ & \ddots & & \\ & & W_{L_1}^{-d_k l} & \\ & & & \ddots \\ & & & & W_{L_1}^{-d_k(L_1-1)} \end{bmatrix} \quad \text{Equation (21)}$$

$$\begin{bmatrix} 1 & 1 & \cdots & 1 \\ 1 & W_{L_1}^{-1} & \cdots & W_{L_1}^{-(L_1-1)} \\ \vdots & \vdots & \ddots & \vdots \\ 1 & W_{L_1}^{-(L_1-1)} & \cdots & W_{L_1}^{-(L_1-1)(L_1-1)} \end{bmatrix}.$$

After multiplying two matrices in Equation (21), $L_k$ becomes:

$$L_k = \quad \text{Equation (22)}$$

$$\frac{1}{L_1} \begin{bmatrix} 1 & 1 & \cdots & 1 \\ W_{L_1}^{-d_k} & W_{L_1}^{-(d_k+1)} & \cdots & W_{L_1}^{-(d_k+L_1-1)} \\ \vdots & \vdots & \ddots & \vdots \\ W_{L_1}^{-d_k(L_1-1)} & W_{L_1}^{-(d_k+1)(L_1-1)} & \cdots & W_{L_1}^{-(d_k+L_1-1)(L_1-1)} \end{bmatrix} =$$

$$\frac{1}{L_1} F_{L_1}^H \begin{bmatrix} 0_{d_k \times (L_1-d_k)} & I_{d_k} \\ I_{L_1-d_k} & 0_{(L_1-d_k) \times d_k} \end{bmatrix} = \frac{1}{L_1} F_{L_1}^H P_{\pi d_k}$$

where $$P_{\pi d_k} = \begin{bmatrix} 0_{d_k \times (L_1-d_k)} & I_{d_k} \\ I_{L_1-d_k} & 0_{(L_1-d_k) \times d_k} \end{bmatrix}, \quad \text{Equation (23)}$$

is a permutation that represents the circular shift $d_k$ subcarriers. Substituting equation (22) into equation (20) the following is obtained:

$$a_k[n] = \frac{1}{L_1} F_{L_1}^H P_{\pi d_k} \begin{bmatrix} I_{M_1} \\ 0_{(L_1-M_1)\times M_1} \end{bmatrix} S_k[n].$$

Equation (24)

Figure 24:
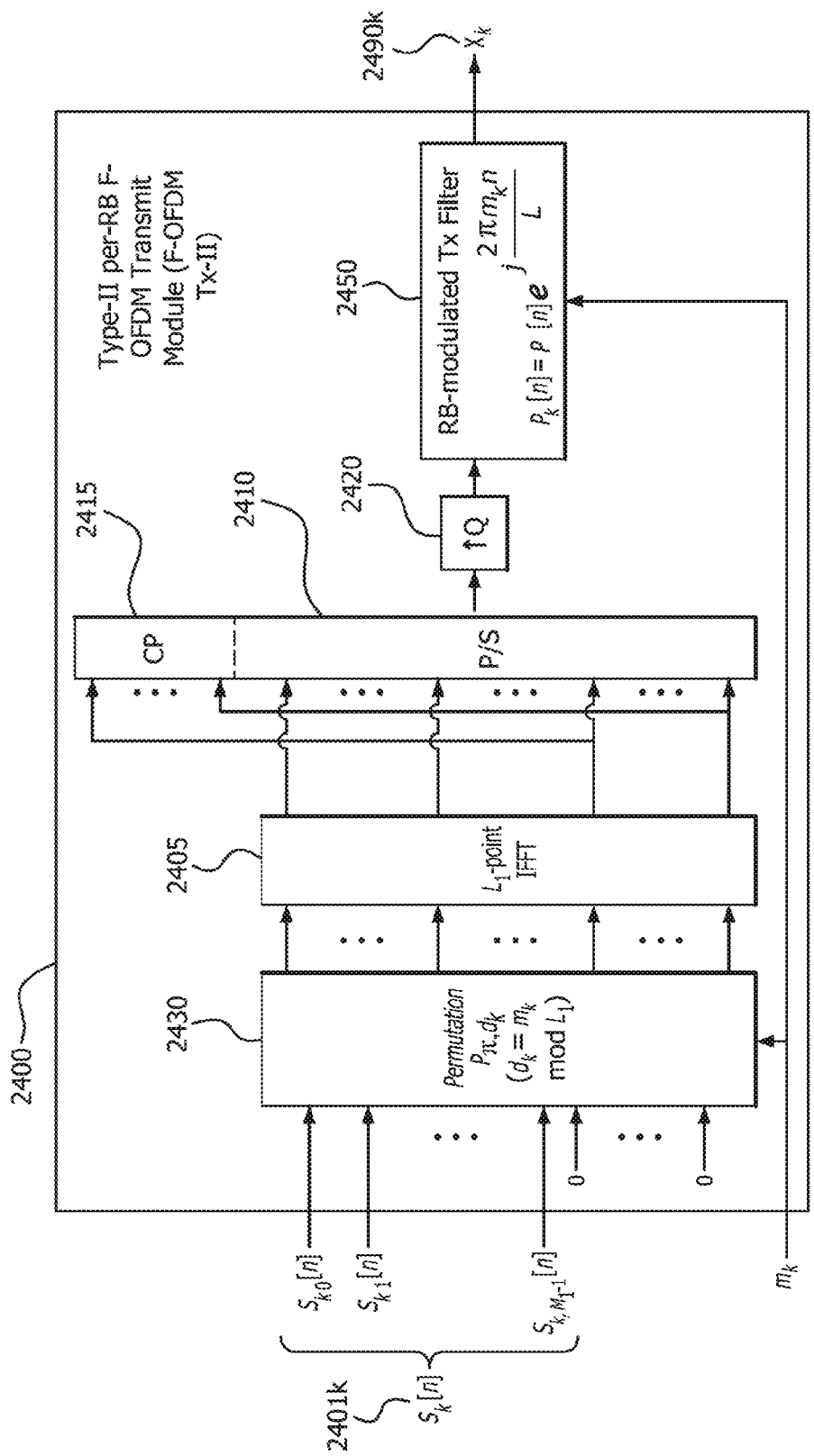
FIG. 24 is a block diagram of an example modified structure of the type-II per-RB OFDM transmit module of FIG. 23 using the circular shift via permutation.

Alternatively, the F-OFDM Tx-II 2300 may be modified to use circular shift (via permutation) as shown in FIG. 24. FIG. 24 is a block diagram of the example type-II per-RB OFDM transmit module using the circular shift (via permutation) 2400. The symbol vectors of the kth RB, $S_k[n]$ 2401k are input into the type-II per RB OFDM transmit module using the circular shift (via permutation) 2400, which comprises a permutation unit 2430 instead of the RB modulation unit 2330 shown in FIG. 23. The type-II per-RB OFDM transmit module using the circular shift (via permutation) 2400 also comprises a $L_1$-point IFFT unit 2405, a parallel-to-serial converter (P/S) 2410, a CP adder unit 2415, an upsampling unit 2420, and a RB modulated transmit filter 2450. The type-II per-RB OFDM transmit module using the circular shift (via permutation) 2400 outputs per-RB multicarrier modulated signal $x_k$ 2490k. The permutation unit 2430 lowers the complexity when compared to the RB modulation unit 2330 via complex multiplications.

Referring back to FIG. 23, after the signal is modulated at the RB modulation unit 2330, CP is added to the RB modulated signal vector $a_k[n]$ at the CP adder unit 2315 to form an $(L_1+L_{cp1})\times 1$ vector such that Equation (25)

$$b_k[n] = [b_{k0}[n] \; b_{k1}[n] \; \ldots \; b_{k,L_1+L_{cp1}-1}[n]]^T =$$
$$[a_{k,L_1-L_{cp1}}[n] \; \ldots \; a_{k,L_1-1}[n] \; a_{k0}[n] \; a_{k1}[n] \; \ldots \; a_{k,L_1-1}[n]]^T =$$
$$\begin{bmatrix} 0_{L_{cp1}\times(L_1-L_{cp1})} & I_{L_{cp1}} \\ I_{L_1} \end{bmatrix} a_k[n]$$

After CP is added, P/S conversion is applied to $b_k[n]$ at the P/S converter 2310 to form a $1\times(L_1+L_{cp1})$ vector $(b_k[n])^T$. The vectors $(b_k[n])^T$ for the 0th, 1st, 2nd, . . . , symbols form a sequence $b_k^T$; where $$b_k^T = [(b_k[0])^T (b_k[1])^T \ldots (b_k[n])^T \ldots ]^T.$$

Equation (26)

The sequence $b_k^T$ goes through the upsampling unit 2320 by Q to form an upsampled sequence $c_k^T$ where $$c_k^T = [(c_k[0])^T (c_k[1])^T \ldots (c_k[n])^T \ldots ]^T,$$

Equation (27)

where the $1\times((L_1+L_{cp1})Q)$ (vector) sequence for the nth symbol in the kth RB is:

$$c_k[n] = [c_{k0}[n] c_{k1}[n] \ldots c_{k,(L_1+L_{cp1})Q-1}[n]]^T, \text{ and}$$

Equation (28)

$$c_{k,lQ+d}[n] = \begin{cases} b_{kl}[n], & d=0 \\ 0, & d=1,2,\ldots,Q-1 \end{cases}.$$

Equation (29)

The upsampled sequence $c_k^T$ is of sampling rate $$T_s = \frac{T}{L}.$$

Therefore, the CP duration is $L_{cp1}Q$ samples of sampling rate $$T_s = \frac{T}{L}.$$

The upsampled sequence $c_k$ then goes through the RB-modulated transmit filter 2350 as follows:

$$p_k[n] = p[n]W_L^{-m_k n} = p[n]e^{j\frac{2\pi m_k n}{L}},$$

Equation (30)

where p[n] is the baseband per-RB transmit filter and n is the sample index. For convenience, the RB-modulated transmit filter 2350 may be represented in a column vector form as $p_k$. The RB modulation in the RB-modulated transmit filter 2350 modulates the signal to the same frequency band as the unfiltered signal of the RB. The resulting signal:

$$x_k^T = p_k^T * c_k^T,$$

Equation (31)

is the per-RB modulated signal $x_k$ 2390k for the $k^{th}$ RB, where * is the convolution operation of two sequence to form one sequence. The RB modulated transmit filter p[n] 2350 may be chosen to be a lowpass filter, whose passband is the bandwidth of $M_1$ subcarriers in a single RB, i.e., $$BW_{pass} = \frac{M_1}{T},$$

transition band each side has the bandwidth less than the bandwidth of $L_1$-$M_1$ subcarriers, i.e., $$BW_{trans} \leq \frac{L_1 - M_1}{T},$$

and the stopband may have attenuation of at least 55 dBm. The sum of the per-RB multicarrier modulated signals $x_k$ 2390k form the transmit signal x 990 as shown in FIGS. 9 and 12.

Figure 25:
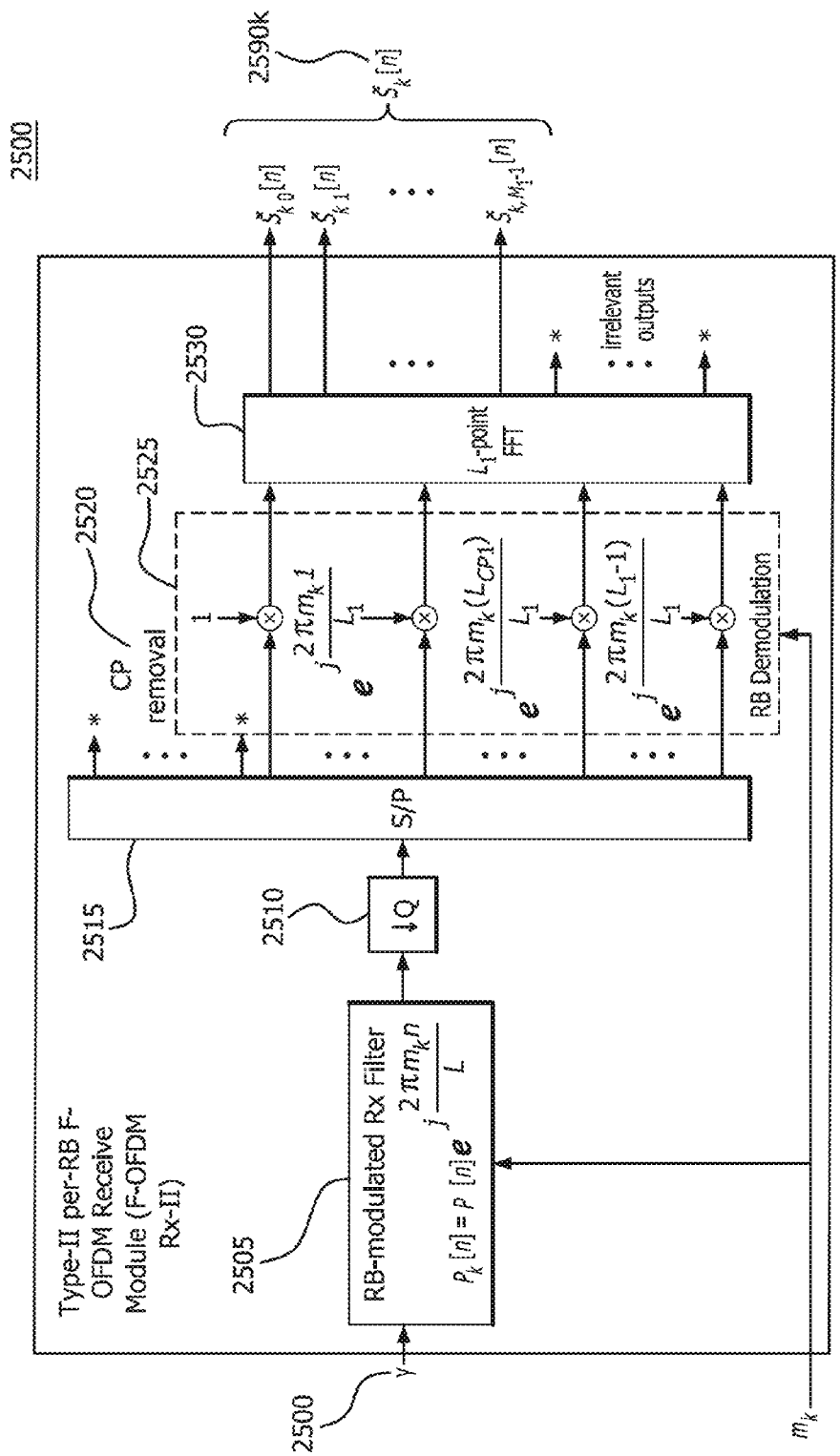
FIG. 25 is a block diagram of an example type-II per-RB F-OFDM receive module (F-OFDM Rx-II)

FIG. 25 is a block diagram of an example type-II per-RB F-OFDM receive module (F-OFDM Rx-II) 2500. The F-OFDM Rx-II 2500 may be used as the per-RB filtered-OFDM receive module 1600 in the RB-F-OFDM receiver 1500 as shown in FIG. 17. The F-OFDM Rx-II 2500, as shown in FIG. 25, has reverse operations of the F-OFDM Tx-II 2300, as shown in FIG. 23. Referring to FIG. 25, the F-OFDM Rx-II 2500 comprises a RB-modulated Rx filter 2505, a downsampling unit 2510, a serial-to-parallel converter (S/P) 2515, a CP removal unit 2520, a RB demodulation unit 2525 and a $L_1$-point FFT unit 2530.

In the F-OFDM Rx-II 2500, for the kth RB, the received signal y 2501 may be firstly filtered and then demodulated according to the subcarriers' frequencies to obtain the demodulated symbol vectors of the kth RB, $\check{S}_k[n]$ 2590k. The demodulated symbol vectors are obtained RB by RB in this way, as in FIG. 17.

Figure 26:
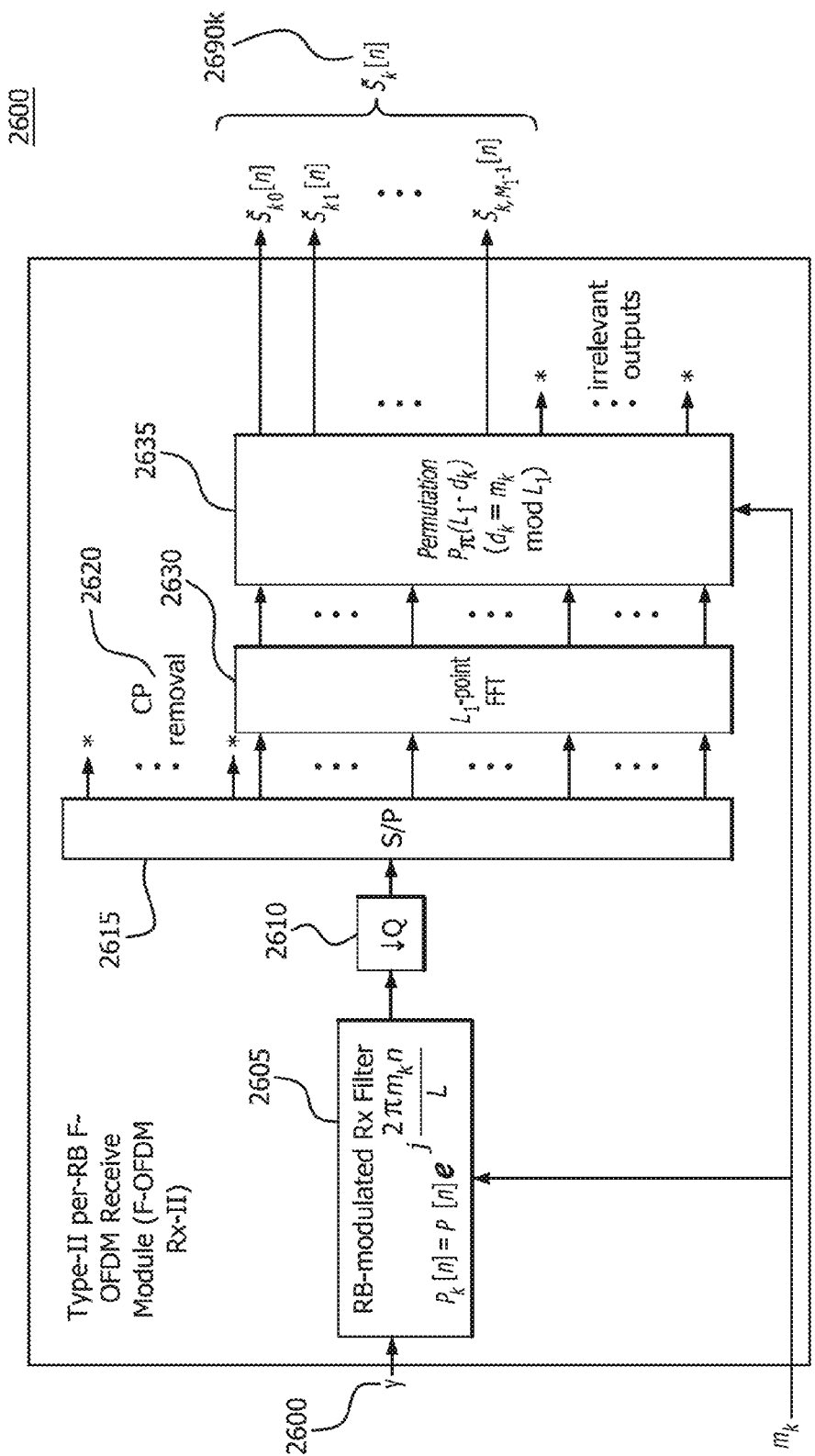
FIG. 26 is a block diagram of an example modified structure of the type-II per-RB F-OFDM receive module of FIG. 25 using the circular shift via permutation.

Referring to FIG. 25, the received signal y 2501 goes through the RB-modulated Rx filter $p_k[n]$ 2505, which may be identical to the RB-modulated Tx filter 2350 as defined in equation (30). Then, the filtered signal may go through the downsampling unit 2510 of factor Q, the S/P converter 2515, the CP removal unit 2520, the RB demodulation unit 2525, and the $L_1$-point FFT unit 2530. The first $M_1$ outputs from the $L_1$-point FFT unit 2530 form the demodulated symbol vectors $\check{S}_k[n]$ 2590k. Alternatively, the F-OFDM Rx-II may be modified to use circular shift (via permutation) to lower the complexity. FIG. 26 is a block diagram of an example type II per-RB OFDM Rx module using the circular shift (via permutation) 2600. Similar to the Type-II per-RB F-OFDM Tx module 2400, the RB demodulation in the Type-II per-RB F-OFDM Rx module may also be accomplished by a permutation 2635 using a permutation $P_{\pi(L_1-d_k)}$ that represents the circular shift of $L_1-d_k$ subcarriers, instead of the RB demodulation unit 2525 as shown in FIG. 25, via complex multiplications. The permutation matrix $P_{\pi x}$ to circular shift x subcarriers is defined in equation (23). Referring to FIG. 26, the received signal y 2601 goes through the RB-modulated Rx filter $p_k[n]$ 2605, which is identical to the RB-modulated Tx filter 2350 as defined in equation (30). Then, the filtered signal may go through the downsampling unit 2610 of factor Q, the S/P converter 2615, the CP removal unit 2620, the $L_1$-point FFT unit 2630, and the permutation unit 2635. The outputs of the permutation unit 2635 form the demodulated symbol vectors $\check{S}_k[n]$ 2690k.

Similar to FIG. 18, CHEST may be obtained from the demodulated symbol vectors. The demodulated symbol vectors may also go through an FDE unit, which may be a one-tap FDE unit, to obtain estimates of the demodulated symbol vectors $\check{S}_k[n]$ 2690k.

Type-I and type-II RB-F-OFDM transmit and receive modules are equivalent up to a phase modulation. This difference in phase modulation is introduced because CP is added before RB modulation in type-I RB-F-OFDM transmit module 1900, but is added after RB modulation in type-II RB-F-OFDM transmit module 2300. The phase modulation for the nth data symbol in the kth RB is:

$$e^{-j2\pi \frac{m_k L_{cp} n}{L}} \quad \text{Equation (32)}$$

If the phase modulation is applied to the data symbols before type-I RB-F-OFDM transmit module 1900, the transmit signal is the same as the one generated by type-II RB-F-OFDM transmit module 2300 using the data symbols without phase modulation. Then, the transmit signal may be demodulated using the CP-OFDM/filtered-OFDM receiver 1400 in FIG. 14. If the phase modulation is not applied at the type-I RB-F-OFDM transmit module 1900, a phase modulation, which is the complex conjugate of the phase modulation, may be applied to the output symbols at the CP-OFDM/filtered-OFDM receiver 1400.

Figure 41:
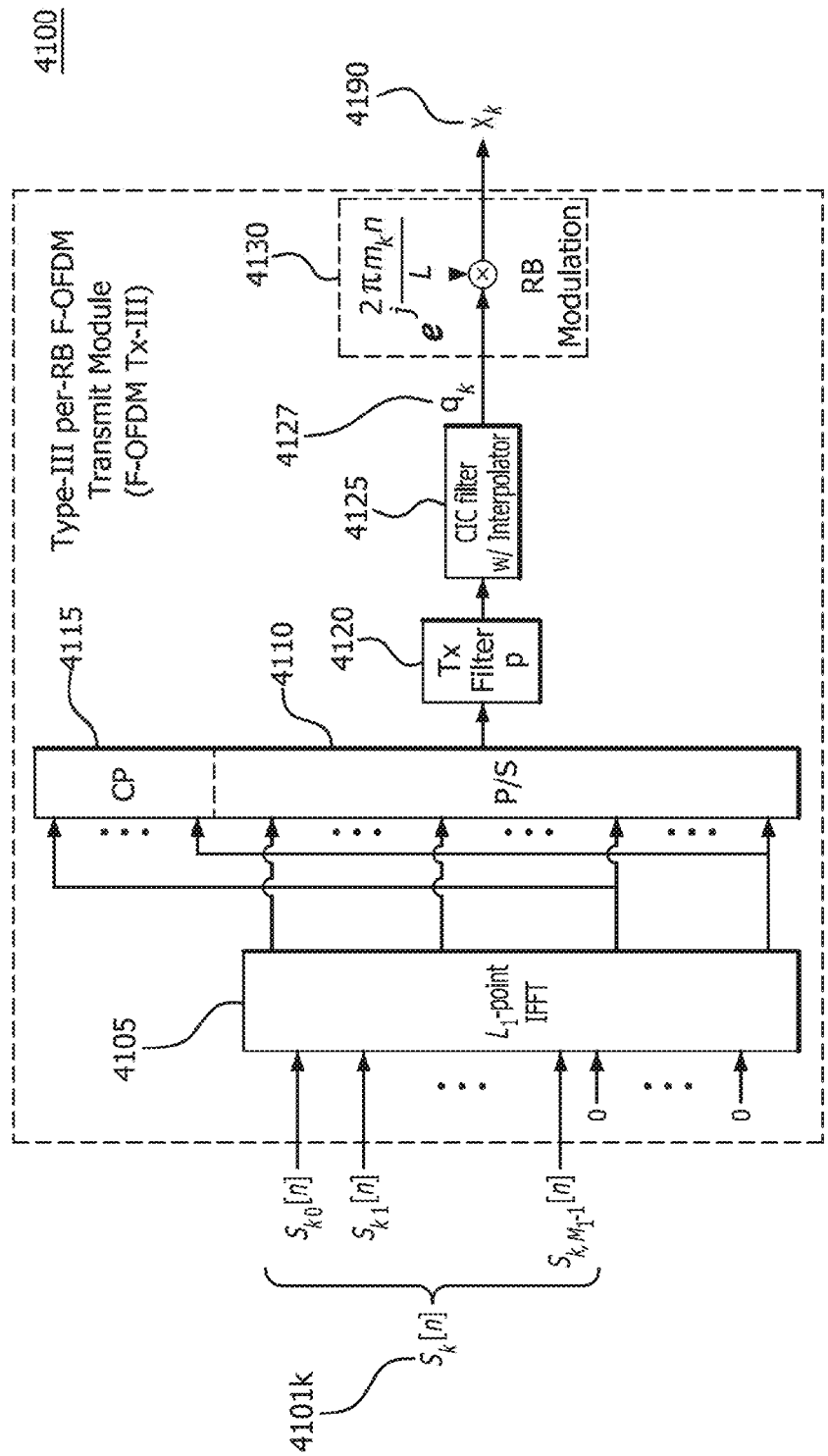
FIG. 41 is a block diagram of an example type-III per-RB F-OFDM transmit module.

Referring ahead to FIG. 41, FIG. 41 is a block diagram of an example Type-III per-RB F-OFDM transmit module (F-OFDM Tx-III) 4100. The F-OFDM Tx-III 4100 is similar to F-OFDM Tx-I, however in the F-OFDM Tx-III, the upsampling unit 1920 and the baseband transmit filter 1925, as shown in FIG. 19 are replaced with a low sampling rate filter (p) 4120 and a cascaded integrator-comb (CIC) combined with an interpolator unit 4125. The F-OFDM Tx-III 4100 may be used as the per-RB filtered-OFDM transmit module 1000 in the RB-F-OFDM transmitter 900 as shown in FIG. 12. The F-OFDM Tx-III 4100 comprises a $L_1$-point IFFT unit 4105, a parallel-to-serial converter (P/S) 4110, a CP adder unit 4115, a low sampling rate filter p[n] 4120, a cascaded integrator-comb (CIC) combined with an interpolator unit 4125 and a RB modulation unit 4130. Using CIC as part of the filter may significantly reduce the implementation complexity Referring to FIG. 41, the nth data symbol vectors for the kth RB $S_k[n]$ 4101k first goes through the $L_1$-point IFFT unit 4105. CP is added at the CP adder unit 4115 and P/S conversion is performed at the P/S converter 4110. The signal goes through the low sampling rate filter p 4120 and the cascaded integrator-comb (CIC) combined with an interpolator unit 4125 which outputs the filtered signal $q_k$ 4127. The filtered signal $q_k$ 4127 is modulated into the frequency band of the kth RB at the RB modulation unit 4130 to form per-RB multicarrier modulated signal $x_k$ 4190k for the respective RB.

Figure 42:
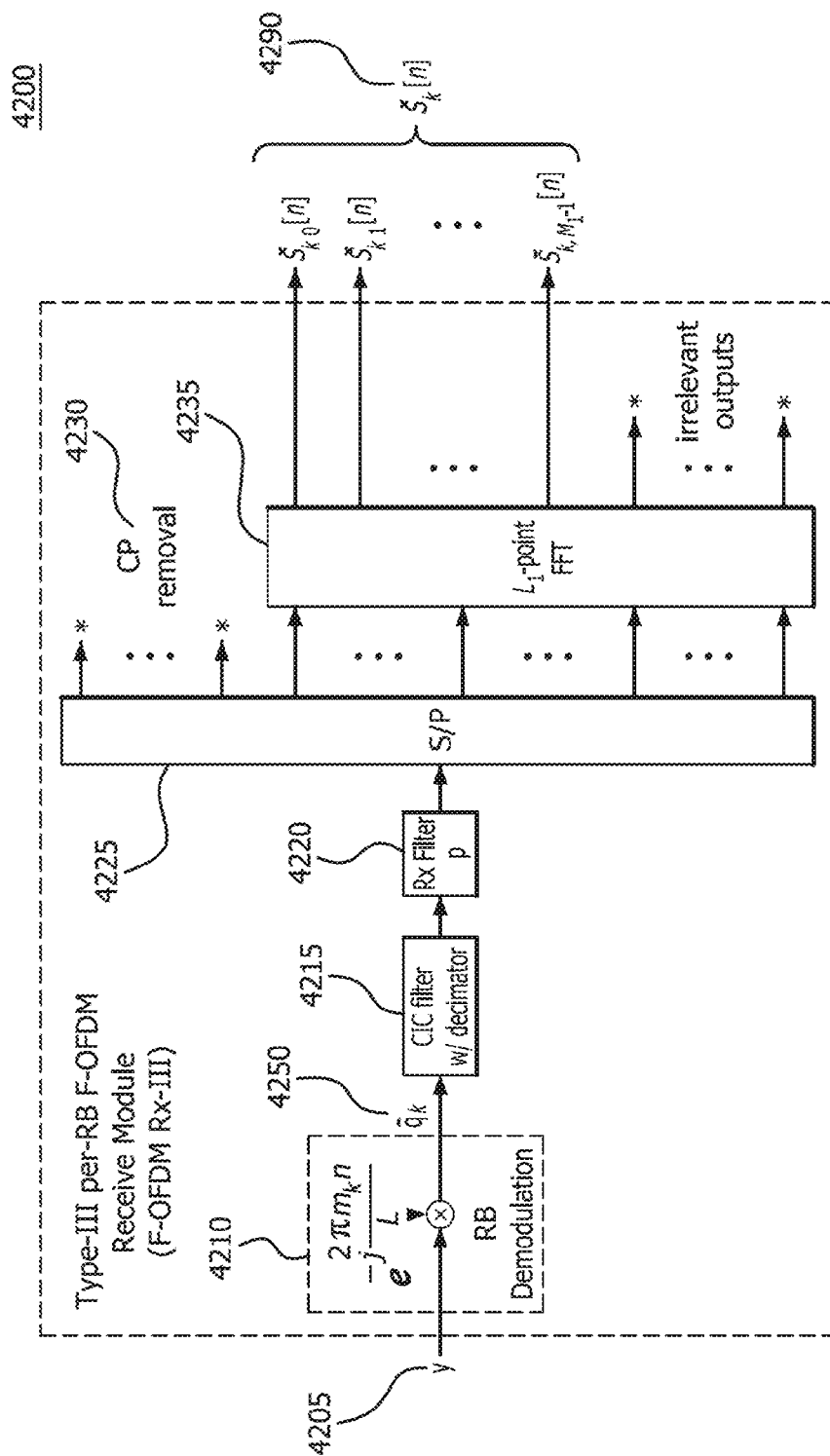
FIG. 42 is a block diagram of an example type-III per-RB F-OFDM transmit module.

FIG. 42 is a block diagram of an example Type-III per-RB F-OFDM receive module (F-OFDM Rx-III) 4200. The Type III RB-F-OFDM receiver model is similar to Type-I RB-F-OFDM receiver model 2200 as shown in FIG. 22. It replaces the baseband receive filter 2215 and down-sampling unit 2220 with a cascaded integrator-comb (CIC) combined with a decimator 4215 and a low sampling rate filter p 4220. Using CIC as part of filter can significantly reduce the implementation complexity. The F-OFDM Rx-III 4200 may be used as the per-RB filtered-OFDM receive module 1600 in the RB-F-OFDM receiver 1500 as shown in FIG. 17. The F-OFDM Rx-III 4200 has reverse operations of the F-OFDM Tx-III 4100 shown in FIG. 41. The F-OFDM Rx-III 4200 comprises a RB demodulation unit 4210, with a cascaded integrator-comb (CIC) combined with a decimator 4215, a low sampling rate filter p 4220, a serial-to-parallel converter (S/P) 4225, a CP removal unit 4230, and a $L_1$-point FFT unit 4235.

Referring to FIG. 42, for the kth RB, the received signal y 4205 is demodulated from the frequency band of the kth RB to baseband at the RB demodulation unit 4210 to form a RB demodulated signal $\hat{q}_k$ 4250. The RB demodulated signal $\hat{q}_k$ 4250 is then filtered at the cascaded integrator-comb (CIC) combined with a decimator 4215 and a low sampling rate filter p 4220. The filtered signal goes through the S/P converter 4225, the CP removal unit 4230, and the $L_1$-point IFFT unit 4235. The outputs from the $L_1$-point FFT unit 4235 form the demodulated symbol vectors $\check{S}_k[n]$ 4290. The demodulated symbol vectors are obtained RB by RB in this way, similar to FIG. 17. Similar to FIG. 18, CHEST may be obtained from the demodulated symbol vectors at a CHEST unit and the demodulated symbol vectors may go through a FDE unit, such as a one-tap FDE unit, to obtain the estimate of the demodulated symbol vectors $\check{S}_k[n]$ 4290.

In practical systems with non-contiguous spectrum allocation, it may be more computationally efficient to divide the non-contiguous spectrum into non-uniform sized RBs. RB-F-OFDM may be utilized for such non-uniform-sized RBs. One example implementation of the per-RB F-OFDM transmit/receive module is to use several per-RB IFFT/FFT components for different $L_1$ values and different pre-defined transmit/receive filters for RBs of different sizes. Another example implementation is to use universal per-RB IFFT/FFT components, (e.g., $L_1$ is fixed), and have different pre-defined transmit/receive filters for RBs of different sizes.

Peak-to-average power ratio (PAPR) reduction techniques are disclosed hereafter.

Since the per-RB F-OFDM transmit module deals with a smaller number of subcarriers, and the signal of each RB is generated independently, certain PAPR reduction techniques may be used in conjunction with the RB-F-OFDM transmitter to reduce the PAPR to improve energy efficiency.

In one example, coding may be used to reduce the PAPR in each per-RB F-OFDM signal. Coding may have very high computational complexity, due to the large number of subcarriers in MCM systems, and due to the overlapping of symbols in some MCM systems. In RB-F-OFDM, coding may be designed for one RB and used for all RBs. This may highly reduce the offline design complexity.

Figure 27:
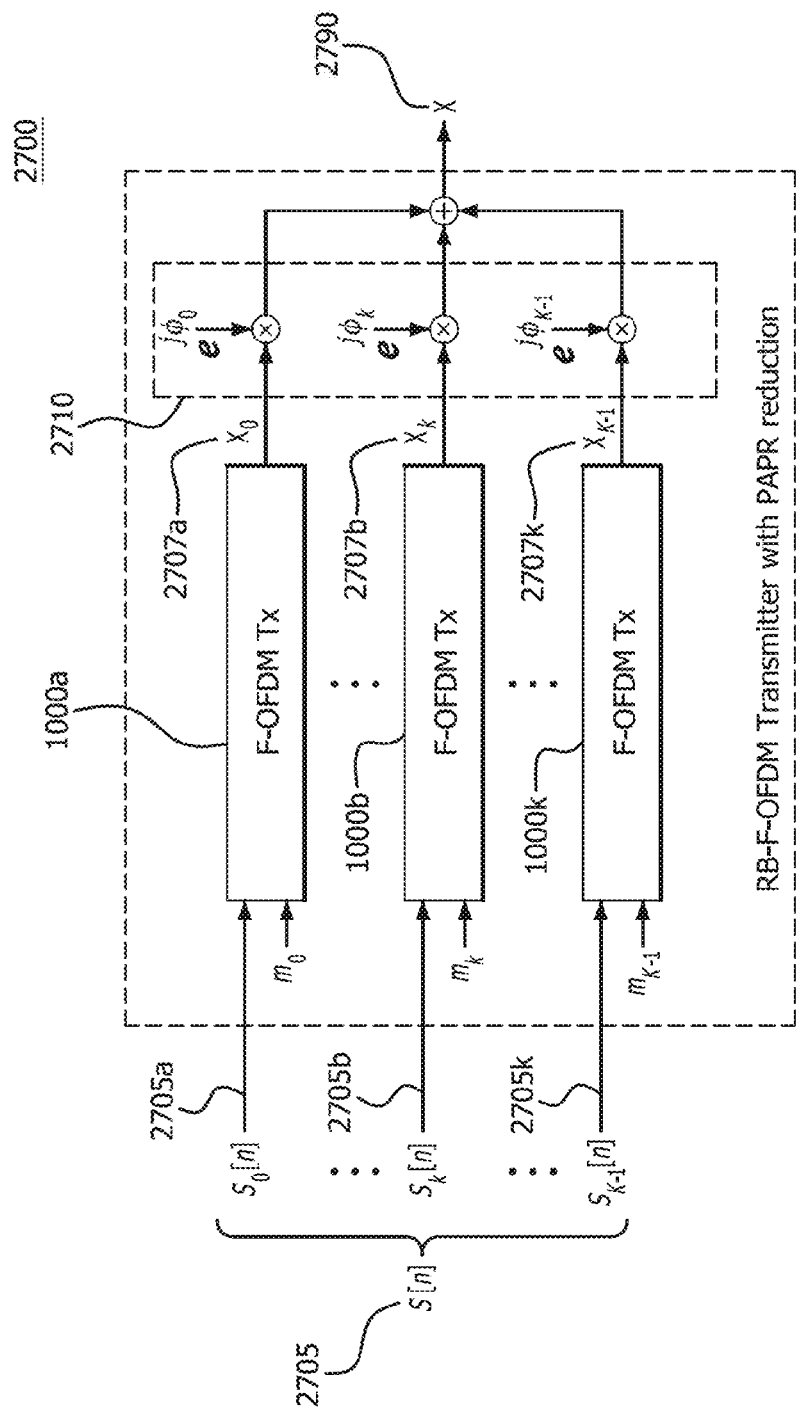
FIG. 27 is a block diagram of a RB-F-OFDM transmitter using PAPR reduction techniques.

In another example, phase rotation based techniques, such as selective mapping (SLM) and partial transmit sequence (PTS), may be applied to the per-RB F-OFDM signals to reduce the PAPR. Referring back to FIG. 27, FIG. 27 is a block diagram of a RB-F-OFDM transmitter with PAPR reduction 2700. Data symbol vectors 2705a, 2705b, ..., 2705k are input into the RB-F-OFDM transmitter with PAPR reduction 2700, which uses the RB-based SLM or PTS phase vector $[e^{j\Phi_0}e^{j\Phi_1} \ldots e^{j\Phi_{K-1}}]^T$ at a selective mapping unit 2710. For simplicity, FIG. 27 assumes that the RB-F-OFDM transmit module 1000 is used, however one skilled in the art would recognize that any transmit module may be used. Each transmit module 1000a, 1000b, ..., 1000k outputs per-RB multicarrier modulated signals 2707a, 2707b, ..., 2707k which are input into the selective mapping unit 2710 where SLM or PTS may be applied. The RB-F-OFDM transmitter with PAPR reduction 2700 outputs the transmit signal 2790.

Figure 28:
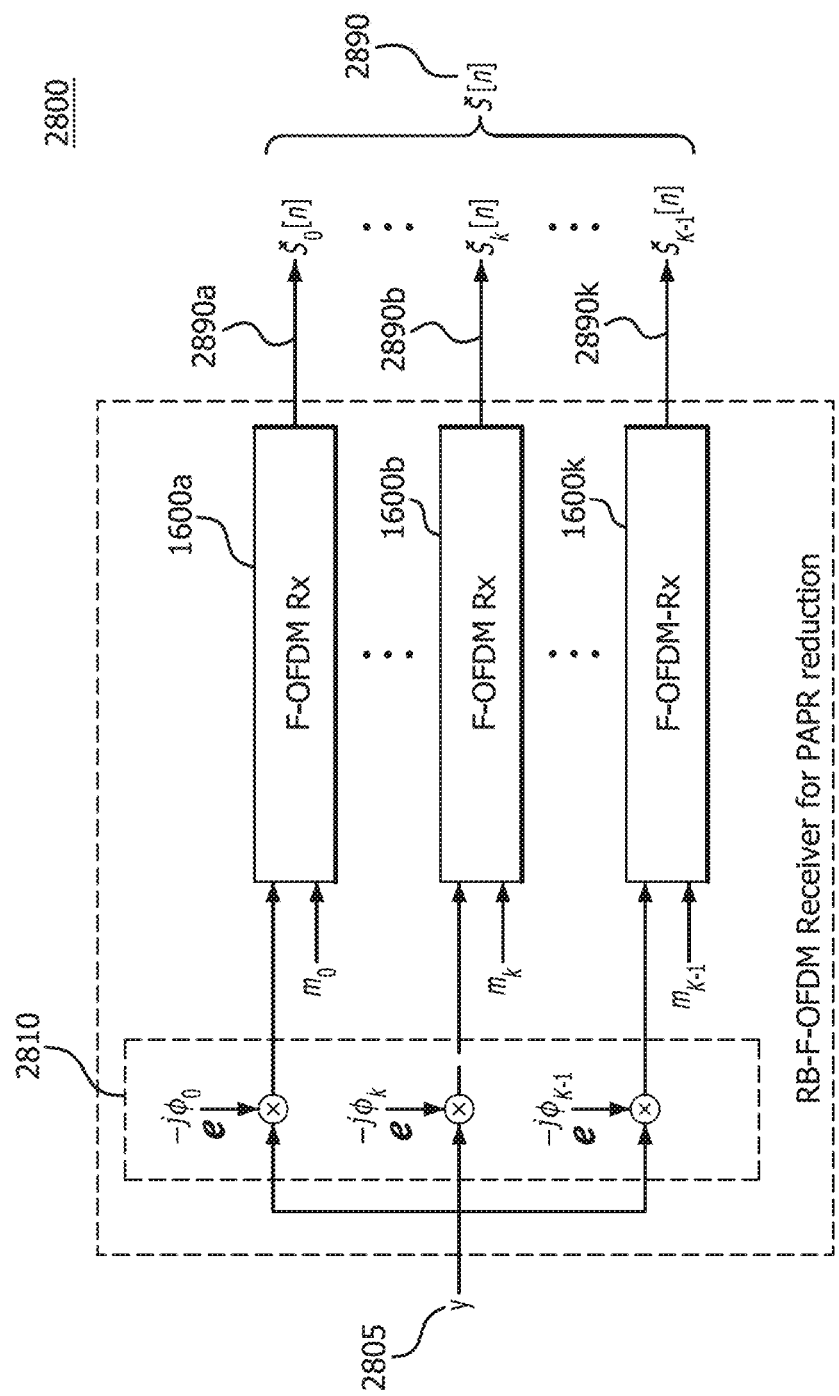
FIG. 28 is a block diagram of a RB-F-OFDM receiver using PAPR reduction techniques.

FIG. 28 is a block diagram of a RB-F-OFDM receiver with PAPR reduction 2800. The coefficients of the selective demapping unit 2810 at the RB-F-OFDM receiver are the complex conjugate of the coefficients of the selective mapping unit 2710 at the RB-F-OFDM transmitter to enable PAPR reduction. The RB-F-OFDM receiver with PAPR reduction 2800 uses the RB-based SLM or PTS complex conjugate phase vector $[e^{-j\Phi_0}e^{-j\Phi_1} \ldots e^{-j\Phi_{K-1}}]^T$ at a selective demapping unit 2810. For simplicity, FIG. 28 assumes that the RB-F-OFDM receive module 1600 is used, however one skilled in the art would recognize that any receive module may be used. If the CP-OFDM/filtered-OFDM receiver 1400 is used, the configuration is identical to the SLM/PTS in CP-OFDM. In practical implementation, the phase vector at the receiver may be combined with an FDE unit, which may be a one-tap FDE unit. Referring to FIG. 28, the received signal y 2805 is received at the RB-F-OFDM receiver with PAPR reduction 2800. The RB-based SLM or PTS complex conjugate phase vector is applied at the selective demapping unit 2810, which outputs a per-RB signal into the F-OFDM Rx module 1600a, 1600b, ... 1600k, which in turn outputs per-RB demodulated symbol vectors 2890a, 2890b, ..., 2890k. When the RB-based SLM/PTS is applied, the output signal becomes $$x = \sum_{k=0}^{K-1} e^{j\phi_k} x_k \quad \text{Equation (33)}$$

The RB-based phase rotation techniques may be combined with the subcarrier-based phase rotation techniques in each RB. Fixed or random phase rotations may also be used.

The above embodiments for PAPR reduction do not have signal distortion that may result in spectral efficiency loss due to side information of the parameters. Besides these techniques, PAPR reduction techniques that have signal distortion may also be used in conjunction with the RB-F-OFDM transmitter. For example, clipping may be applied to the per-RB signal before the per-RB transmit filter. Even though the PAPR is not yet evaluated at this stage, the clipping threshold may be determined. For another example, after the RB-F-OFDM signal is formed, clipping and filtering, or companding may be applied to the RB-F-OFDM signal. Such clipping and filtering may increase the transmitter computational complexity and lead to in-band signal distortion. On the other hand, companding may increase OOBE and degrade BER performance due to signal distortion. RB-F-OFDM may not be very sensitive to power amplifier (PA) nonlinearity. Therefore, companding may be considered for RB-F-OFDM signal.

In SLM/PTS, while in general phase vectors are generated from a given set of phases, phase vectors may be generated randomly. The randomly generated phase vectors may have elements of $e^{j\Phi_k}$ with arbitrary phase values or quantized phase values from a candidate set.

In SLM, a number of phase vectors $[e^{j\Phi_0}e^{j\Phi_1} \ldots e^{j\Phi_{K-1}}]^T$ may be randomly generated. The output signal x for each phase vector and a certain time period, (e.g., one subframe), may be obtained as in equation (33). The maximum PAPR value in the subframe for each phase vector may be calculated. The phase vector that results in the lowest maximum PAPR in the time period, (e.g., one subframe), may be chosen and the corresponding output signal may be the transmit signal. The chosen phase vector, as side information, needs to be made known to the receiver. Without loss of generality, let $\phi_0=0$ (so $e^{j\Phi_0}=1$). The computational complexity is added to the transmitter. If quantized phase values are used, (e.g., the phase rotation comes from a candidate set $\{1,j,-1,-j\}$), the additional computational complexity at the transmitter may be reduced. At the receiver, the complex conjugate of the chosen phase vector may be combined with an FDE unit, which may be a one-tap FDE unit, and may not incur additional computational complexity. Due to side information, there may be spectral efficiency loss. The loss in data rate depends on the number of unknown phase rotations in the chosen phase vector. If SLM is used, there may be K−1 unknown phase rotations.

In PTS, instead of using a different phase rotation for each entry, which is a per-RB modulated signal in the case of RB-F-OFDM, the per-RB modulated signals may be divided into groups, and a single phase rotation may be used for all per-RB modulated signals in one group. The phase rotations for different groups may be different. The K per-RB modulated signals may be divided into groups, each having at most g RBs. It results in $$\left\lceil \frac{K}{g} \right\rceil$$

groups. There are $$\left\lceil \frac{K}{g} \right\rceil - 1$$

unknown phase rotations, which is less than the case of SLM, when g>1. Smaller group size may lead to larger spectral efficiency loss, while larger group size may provide a smaller degree of freedom in the PAPR reduction design. Without loss of generality, SLM may be considered as a special case of PTS where the group size g=1.

In one example, one chosen phase vector may be used for each subframe. This may result in an additional inherent latency at the transmitter. If one chosen phase vector is used for the duration to yield one PAPR value, there may be no additional inherent latency at the transmitter, because this may be accommodated due to the P/S conversion at the transmitter. This may allow a greater degree of freedom in PAPR reduction design. However, the spectral efficiency loss may increase.

The side information for each subframe is the $$\left\lceil \frac{K}{g} \right\rceil - 1$$

phase rotation values $e^{j\Phi_1}, \ldots, e^{j\Phi_{K-1}}$ for the $$\left\lceil \frac{K}{g} \right\rceil - 1$$

RB groups. Such phase rotations may be seen as part of the multipath channel and be included in RB-based pilot-based CHEST and recovered in equalization. In this case, since the phase rotation is different for each RB group, there should be enough pilot symbols in each RB to enable reliable CHEST, and the CHEST for each RB may be performed independently. On the other hand, if the pilot density in each RB is not high enough, the CHEST of certain subcarriers may rely on interpolation between channels of subcarriers in the same RB as well as those in adjacent RBs. In such a case, a pilot-based phase estimator may be needed for each RB. In either case, there may be spectral efficiency loss due to additional pilots. In all cases, since there may be reference signals (RS) on each subcarrier in practical systems, SLM which uses dedicated phase rotation for each subcarrier may not be enabled.

In Type-I and Type-II RB-F-OFDM as described above, the computational complexity may be high since it scales by the number of available RBs. The RB-F-OFDM transmitter may alternatively be represented as the per-RB CP-OFDM signals going through a synthesis filter bank (SFB) of the filtered multitone (FMT) modulation. Alternatively, the RB-F-OFDM receiver may be represented as the received signals being passed through an analysis filter bank (AFB) of the FMT demodulation followed by the per-RB CP-OFDM receive modules.

In one embodiment, the RB-F-OFDM transmitter and receiver may be implemented with a polyphase filter bank to further reduce the complexity, for example, when the number of available RBs is large. Without loss of generality, let $m_k = kM_1$, and it is assumed that the number of subcarriers per RB $M_1$ is a power of 2, so that $Q_1 = L/M_1$ is a power of 2, and the RB modulation and demodulation multipliers become $$e^{\pm j\frac{2\pi k M_1 n}{L}} = e^{\pm j\frac{2\pi k n}{Q_1}}.$$

Figure 29:
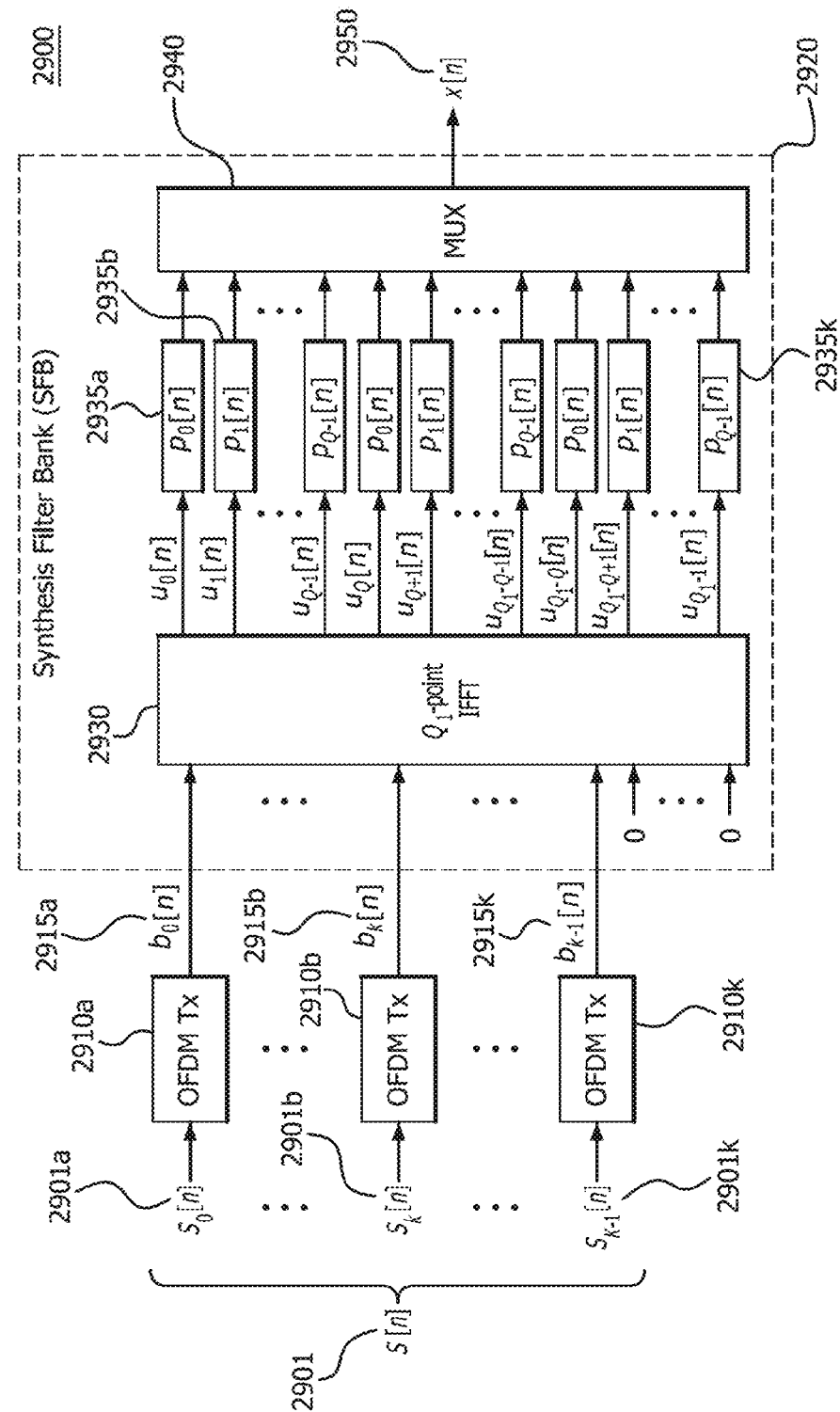
FIG. 29 shows an example RB-F-OFDM transmitter using polyphase implementation of a synthesis filter bank (SFB)
Figures 30, 32:
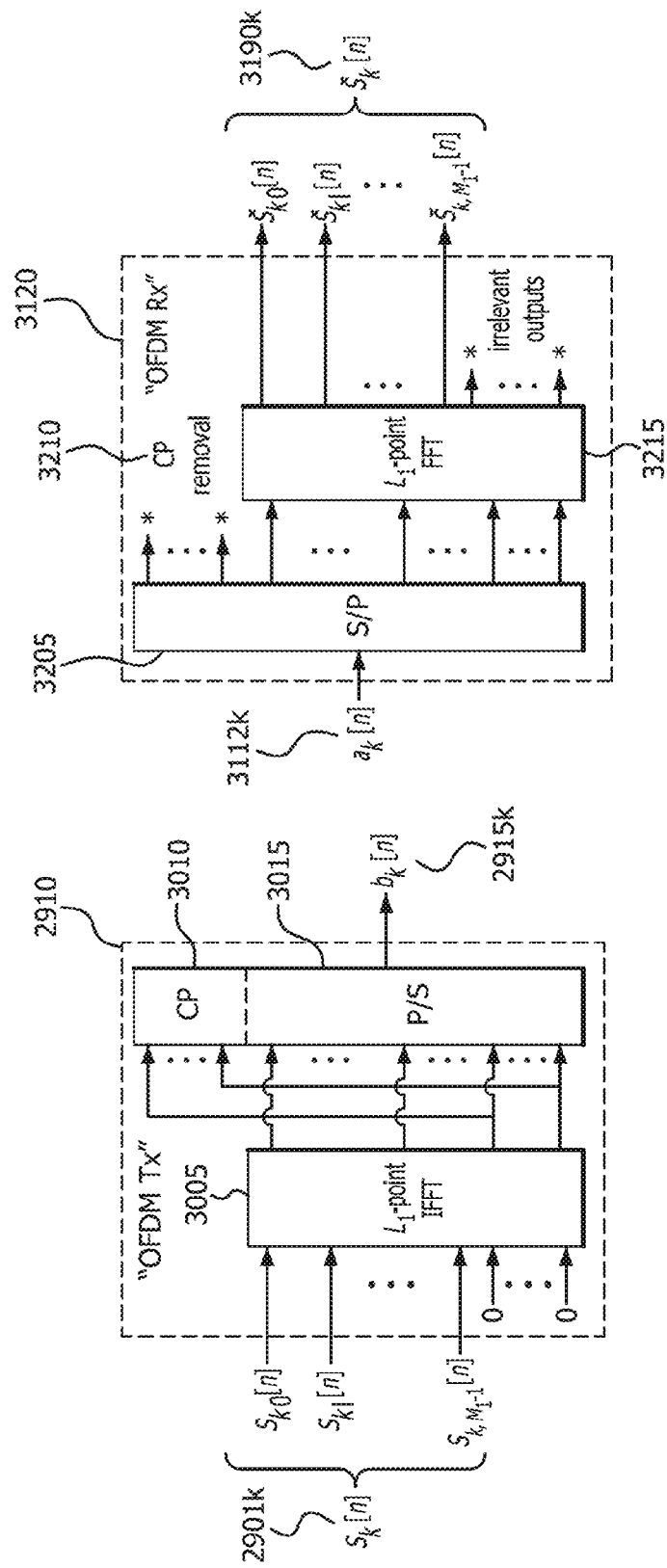
FIG. 30 is an example block diagram of the OFDM transmit module used in the RB-F-OFDM transmitter of FIG. 29.
FIG. 32 is an example block diagram of the OFDM receive module used in the RB-F-OFDM receiver of FIG. 31.

Efficient polyphase implementations of the SFB and AFB are described hereafter. FIG. 29 shows an example of a RB-F-OFDM transmitter using polyphase implementation of a Synthesis Filter Bank (SFB) 2900. The RB-F-OFDM transmitter using polyphase implementation of a SFB 2900 may comprise OFDM transmit modules 2910a, 2910b, . . . , 2910k and a SFB 2920. Alternatively, CP-OFDM transmit modules may be used. Referring to FIG. 29, the data symbol vectors S[n] 2901a, 2901b, . . . , 2901k are input into the respective OFDM transmit modules 2910a, 2910b, . . . , 2910k. A block diagram of an example OFDM transmit module 2910 is shown in FIG. 30. Referring to FIG. 30, the OFDM transmit module 2910 may comprise an $L_1$-point IFFT unit 3005, a CP adder unit 3010, and a P/S converter 3015. Referring back to FIG. 29, the OFDM transmit modules 2910a, 2910b, . . . , 2910k output signals $b_0[n], b_1[n], \ldots, b_{K-1}[n]$ 2915a, 2915b, . . . , 2915k which are input into the SFB 2920. The SFB 2920 may comprise a $Q_1$-point IFFT unit 2930, polyphase filters 2935a, 2935b, . . . , 2935k, and a multiplexer (MUX) 2940. The SFB 2920 outputs the RB-F-OFDM transmit signal x[n] 2950. The RB-F-OFDM transmit signal x[n] 2950 may be expressed as:

$$x[n] = \sum_{k=0}^{K-1} x_k[n] = \sum_{k=0}^{K-1} \left( \sum_m b_k[m] p[n-mQ] \right) e^{j\frac{2\pi k n}{Q_1}}, \quad \text{Equation (34)}$$

which is the expression of an FMT transmit signal, where $Q_1 \geq Q$, $Q_1 \geq K$, and $\text{lcm}(Q, Q_1) = Q_1$. After exchanging the order of summation, the following is obtained:

$$x[n] = \sum_m \left( \sum_{k=0}^{K-1} b_k[m] e^{j\frac{2\pi k n}{Q_1}} \right) p[n-mQ]. \quad \text{Equation (35)}$$

n may be expressed as:

$$n = \left\lfloor \frac{n}{Q_1} \right\rfloor Q_1 + v_1, \; v_1 = 0, 1, \ldots, Q_1 - 1. \quad \text{Equation (36)}$$

Substituting equation (36) into (35), the following is obtained:

$$x[n] = \sum_m \left( \sum_{k=0}^{K-1} b_k[m] e^{j\frac{2\pi k n}{Q_1}} \right) p[n-mQ] = \sum_m u_{v_1}[m] p[n-mQ] \quad \text{Equation (37)}$$

where the signal $$u_{v_1}[m] = \sum_{k=0}^{K-1} b_k[m] e^{j\frac{2\pi k v_1}{Q_1}}, \; v_1 = 0, 1, \ldots, Q_1 - 1 \quad \text{Equation (38)}$$

may be obtained through a $Q_1$-point IFFT. n may be expressed as follows:

$$n = \rho Q + v, \; \rho = \left\lfloor \frac{n}{Q} \right\rfloor, \; v = 0, 1, \ldots, Q - 1. \quad \text{Equation (39)}$$

The with polyphase component (with respect to Q) of filter p[n] may be defined as:

$$p_v[n] = p[nQ+v], v=0,1,\ldots,Q-1, n=0,1, \quad \text{Equation (40)}$$

and Q of such polyphase filters of p [n] may be obtained. Therefore, substituting equation (39) into (37), the following is obtained:

$$x[n] = \Sigma_m u_{v_1}[m] p[(\rho-m)Q+v] = u_{v_1}[n] * p_v[n], \quad \text{Equation (41)}$$

which is the convolution of the inverse fast Fourier transform (IFFT) output sequence $u_{v_1}[n]$ and the $v^{th}$ polyphase filter of pH, and the values of $v_1$ and v depend on n, and are from equations (36) and (39), respectively. Since $\text{lcm}(Q, Q_1) = Q_1$, the following is obtained:

$$v = v_1 \bmod Q, v=0,1,\ldots,Q-1. \quad \text{Equation (42)}$$

Therefore, each IFFT output sequence $u_{v_1}[n]$ corresponds to a unique polyphase filter $p_v[n]$. The value of the pair ($v_1$, v) changes periodically with a period of $Q_1$. Thus, the multiplexer (MUX) 2940 may be used to choose the samples from the polyphase filtered sequences based on the sample index.

Figure 31:
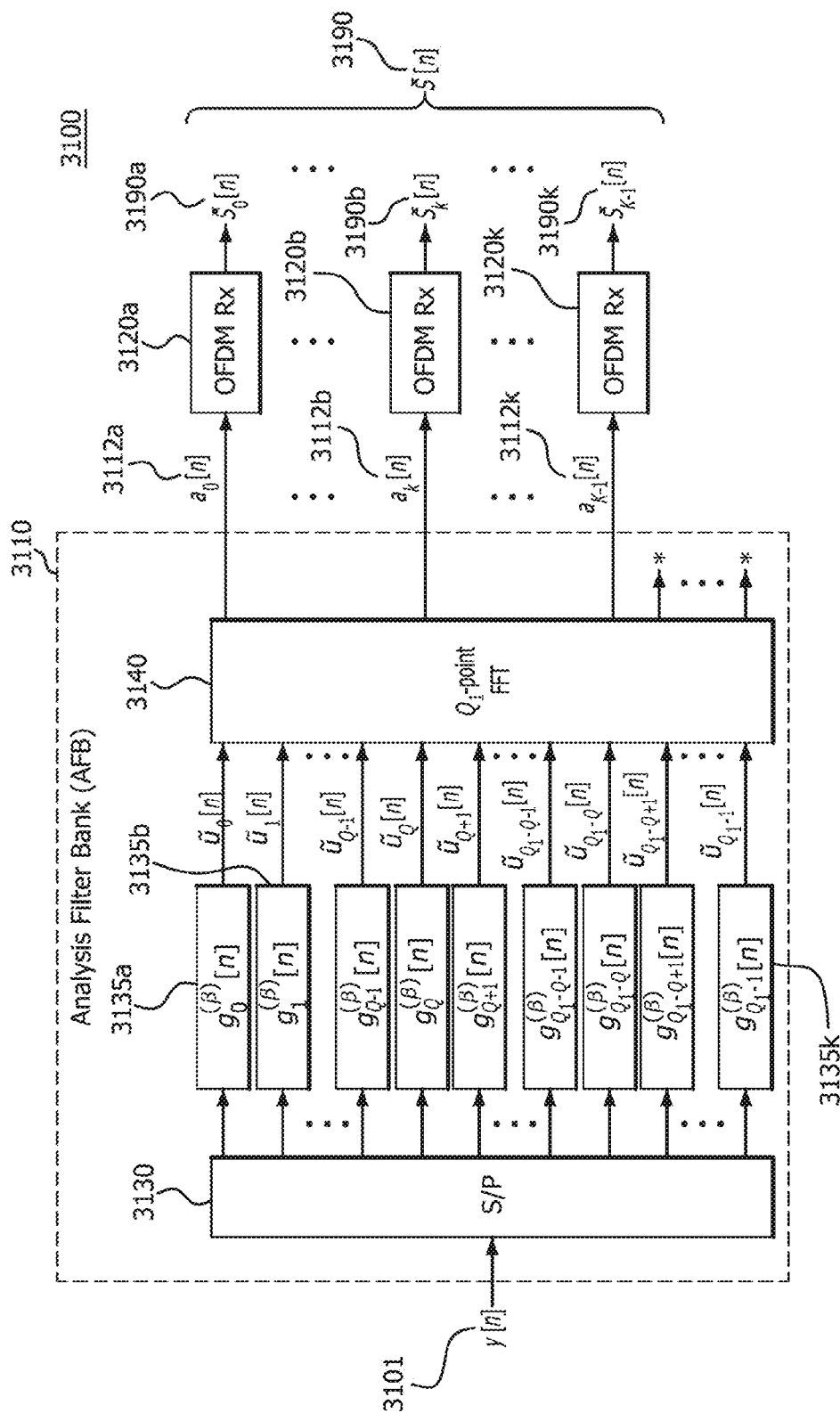
FIG. 31 is an example RB-F-OFDM receiver using polyphase implementation of an analysis filter bank (AFB)
Figure 33:
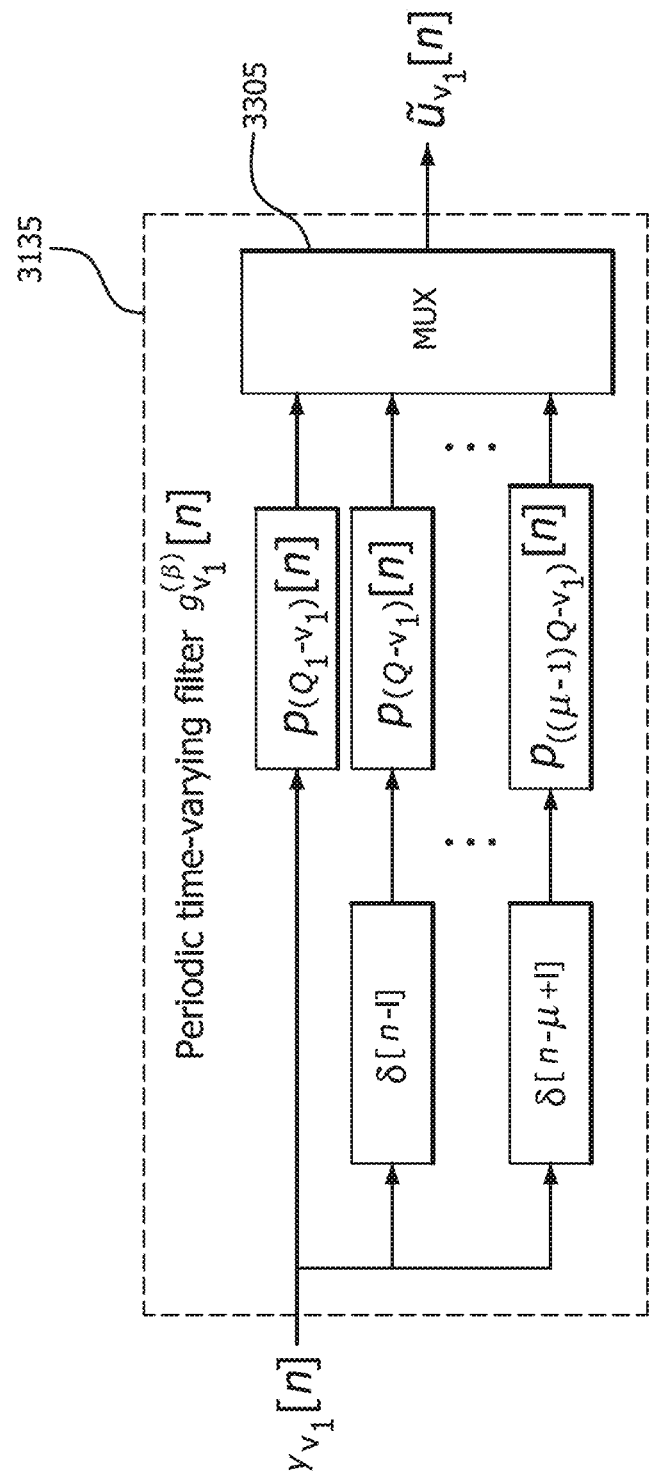
FIG. 33 is an example block diagram of a time-varying filter at the AFB.

FIG. 31 shows an example RB-F-OFDM receiver using polyphase implementation of an AFB 3100. The RB-F-OFDM receiver using polyphase implementation of an AFB 3100 may comprise an Analysis Filter Bank (AFB) unit 3110 that outputs vectors $a_0[n], \ldots, a_k[n], \ldots,$ and $a_{K-1}[n]$ 3112a, 3112b, ... 3112k, respectively, that are input into OFDM Rx modules 3120a, 3120b, ..., 3120k that output per-RB demodulated symbol vectors 3190a, 3190b, 3190k, respectively. Alternatively, the OFDM Rx modules may be CP-OFDM receive modules. The AFB unit 3110 may comprise a S/P converter 3130, periodic time-varying filters 3135a, 3135b, ..., 3135k, and a $Q_1$-point FFT unit 3140. FIG. 32 is a block diagram of the OFDM Rx module 3120. The OFDM Rx module 3120 may comprise a S/P converter 3205, a CP removal unit 3210, and a $L_1$-point FFT unit 3215. The OFDM receive module outputs per-RB demodulated symbol vectors 3190k. FIG. 33 is a block diagram of a time-varying filter 3135 at the AFB. The time varying filter 3135 may comprise a multiplexer (MUX) unit 3305. The polyphase implementation of the AFB may be derived similar to the SFB. Define the $Q_1 \times 1$ output vector from the AFB in the mth instance as:

$$a[m]=[a_0[m]a_1[m] \ldots a_{K-1}[m]a_K[m] \ldots a_{Q_1-1}[m]]^T \quad \text{Equation (43)}$$

where $a_k[m]$ is the input to the OFDM receive modules 3120a, 3120b, ..., 3120k in the $k^{th}$ RB which is output from the AFB unit 3110. The first K sequences are the inputs to the per-RB OFDM Rx receive modules, and the last $Q_1-K$ sequences may be discarded. It is assumed that the received signal is y[n] 3101. The input to the OFDM receive module 3120 in the $k^{th}$ RB may be expressed as:

$$a_k[m] = \left[\left(y[n]e^{-j\frac{2\pi k l}{Q_1}}\right) * p[n]\right]\Big|_{n=mQ} = \quad \text{Equation (44)}$$
$$\sum_l y[l]e^{-j\frac{2\pi k l}{Q_1}} p[mQ-l].$$

l may be expressed as:

$$l = \gamma Q_1 + v_1, \gamma = \left\lfloor \frac{l}{Q_1} \right\rfloor, v_1 = 0, 1, \ldots, Q_1 - 1 \quad \text{Equation (45)}$$

Substituting equation (45) into (44), the following is obtained:

$$a_k[m] = \sum_\gamma \sum_{v_1=0}^{Q_1-1} y[\gamma Q_1 + v_1]e^{-j\frac{2\pi k v_1}{Q_1}} p[mQ - \gamma Q_1 - v_1] \quad \text{Equation (46)}$$

Which is the expression of an FMT received signal at the kth subcarrier. After exchanging the order of summation the following is obtained:

$$a_k[m] = \sum_{v_1=0}^{Q_1-1} \left(\sum_\gamma y[\gamma Q_1 + v_1]p[mQ - \gamma Q_1 - v_1]\right) e^{-j\frac{2\pi k v_1}{Q_1}} = \quad \text{Equation (47)}$$

$$\sum_{v_1=0}^{Q_1-1} \hat{u}_{v_1}[m]e^{-j\frac{2\pi k v_1}{Q_1}}$$

where the signal $$\hat{u}_{v_1}[m]=\Sigma_\gamma y[\gamma Q_1+v_1]p[mQ-\gamma Q_1-v_1]=\Sigma_\gamma y_{v_1}[\gamma]p[mQ-\gamma Q_1-v_1], \quad \text{Equation (48)}$$

with the $Q_1$-down-sampled received signal $$y_{v_1}[\gamma]=y[\gamma Q_1+v_1], v_1=0,1,\ldots,Q_1-1. \quad \text{Equation (49)}$$

Therefore, the output vector from the AFB may be obtained through the $Q_1$-point FFT 3140, where each FFT input sequence $\hat{u}_{v_1}[m]$ comes from the convolution of $y_{v_1}[\gamma]$ with a possible time varying filter. The $Q_1$ down-sampled received signal $y_{v_1}[\gamma]$ may be obtained by using a serial-to-parallel (S/P) conversion at S/P converter 3130 from y[n]. Let $$mQ - v_1 = \rho Q_1 + v, \rho = \left\lfloor \frac{mQ-v_1}{Q_1} \right\rfloor, \quad \text{Equation (50)}$$
$$v = (mQ - v_1) \bmod Q_1, m \in Z.$$

The with polyphase component (with respect to $Q_1$) of filter p[n] is defined as:

$$p_v[n]=p[nQ_1+v], v=0,1,\ldots,Q_1-1, n=0,1,\ldots, \quad \text{Equation (51)}$$

and $Q_1$ of such polyphase filters of p[n] is obtained. Therefore, substituting equations (50) and (51) into (48), after some math manipulations, the following is obtained:

$$\hat{u}_{v_1}[m]=\Sigma_\gamma y_{v_1}[\gamma]p[(\rho-\gamma)Q_1+v]=y_{v_1}[\rho]*p_v[\rho], \quad \text{Equation (52)}$$

where the values of $\rho$ and $v$ depend on m, and are from equation (50). Therefore, the polyphase filter $p_v[\rho]$ for the fast Fourier transform (FFT) input sequence $\hat{u}_{v_1}[m]$ is a time-varying filter that changes periodically with a period of $q=Q_1/Q$. For notation simplicity, the periodic time-varying filter for the FFT input sequence $\hat{u}_{v_1}[m]$ is defined as:

$$g_{v_1}^{(\beta)}[n]=p_{(\beta Q-v_1) \bmod Q_1}[n], \beta = m \bmod q. \quad \text{Equation (53)}$$

Single carrier modulation (SCM) with CP may be used as an alternative waveform to OFDM in each RB. One advantage of SCM is lower PAPR. In addition, since IFFT is not needed in the generation of the SCM waveform, the complexity of the transmitter is reduced.

Figure 34:
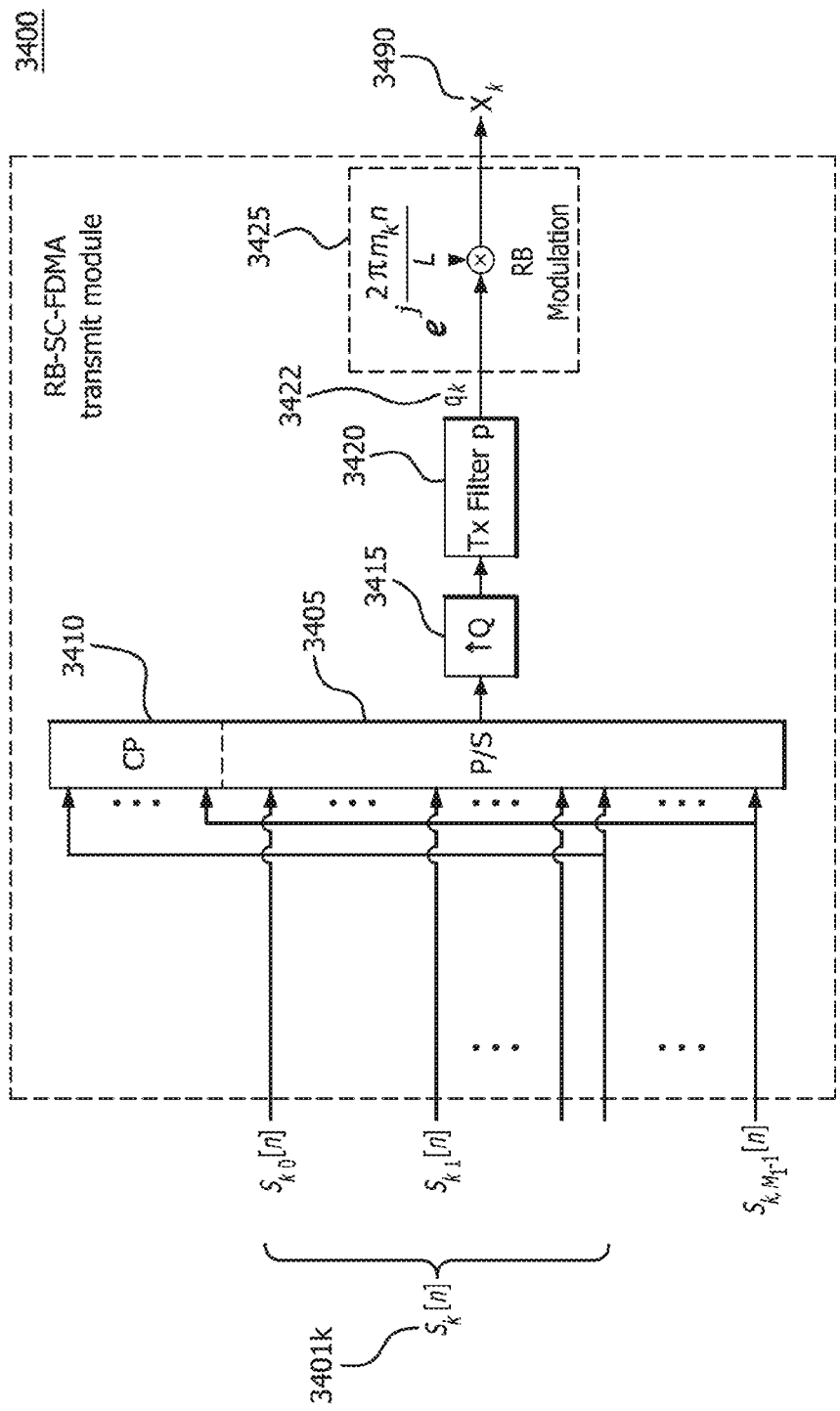
FIG. 34 is an example resource block single carrier modulation (RB-SCM) transmit module.

In RB-based SCM (RB-SCM), the data symbols may be arranged in a block and then CP may be added. As opposed to OFDM, an IFFT unit may not be needed. FIG. 34 shows an example RB-SCM transmit module 3400.

The RB-SCM transmit module 3400 has two differences from the per-RB F-OFDM transmit module 1900 shown in FIG. 19. Zeros may not be added to form the data block unless there is no symbol to transmit, and the data block may not go through an IFFT unit.

Referring to FIG. 34, per-RB symbol vectors 3401k are input into the RB-SCM transmit module 3400, which may comprise a P/S converter 3405, a CP adder unit 3410, an upsampling unit 3415, a baseband transmit filter 3420, and a RB modulation unit 3425.

After CP is added at the CP adder unit 3410, the data block may go through P/S conversion at the P/S converter 3405, may be upsampled at the upsampling unit 3415 with a ratio of Q=L/M, and then may be filtered at the baseband transmit filter 3420. The baseband transmit filter 3420 may be a lowpass filter. The lowpass filter used in SCM may be sharper than the filter used in OFDM. In RB-based OFDM, images created after upsampling are further away from each other due to the zero-padding used in IFFT. Since IFFT and zero-padding do not exist in the SCM case, the images may be adjacent to each other and a sharper filter may be used to separate them. As a result, the filter length may become longer. After filtering, the filtered signal 3422 output by the baseband transmit filter 3420, is RB modulated at the RB modulating unit 3425, which outputs per-RB multicarrier modulated signal $x_k$ 3490.

Figure 35:
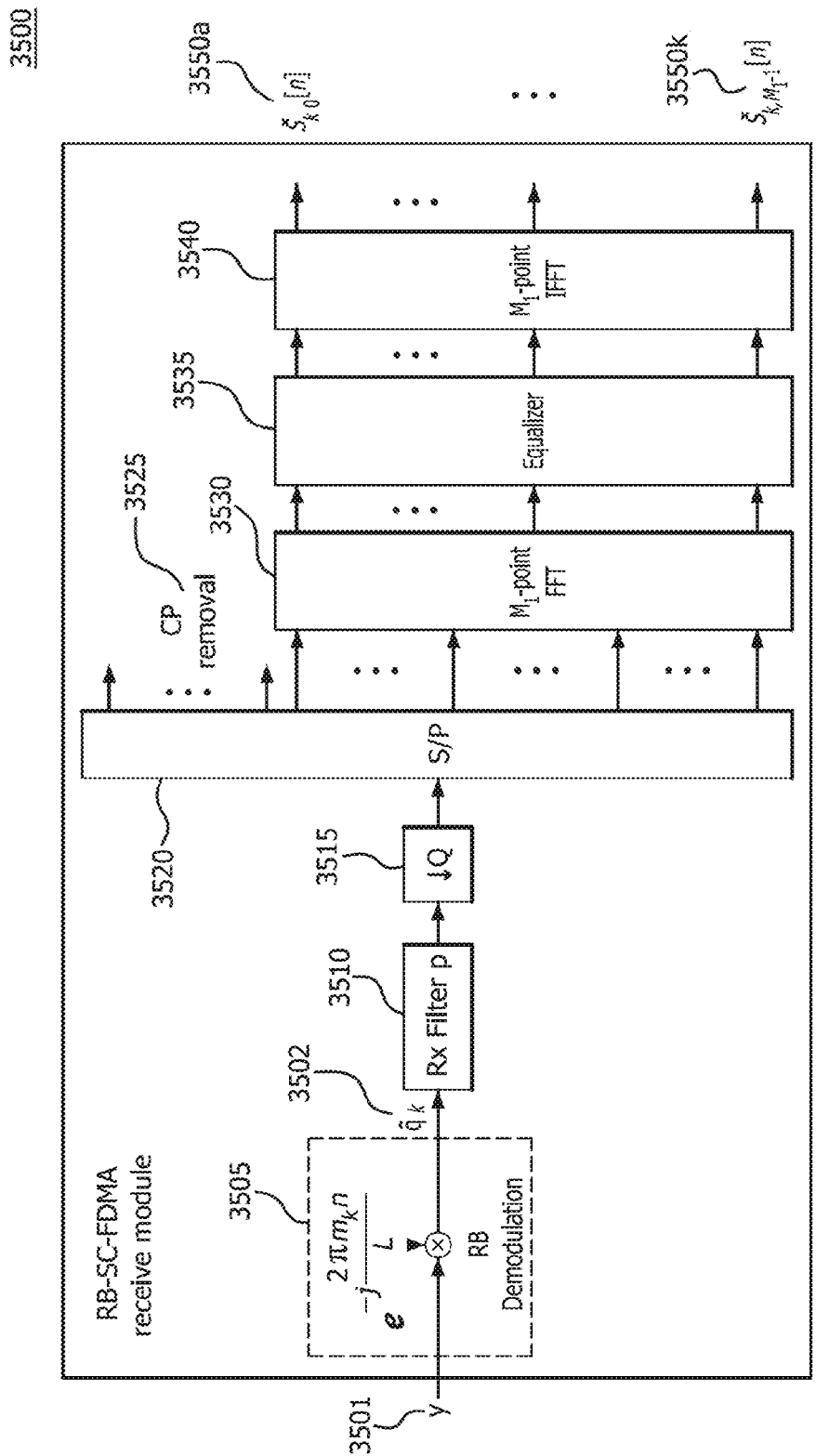
FIG. 35 is an example resource block single carrier modulation (RB SCM) receive module.

FIG. 35 shows an example RB SCM receive module 3500. The receive module for the kth RB is shown in FIG. 35. Referring to FIG. 35, the RB SCM receive module 3500 may comprise a RB demodulation unit 3505, a baseband receive filter 3510, a downsampling unit 3515, a S/P converter 3520, a CP removal unit 3525, a M1-point FFT unit 3530, an equalizer 3535 and a M1-point IFFT unit 3540. The received signal y 3501 is demodulated at the RB demodulation unit 3505 from frequency band of the kth RB to baseband to form a RB demodulated signal $\hat{q}_k$ 3502. Then, the RB demodulated signal $\hat{q}_k$ 3502 is filtered at the baseband receive filter 3510 and downsampled at the downsampling unit 3515. CP is removed at the CP removal unit 3525 and the signal is partitioned at the S/P converter 3520. The data symbols may then be demodulated. With SCM, frequency domain equalization may be performed. To achieve this, FFT of the signal is taken at the M1-point FFT unit 3530. Then, equalization is performed at the equalizer 3535 by using techniques such as zero-forcing or MMSE equalization. Finally, IFFT is taken to recover the data symbols at the M1-point IFFT unit 3540. The RB-SCM receive module outputs demodulated symbols 3550a, . . . , 3550k.

In a variation of the SCM, CP may be omitted. In this case, at the receiver, time-domain equalization may be used, (i.e., equalization is performed on the signal after the S/P operation).

In another example, RB-based precoded OFDM (RB-P-OFDM) may be implemented. The precoding technique may be used to achieve significant OOBE suppression with a relatively small spectral efficiency loss. Moreover, precoding does not need signaling overhead, has no bit error rate (BER) performance degradation, and does not depend on the input data. However, there may be a few drawbacks to the conventional precoding approach. Firstly, PAPR is increased, since the symbols mapped to subcarriers are no longer independent after precoding. Secondly, the design of the precoding matrix depends on the assigned subcarriers and needs to be updated each time when the assigned subcarriers are changed.

Examples for an individual precoded OFDM (I-P-OFDM) scheme and two types of RB based precoded-OFDM (RB-P-OFDM) schemes, which are named uniform resource block-based precoded-OFDM (U-RB-P-OFDM) and non-uniform resource block-based precoded-OFDM (NU-RB-P-OFDM) are disclosed hereafter.

In I-P-OFDM, each frequency band (FB) is precoded independently. In RB-based OFDM systems, the FBs are divided into RBs (where each RB is a group of subcarriers that form a contiguous spectrum) and one RB is viewed as the smallest available transmission band. In U-RB-P-OFDM, the signal of each RB is precoded independently by a uniform precoding matrix and each has good spectral containment. It has low complexity but the spectral efficiency loss is relatively large, since it scales by the number of available RBs. In NU-RB-P-OFDM, the signal of several contiguous RBs is precoded together by pre-stored precoding matrices to reduce the spectral efficiency loss caused by the increment of RBs. On the other hand, the larger size of precoding matrices may cause the larger complexity. Therefore, if the number of RBs in a contiguous frequency band is larger than a certain value, the signal may be divided into several sub blocks, and each sub block may be precoded by the stored precoding matrices independently. In this way, a tradeoff between spectral efficiency loss and complexity can be made according to requirements of the systems.

A non-contiguous transmission band consisting of Q contiguous frequency bands (FBs), e.g., $0^{th}$, $1^{st}$, $2^{nd}$, . . . $(Q-1)^{th}$ FB, is utilized by an OFDM-based cognitive radio (CR) user. Each FB has $N_i$ contiguous subcarriers. Thus, the total number of subcarriers used by the CR user is $N=\Sigma_{i=0}^{Q-1}N_i$. Since each OFDM symbol is precoded and decoded independent from other OFDM symbols, for simplicity, the symbol index is ignored hereafter. The time-domain OFDM transmit symbol $\phi(t)$, is expressed as:

$$\phi(t)=\Sigma_{i=0}^{Q-1}\phi_i(t)=\Sigma_{i=0}^{Q-1}\Sigma_{j=0}^{N_i-1}d_{i,j}p_{i,j}(t), \quad \text{Equation (54)}$$

where $\phi_i(t)$ is the OFDM transmit symbol modulated by the $i^{th}$ FB. For the $j^{th}$ subcarrier in the $i^{th}$ FB, $d_{i,j}$ is the data symbol and $p_{i,j}$ is the windowed subcarrier waveform that is expressed as:

$$p_{i,j}(t) = e^{j2\pi\frac{N_{i,j}}{T_s}t}g_c(t), \quad \text{Equation (55)}$$

with the pulse shape function as follows:

$$g_c(t) = \begin{cases} 1, & -T_{CP} \leq t < T_s \\ 0, & \text{otherwise} \end{cases} \quad \text{Equation (56)}$$

In equations (55) and (56), $T_s$ is the effective symbol duration and $T_{CP}$ is the cyclic prefix duration. The subcarrier index $N_{i,j}$ is:

$$\mathcal{N}_{i,j}=\mathcal{N}_{i,0}+j, i=0,1,\ldots,Q-1, j=0,1,\ldots,N_i-1, \quad \text{Equation (57)}$$

The frequency domain representation of the transmit signal $\phi(t)$ in equation (54) at certain frequency f may be expressed as follows:

$$X(f)=\Sigma_{i=0}^{Q-1}X_i(f)=\Sigma_{i=0}^{Q-1}\Sigma_{j=0}^{N_i-1}d_{i,j}P_{i,j}(f), \quad \text{Equation (58)}$$

with $$P_{i,j}(f) = \frac{1}{T}\int_{-\infty}^{+\infty} p_{i,j}(t)e^{-j2\pi ft}dt = \frac{e^{j\pi\left(\frac{N_{i,j}}{T_s}-f\right)(T_s-T_{CP})}}{\pi\left(\frac{N_{i,j}}{T_s}-f\right)T}\sin\left(\pi\left(\frac{N_{i,j}}{T_s}-f\right)T\right), \quad \text{Equation (59)}$$

where $T=T_{CP}+T_s$ is the OFDM symbol duration, and $x_i(f)$ is the frequency response of $\phi_i(t)$. To suppress $X(f)$ at notched frequency $f_k$, $k=0, 1, \ldots, K-1$ for the user, a precoding process $\{G_{i,j,mn}\}$ may be imposed on the data symbol $d_{m,n}$, that may be expressed as:

$$s_{i,j}=\Sigma_{m=0}^{Q-1}\Sigma_{n=0}^{M_i-1}G_{ij,mn}d_{m,n}, \quad \text{Equation (60)}$$

where $M_i$ is the number of data streams transmitted in the $i^{th}$ FB. The symbols $s_{i,j}$, instead of the data symbols, are mapped to the subcarriers. Therefore, $X(f_k)$ in equation (58) becomes as follows:

$$X(f_k)=\Sigma_{i=0}^{Q-1}\Sigma_{j=0}^{N_i-1}s_{i,j}P_{i,j}(f_k). \quad \text{Equation (61)}$$

Due to precoding, $N_i \geq M_i$, and the total number of data streams is $M = \sum_{i=0}^{Q-1} M_i$. Using matrix expressions, equations (60) and (61) become as follows:

$$x = Ps, s = Gd, \qquad \text{Equation (62)}$$

where $$x = \begin{bmatrix} X(f_0) \\ X(f_1) \\ \vdots \\ X(f_{K-1}) \end{bmatrix}, s = \begin{bmatrix} s_0 \\ s_1 \\ \vdots \\ s_{Q-1} \end{bmatrix}, s_i = \begin{bmatrix} s_{i,0} \\ s_{i,1} \\ \vdots \\ s_{i,N_i-1} \end{bmatrix}, \qquad \text{Equation (63)}$$

$$d = \begin{bmatrix} d_0 \\ d_1 \\ \vdots \\ d_{Q-1} \end{bmatrix}, d_i = \begin{bmatrix} d_{i,0} \\ d_{i,1} \\ \vdots \\ d_{i,M_i-1} \end{bmatrix}$$

$$P = [P_0 \; P_1 \; \ldots \; P_{Q-1}] \qquad \text{Equation (64)}$$

$$P_i = \begin{bmatrix} P_{i,0}(f_0) & \ldots & P_{i,N_i-1}(f_0) \\ \vdots & \ddots & \vdots \\ P_{i,0}(f_{K-1}) & \ldots & P_{i,N_i-1}(f_{K-1}) \end{bmatrix}, G = [G_{ij,mn}]. \qquad \text{Equation (65)}$$

The precoding may be performed to suppress the OOBE of the transmit signal, which may be done by suppressing the out-of-band power leakage at the notched frequencies $f_k$, $k=0, 1, \ldots, K-1$, i.e., minimizing $\|x\|$. If the precoding matrix G is chosen as a semi-unitary matrix such that $G^H G = I_M$, at the receiver, after discrete Fourier transform (DFT) or fast Fourier transform (FFT) and frequency domain equalization, the received precoded data, denoted by $\hat{s}$, may be decoded by the decoding matrix $G^H$. Thus, the estimated data vector is represented as:

$$\hat{d} = G^H \hat{s}. \qquad \text{Equation (66)}$$

The precoding may provide satisfying spectral containment for non-contiguous spectrum. However, the design of the precoding matrix depends on the assigned subcarriers and the chosen notched frequencies according to equation (59). Furthermore, since G is an N×(N−R) matrix, the complexity (evaluated in terms of the number of real multiplications) of the precoding process in equation (62) and decoding process in equation (66) has an order of $O(N^2)$, which may be unacceptable when N is large.

In one example, a modified individual precoding scheme, called I-P-OFDM, may be implemented to reduce the complexity by precoding each FB independently. As shown in equations (58) and (59), X(f) is the linear combination of $P_{i,j}(f)$, which is the frequency response of the windowed subcarrier waveform at frequency f and depends on the relative spacing between frequency f and the subcarrier frequency $$\left(\frac{N_{i,j}}{T_s}\right).$$

For a chosen notched frequency f between the $i^{th}$ and $(i+1)^{th}$ FBs, the signals of the $i^{th}$ and $(i+1)^{th}$ FBs have a larger OOBE at f than the signals of other FBs have, i.e., $$|X_i(f)|^2 \geq |X_l(f)|^2, |X_{i+1}(f)|^2 \geq |X_l(f)|^2, l=0,1, \ldots, Q-1, l \neq i, i+1. \qquad \text{Equation (67)}$$

As a result, the problem of minimizing $\|x\|$ can be simplified to independently minimizing the OOBE at each notched frequency brought by its two closest FBs on both sides as follows:

$$x = [X_0(f_0)X_1(f_1), \ldots, X_{Q-1}(f_{Q-1})]^T = [P_0 s_0, P_1 s_1, \ldots, P_{Q-1} s_{Q-1}]^T,$$

$$s_i = G_i d_i, i=0,1, \ldots, Q-1, \qquad \text{Equation (68)}$$

where $f_i = [f_{i,0}, f_{i,1}, \ldots, f_{i,K_i-1}]$ are the notched frequencies chosen for the $i^{th}$ FB and $$P_i = \begin{bmatrix} P_{i,0}(f_{i,0}) & \ldots & P_{i,N_i-1}(f_{i,0}) \\ \vdots & \ddots & \vdots \\ P_{i,0}(f_{i,K_i-1}) & \ldots & P_{i,N_i-1}(f_{i,K_i-1}) \end{bmatrix}, \qquad \text{Equation (69)}$$

$$G_i = [G_{ij,n}].$$

To minimize $\|x\|$, the singular value decomposition (SVD) may be performed on each $P_i$ as follows:

$$P_i = U_i \Sigma_i V_i^H. \qquad \text{Equation (70)}$$

The $N_i \times M_i$ precoding matrix for the $i^{th}$ FB may be then chosen as:

$$G_i [v_{i,N_i-M_i+1} \ldots v_{i,N_i-2} v_{i,N_i-1}] \qquad \text{Equation (71)}$$

Since $M_i \leq M$, the complexity may be reduced dramatically in most cases when $M_i \ll M$ and the overall coding rate is as follows:

$$\lambda = 1 - \frac{\sum_{i=0}^{Q-1} R_i}{N}. \qquad \text{Equation (72)}$$

Figure 36:
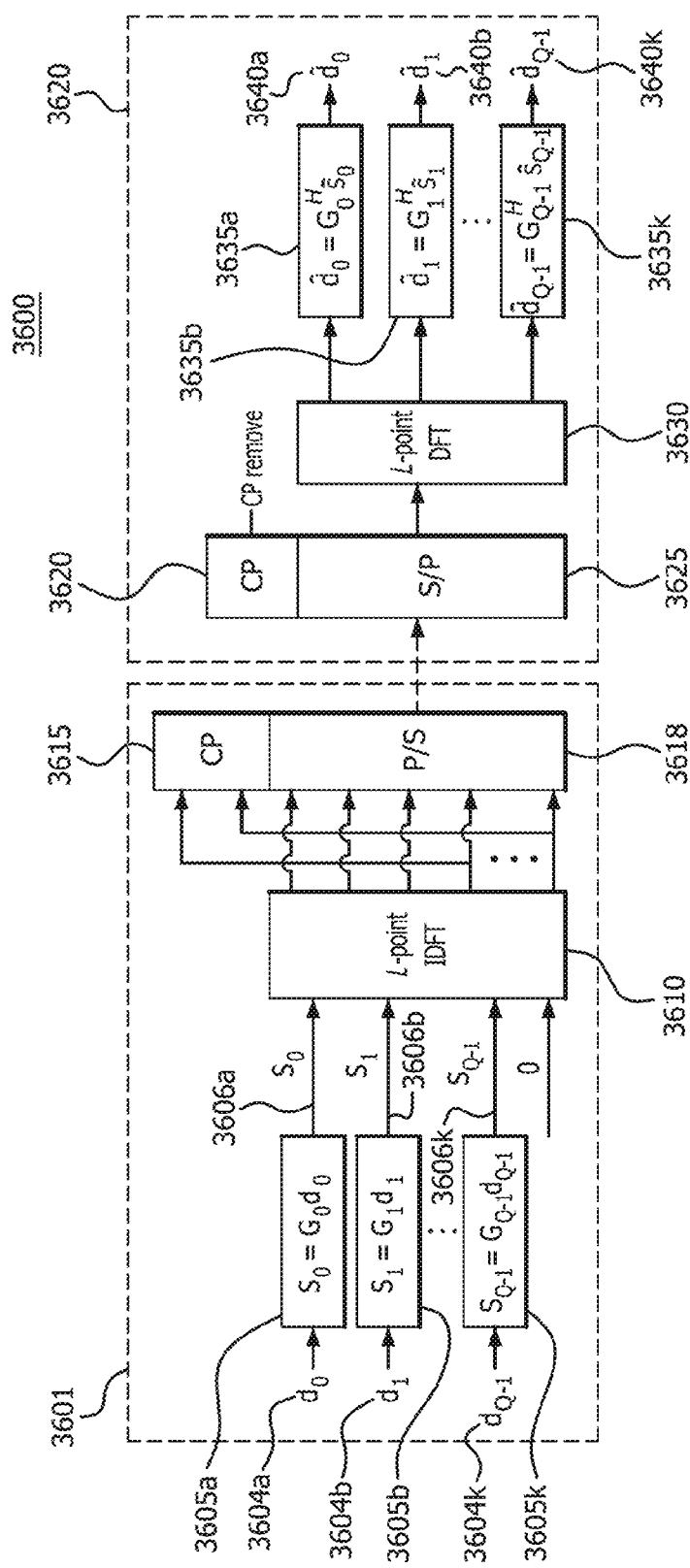
FIG. 36 is a block diagram of an example structure of the individual precoded OFDM (I-P-OFDM) transceiver in accordance with one embodiment.

FIG. 36 is a block diagram of an example I-P-OFDM transceiver structure 3600. Referring to FIG. 36, the I-P-OFDM transceiver may comprise a transmitter block 3601 and a receiver block 3602. The transmitter block 3601 may comprise precoding units 3605a, 3605b, ..., 3605k, a L-point IDFT unit 3610, a CP adder unit 3615, and a P/S converter 3618. The receiver block 3602 may comprise a CP removal unit 3620, a S/P converter 3625, a L-point DFT unit 3630, and deprecoding units 3635a, 3635b, ..., 3635k.

Referring to FIG. 36, the symbol vector of each FB 3604a, 3604b, ..., 3604k is precoded independently at the precoding units 3605a, 3605b, ..., 3605k, outputting precoded symbol vectors 3606a, 3606b, ..., 3606k. The output precoded symbol vectors 3606a, 3606b, ..., 3606k are then modulated together through inverse discrete Fourier transform (IDFT) at the L-point IDFT unit 3610. Some FBs may have the same number of subcarriers, but the number of data streams and coding rates and the way of choosing notched frequencies and precoding matrices may be different. This scheme provides computational complexity reduction, compared to the conventional precoding scheme. In some cases, an FB may have a large number of subcarriers such that the precoding matrix has a large dimension. Moreover, the design of the precoding matrices still depends on the assigned subcarriers and the chosen notched frequencies.

Figure 37:
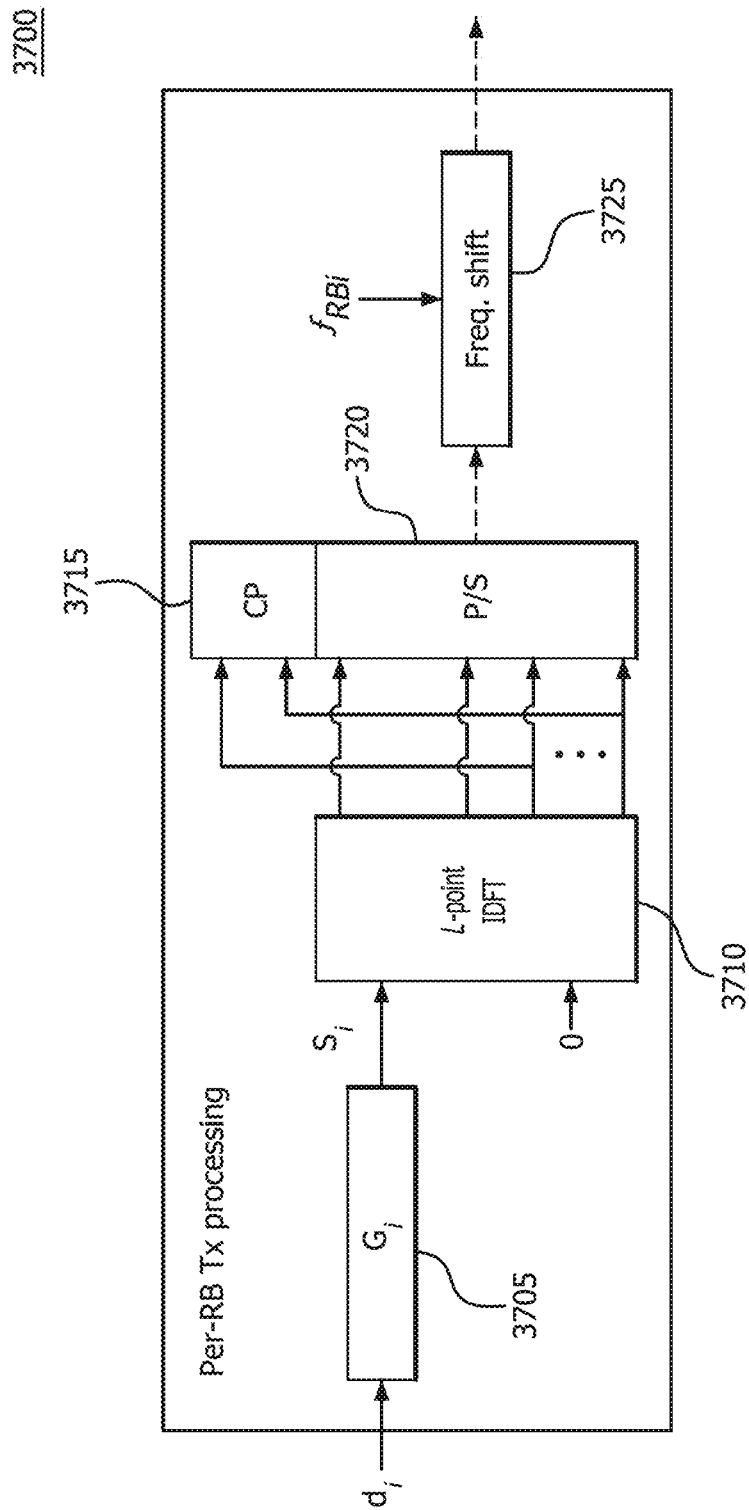
FIG. 37 is a block diagram of a per-RB precoding transmit processing module.

The transmitter block 3601 in FIG. 36 may be alternatively represented similar to FIGS. 4 and 5 where the per-RB transmit processing module is the transmit module shown in FIG. 37. FIG. 37 shows one example of the per-RB transmit processing module 3700 that comprises a precoding unit 3705, a L-point IDFT unit 3710, a CP adder unit 3715, and a P/S converter 3720, and a RB modulation unit 3725.

Figure 38:
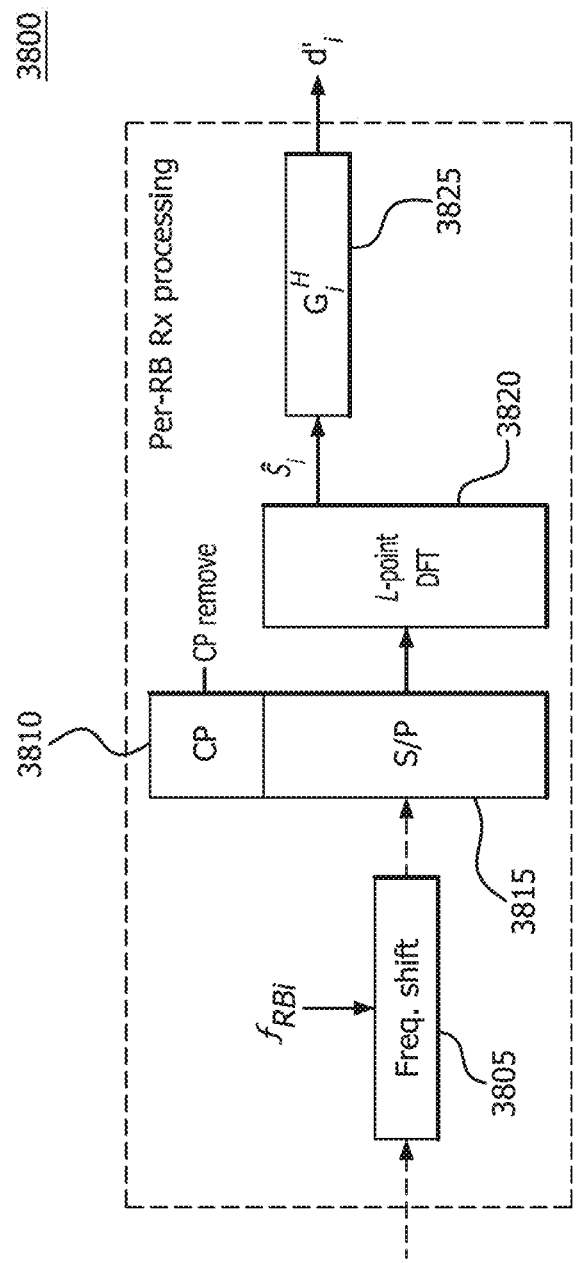
FIG. 38 is a block diagram of a per-RB precoding receive processing module.

The receiver block 3602 in FIG. 36 may be alternatively represented as in FIG. 6 where the per-RB receive processing module is depicted in FIG. 38. FIG. 38 shows one example of the per-RB receive processing module 3800. The per-RB receive processing module 3800 comprises a RB demodulation unit 3805, a CP remover unit 3810, a S/P converter 3815, a L-point DFT unit 3820, and a deprecoding unit 3825. The implementation in FIG. 36 has much less complexity because all FBs share the same IFFT operation at the transmitter and same FFT operation at the receiver.

RB-P-OFDM may provide uniform or fixed precoding and decoding matrices, which have relatively smaller sizes and do not depend on the allocated subcarriers and notched frequencies, for non-contiguous spectrum to obtain satisfying spectrum containment. In one embodiment for the RB-P-OFDM, each FB may be divided into B RBs (where each RB is a group of $N_B$ contiguous subcarriers and is viewed as the smallest available transmission band) and the signals are precoded by predetermined precoding matrices.

Referring back to FIG. 36, when the signal is received at the I-P-OFDM receive block 3602, the signal may go through the CP removal unit 3620, the S/P converter 3625, the L-point DFT unit 3630, and deprecoding units 3635a, 3635b, . . . , 3635k, which output estimated data vectors 3640a, 3640b, . . . , 3640k.

Similar to I-P-OFDM, the implementation of the RB-P-OFDM transmitters may use one IFFT operation for all RBs and the implementation of the RB-P-OFDM receivers may use one FFT operation for all RBs.

Figure 39:
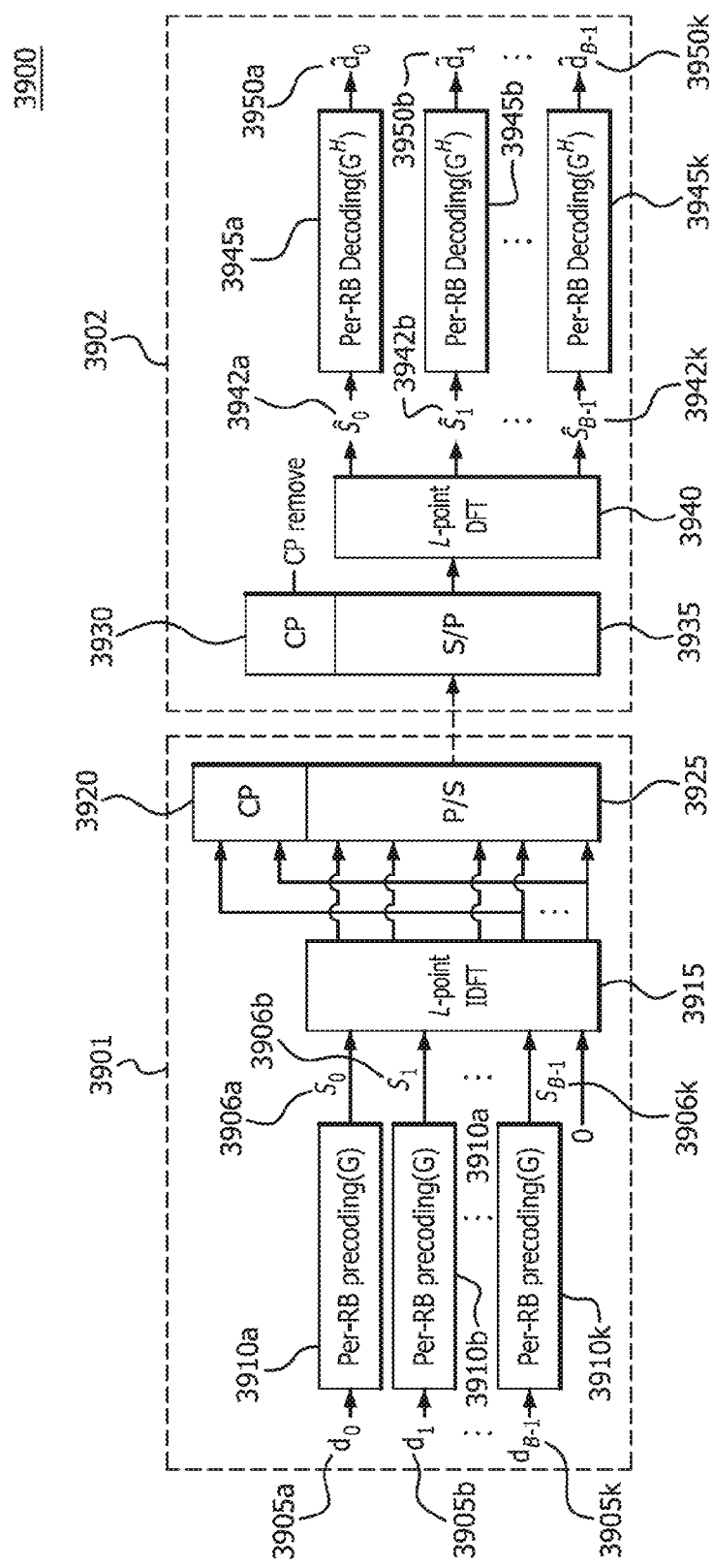
FIG. 39 is a block diagram of an example uniform resource block-based precoded OFDM (U-RB-P-OFDM) structure.

FIG. 39 is a block diagram of an example uniform resource block-based precoded OFDM (U-RB-P-OFDM) structure 3900. Referring to FIG. 39, the U-RB-P-OFDM structure includes a U-RB-P-OFDM transmitter block 3901 and a U-RB-P-OFDM receiver block 3902. The U-RB-P-OFDM transmitter block 3901 comprises precoding units 3910a, 3910b, . . . , 3910k, an L-point IDFT unit 3915, a CP adder unit 3920, and a P/S converter 3925. The U-RB-P-OFDM receiver block 3902 comprises a CP removal unit 3930, a S/P converter 3935, a L-point DFT unit 3940, and deprecoding unit 3945a, 3945b, . . . , 3945k. In the U-RB-P-OFDM transmitter block 3901, the symbol vector of each RB 3905a, 3905b, . . . , 3905k may be precoded at the precoding units 3910a, 3910b, . . . , 3910k by a uniform precoding matrix, G, independently. The precoding units 3910a, 3910b, . . . , 3910k output precoded symbol vectors 3906a, 3906b, . . . , 3906k. According to equation (59), the matrix $P_i$ for the $i^{th}$ RB depends on $$\left(\frac{N_{i,j}}{T_s} - f\right).$$

Once $N_B$, the size of each RB, and the spacing between the central frequency of each RB and the notched frequencies f are determined, matrix $P_i$ may be fixed. Then a unique precoding matrix G with coding redundancy $R_B$ may be obtained by equation (71). In order to determine the precoding matrix for all the RBs, different notched frequencies may be chosen for the RBs in a contiguous band so that the spacing between each RB's central frequency and the corresponding chosen notched frequency may be the same as the others. This uniform regulation of same $$\left(\frac{N_{i,j}}{T_s} - f\right)$$

for all i thus brings convenience for the design of the precoding matrices. In addition, since the dimension of G is decreased from N to $N_B$, the computational complexity of the precoding and decoding operation is also decreased. Since $R_B$ is the length of redundancy for each RB, the total coding rate may be as follows:

$$\lambda = 1 - \frac{\sum_{i=0}^{B-1} R_B}{N} = 1 - \frac{R_B}{N_B} \qquad \text{Equation (73)}$$

As shown in equation (73), the spectral efficiency of the U-RB-P-OFDM system reduces as the number of RBs or the coding redundancy increases. The spectral efficiency loss may be reduced by precoding the signal of contiguous RBs together so that the redundancy does not have to be reserved for every RB repetitively. Denote the predetermined precoding matrix as $G'_i$, i=1, 2, . . . , W. The signal of contiguous i RBs may be precoded together by the stored precoding matrix $G'_i$, Here $G'_i$ is the precoding matrix for an FB with i RBs, which depends on i. By this method, the spectral efficiency loss may be reduced dramatically, but when the maximum number of contiguous RBs, W, is too large, the memory used to store the precoding matrices will be too large. On the other hand, the complexity of precoding process, which is proportional to $(WN_b)^2$, may be too high. In light of this, in one embodiment, an FB may be divided into several sub blocks when the number of RBs in this FB is larger than a certain value, $W_B$, and the signal of each sub block may be precoded independently. As a result, the complexity and the number of precoding matrices that need to be stored may be reduced. Since the sub blocks may be considered as virtual RBs of non-uniform sizes, such a scheme is named NU-RB-P-OFDM. It provides a tradeoff between the spectral efficiency loss and complexity by choosing $W_B$ according to the system requirements.

Referring back to FIG. 39, after the symbol vector of each RB 3905a, 3905b, . . . , 3905k is precoded at the precoding units 3910a, 3910b, . . . , 3910k, the signals go through the L-point IDFT unit 3915, the CP adder unit 3920, and the P/S converter 3925, which outputs the transmit signal. When the signal is received at the U-RB-P-OFDM receiver block 3902, CP is removed at the CP removal unit 3920, the signal goes through the S/P converter 3935, an L-point DFT unit 3940 that outputs demodulated symbol vectors 3942a, 3942b, . . . , 3942k, and deprecoding units 3945a, 3945b, . . . , 3945k which output estimated data vectors 3950a, 3950b, . . . , 3950k.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for performing multicarrier modulation in a wireless communication device, the method comprising:
   receiving a multicarrier modulated signal that were filtered and windowed;
   formatting the received multicarrier modulated signal into a plurality of per-resource block (RB) multicarrier modulated signals;
   performing RB de-modulation, according to one or more schemes, on each of the plurality of per-RB multicarrier modulated signals to de-modulate each per-RB multicarrier modulated signal from a frequency band of each RB to a baseband separately, wherein the de-modulation is different for at least one of the plurality of RBs, wherein non-contiguous available spectrum is partitioned into a plurality of resource blocks, wherein each RB of the plurality of RBs comprises a plurality of subcarriers;
   filtering each of the plurality of per-RB de-modulated signals separately;
   estimating and equalizing the channel of each of the plurality of per-RB de-modulated signals to output estimated symbols for each of the plurality of per-RB de-modulated signals; and
   decoding the estimated symbols for each of the plurality of per-RB de-modulated signals.

2. A wireless communication device for processing multicarrier modulated signals, the wireless communications device comprising:
   one or more transceivers, configured to:
      receive a multicarrier modulated signal that was filtered and windowed; and
   one or more processors operatively coupled to the one or more transceivers, wherein the one or more processors are configured to:
      format the received multicarrier modulated signal into a plurality of per-resource block (RB) multicarrier modulated signals;
      perform RB de-modulation, according to one or more schemes, on each of the plurality of per-RB multicarrier modulated signals to de-modulate each per-RB multicarrier modulated signal from a frequency band of each RB to a baseband separately, wherein the de-modulation is different for at least one of the plurality of RBs, wherein non-contiguous available spectrum is partitioned into a plurality of resource blocks, wherein each RB of the plurality of RBs comprises a plurality of subcarriers;
      filter each of the plurality of per-RB de-modulated signals separately;
      estimate and equalize the channel of each of the plurality of per-RB de-modulated signals to output estimated symbols for each of the plurality of per-RB de-modulated signals; and
      decode the estimated symbols for each of the plurality of per-RB de-modulated signals.

* * * * *